United States Patent [19]

Reed et al.

[11] 4,039,804

[45] Aug. 2, 1977

[54] SYSTEM AND METHOD FOR MONITORING INDUSTRIAL GAS TURBINE OPERATING PARAMETERS AND FOR PROVIDING GAS TURBINE POWER PLANT CONTROL SYSTEM INPUTS REPRESENTATIVE THEREOF

[75] Inventors: Terry J. Reed, Latrobe; Robert A. Yannone, Aldan, both of Pa.

[73] Assignee: Westinghouse Electric Corporation, Pittsburgh, Pa.

[21] Appl. No.: 403,595

[22] Filed: Oct. 4, 1973

Related U.S. Application Data

[62] Division of Ser. No. 234,491, March 14, 1972.

[51] Int. Cl.² .............................................. F01D 17/00
[52] U.S. Cl. ............................... 235/151.21; 60/646; 364/300
[58] Field of Search ..................... 235/151.21, 151.1; 60/204, 646; 444/1; 290/40 R, 40 A–40 C, 40 F; 340/172.5

[56] References Cited

U.S. PATENT DOCUMENTS 3,400,374  6/1968  Schumann .................... 340/172.5

OTHER PUBLICATIONS

Application of the Prodac 50 System to Direct Digital Control; J. C. Belz, G. J. Kirk & P. S. Radcliffe; 1965 IEEE Intl. Conv. Rec., Part 3, pp. 102–122.
Monitoring and Automatic Control in Steam Power Stations by Process Computers; E. Doetsch & G. Hirschberg; Siemens Review XXXV, (1968), No. 12, pp. 471–476.

*Primary Examiner*—Edward J. Wise
*Attorney, Agent, or Firm*—E. F. Possessky

[57] ABSTRACT

A hybrid digital computer gas turbine power plant control system which may operate in a multiple-control loop arrangement is provided with selected process variable monitoring means. Control system inputs representative of current values of such variables are continuously available to provide positive highly responsive control over a broad range of gas turbine operating conditions. Predictable process sensor errors are effectively eliminated by means of programmed computer operations to thereby insure highly accurate control variable derivation essential to maintaining gas turbine operation at or near design limits.

2 Claims, 40 Drawing Figures

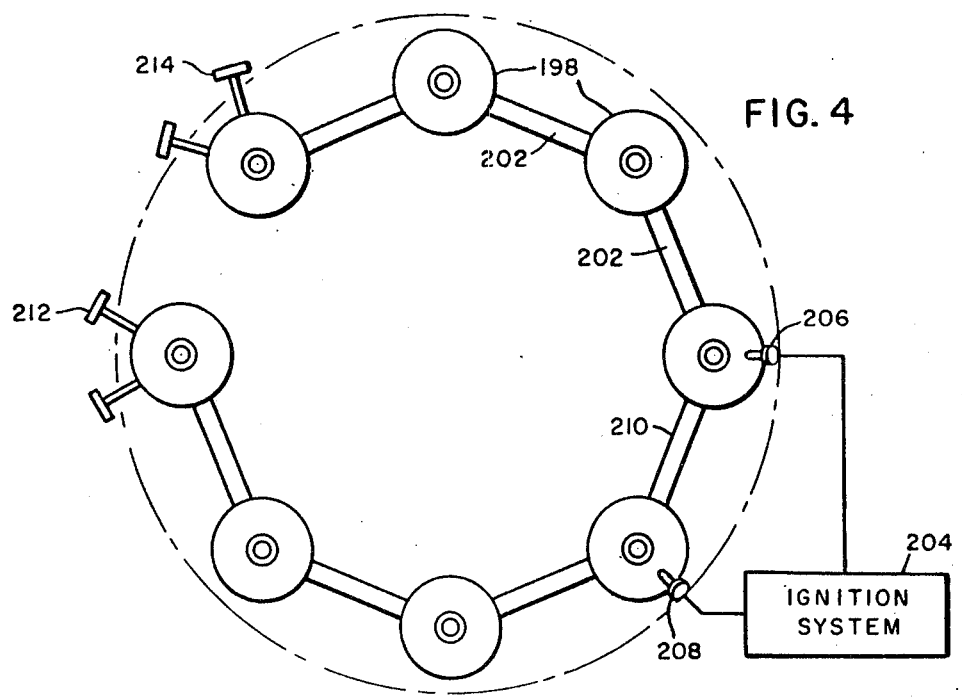
FIG. 4
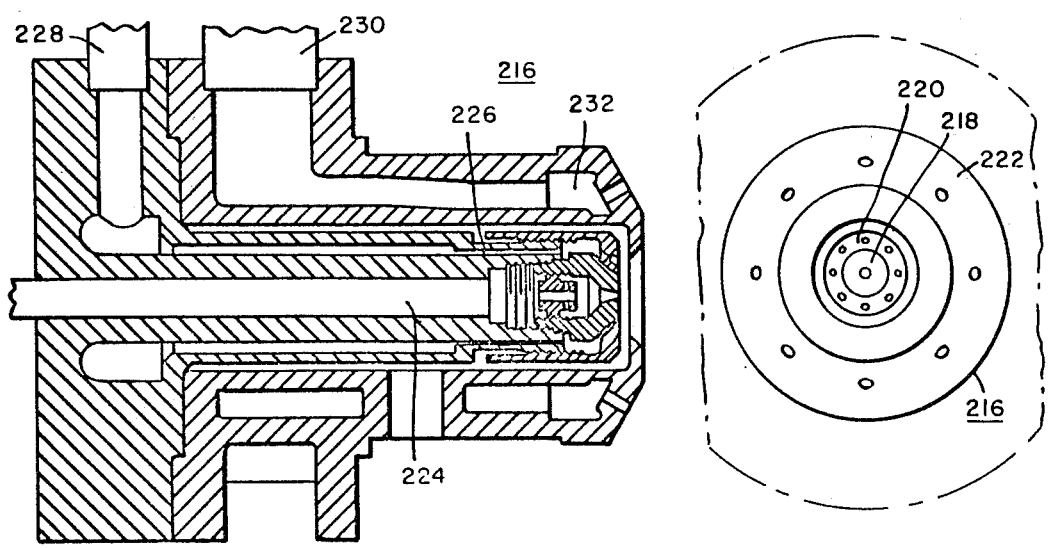
FIG. 6
FIG. 5

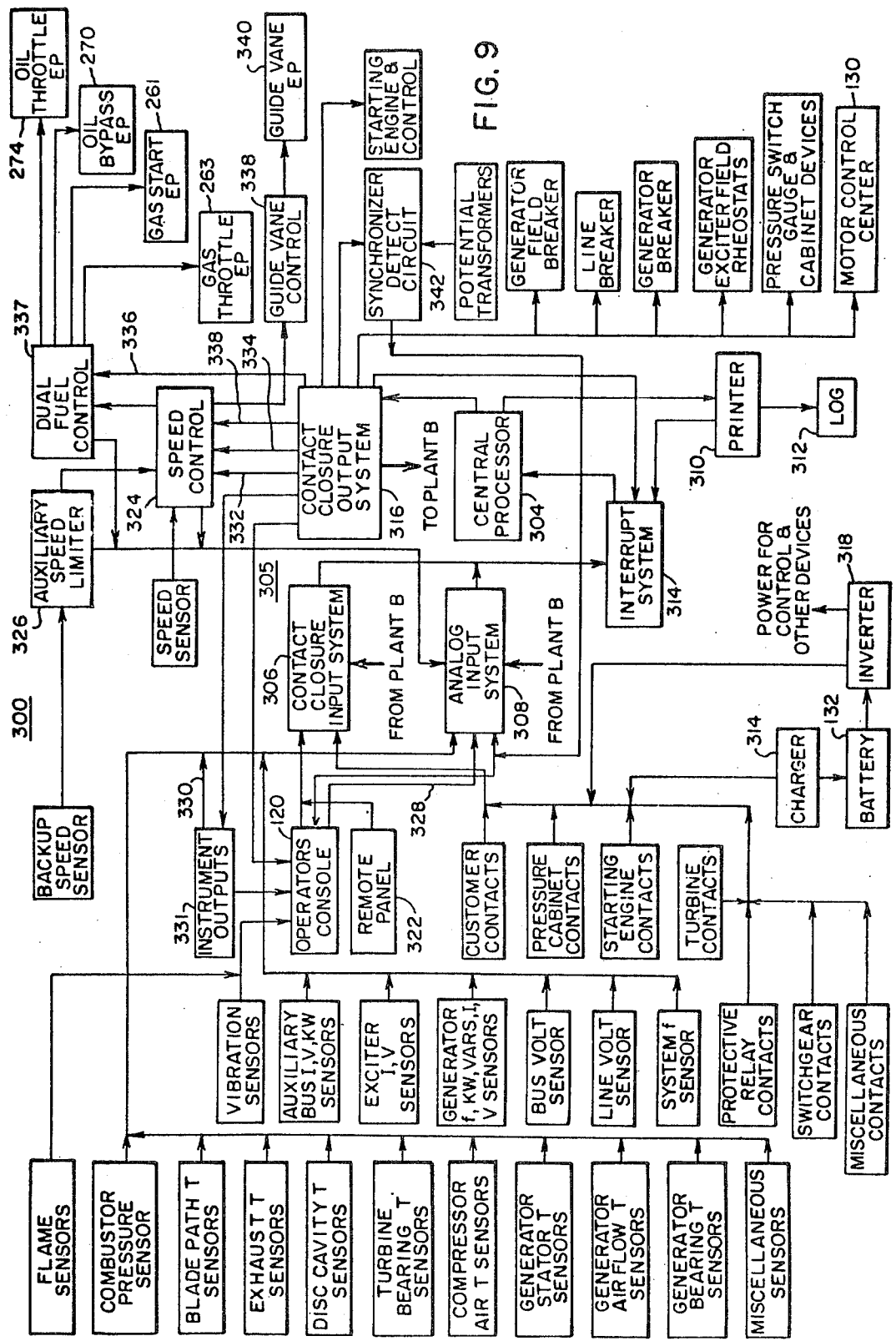

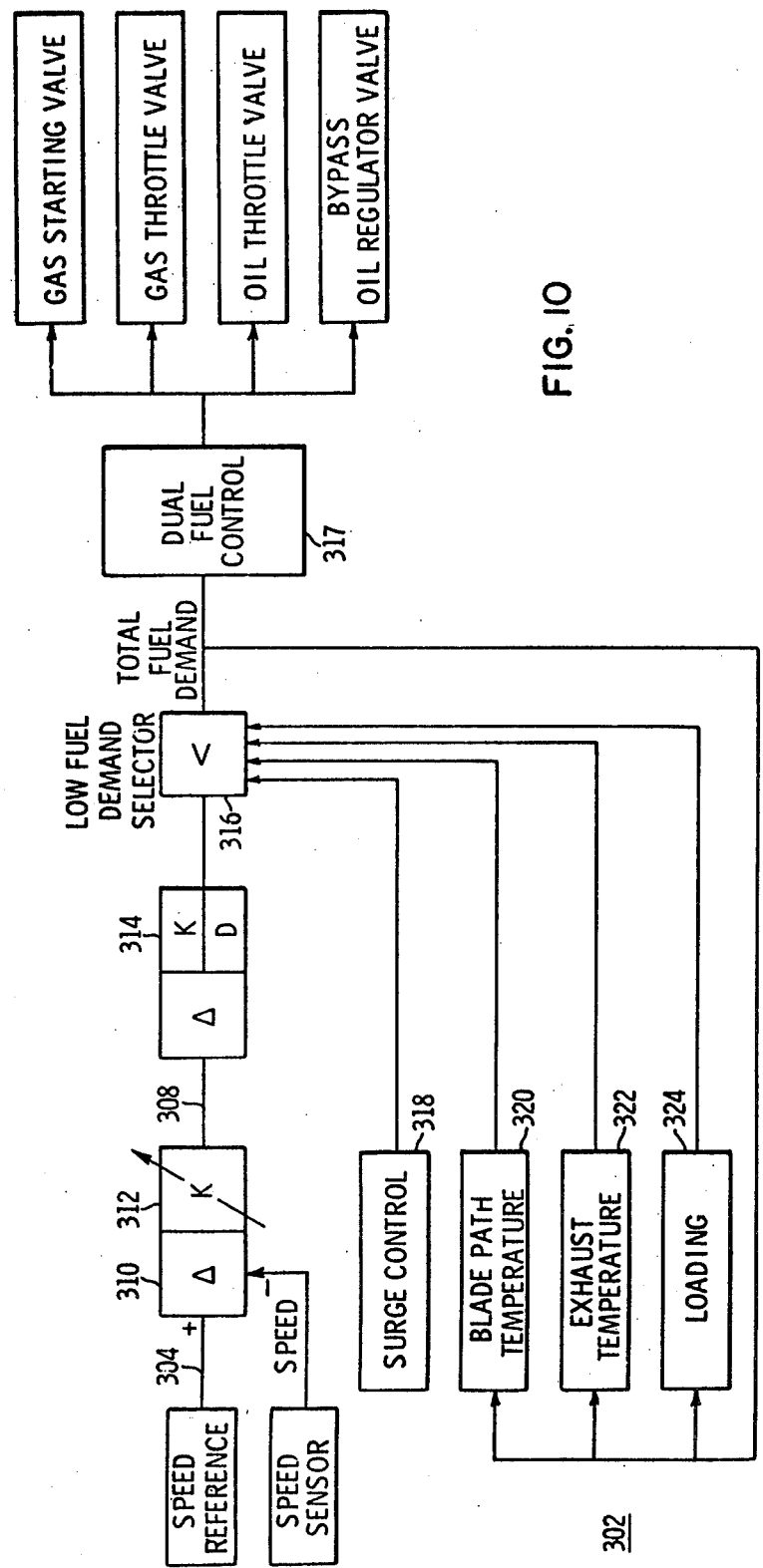

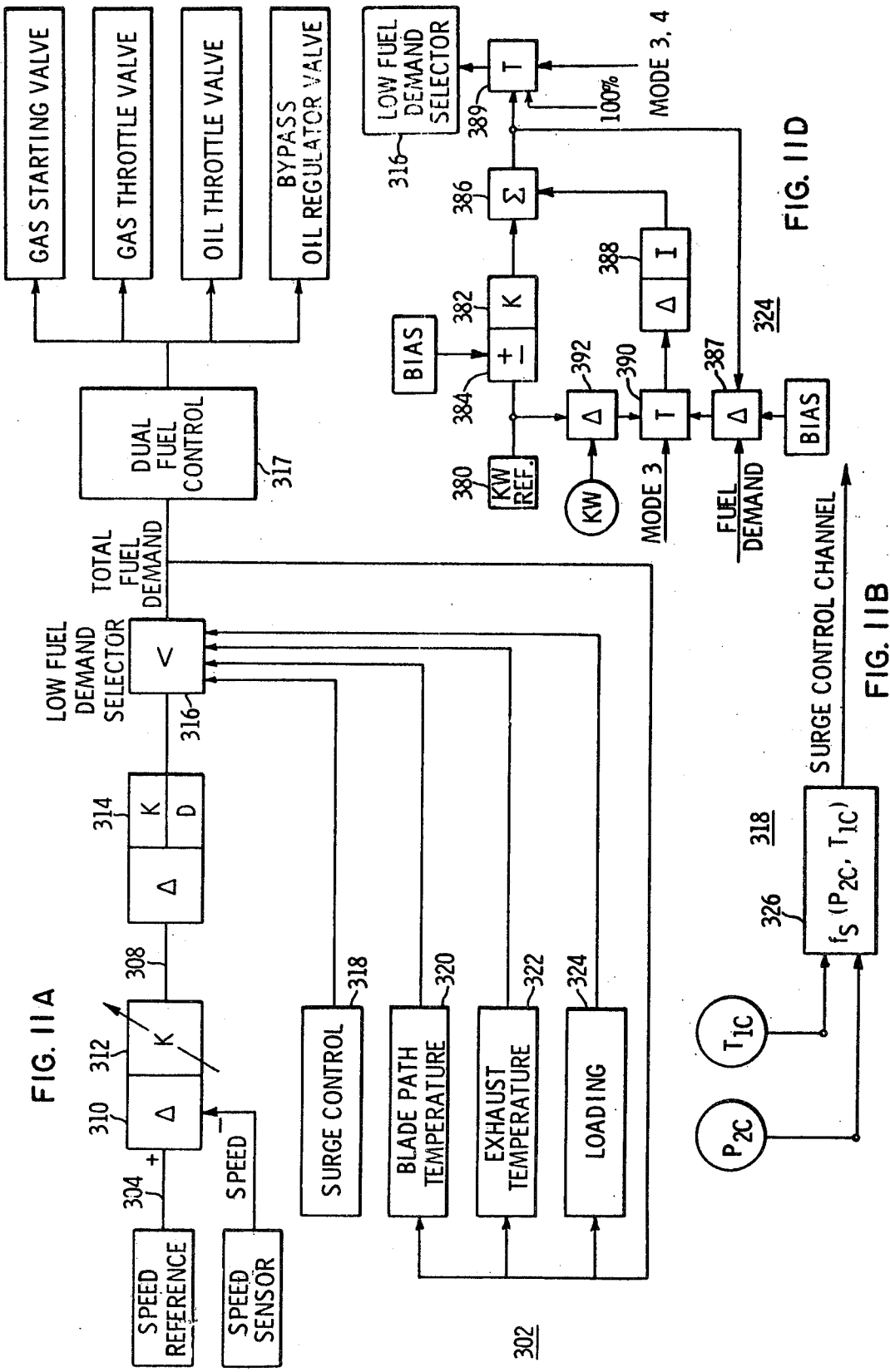

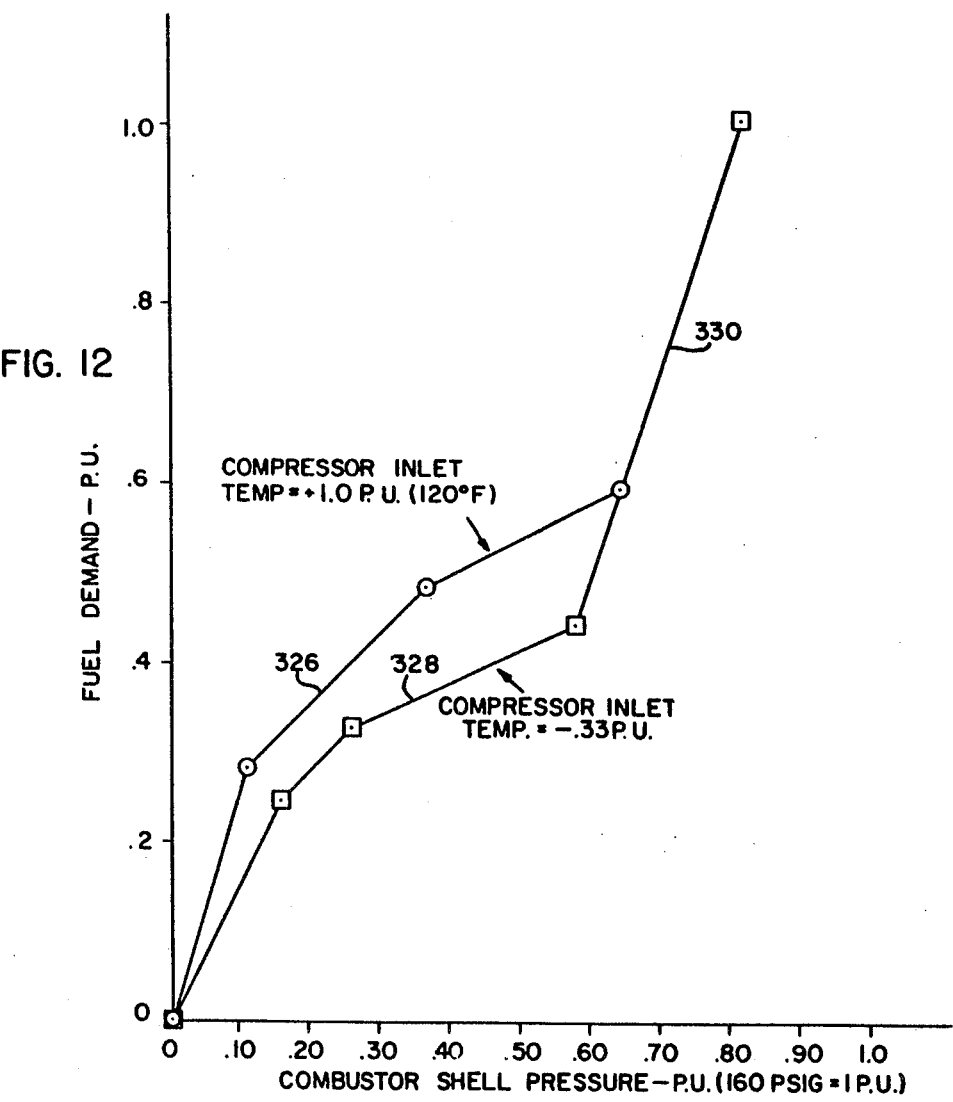

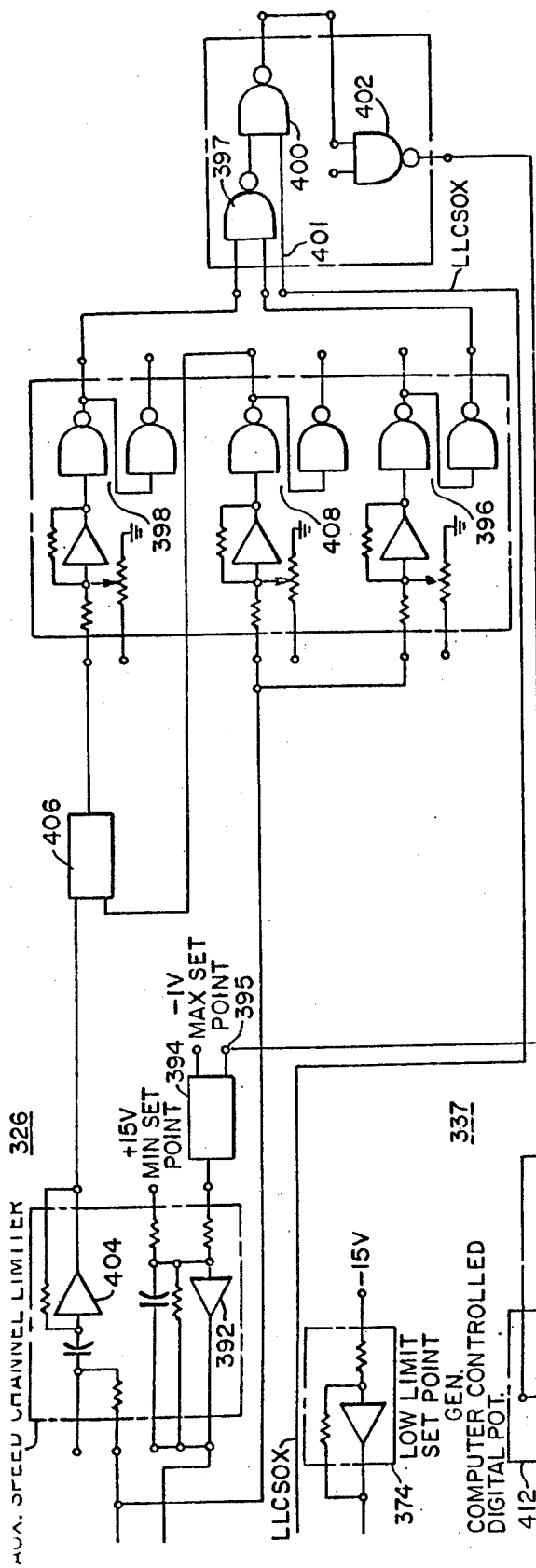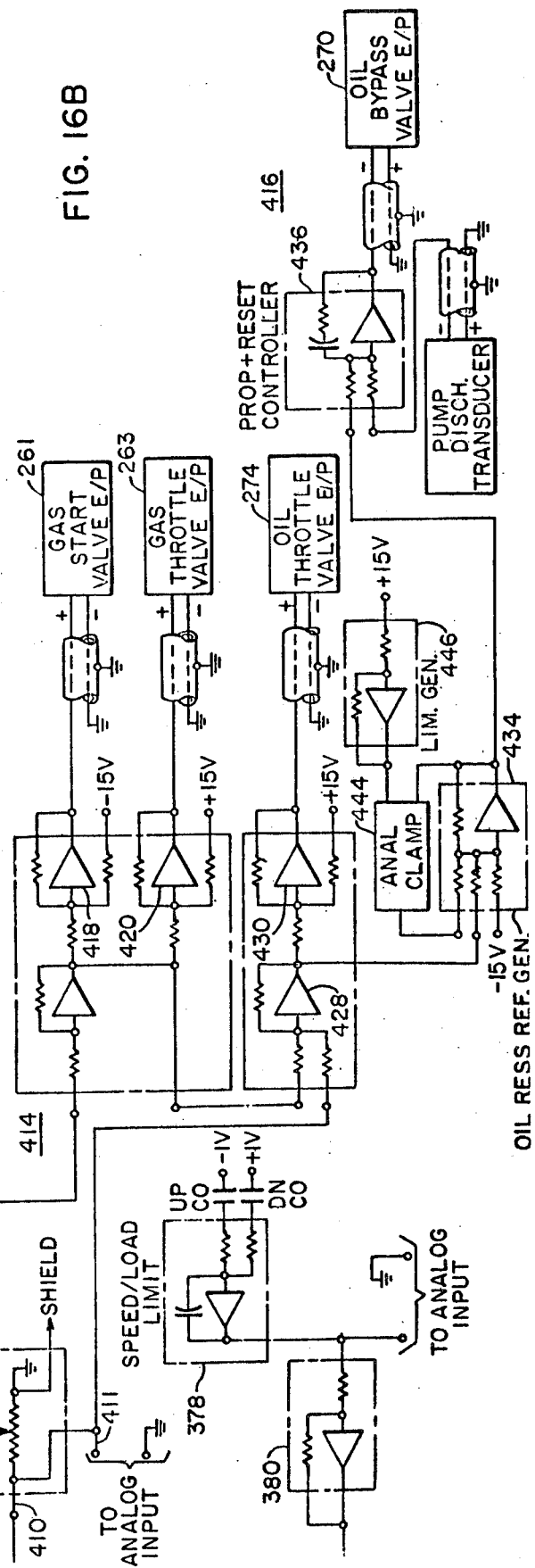
FIG. 16B

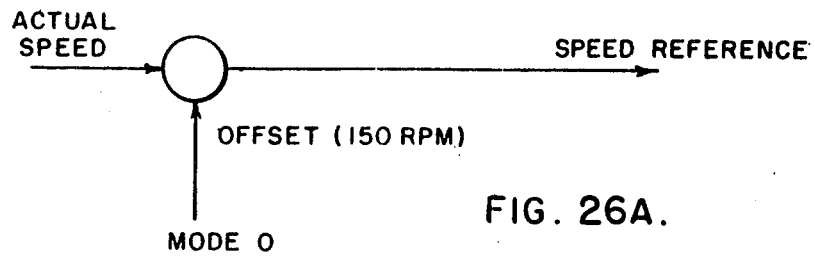
FIG. 26A.
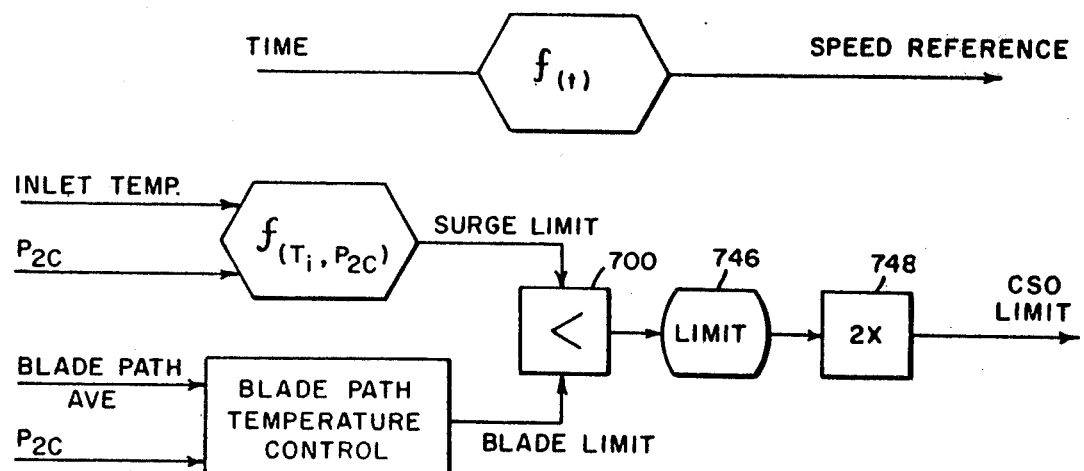
FIG. 26B
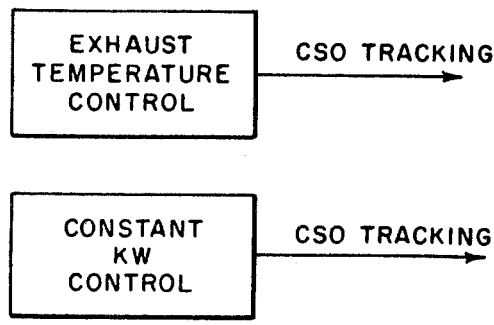
MODE I

SYSTEM AND METHOD FOR MONITORING INDUSTRIAL GAS TURBINE OPERATING PARAMETERS AND FOR PROVIDING GAS TURBINE POWER PLANT CONTROL SYSTEM INPUTS REPRESENTATIVE THEREOF

This is a division, of application Ser. No. 234,491 filed Mar. 14, 1972.

CROSS-REFERENCES TO RELATED APPLICATIONS

Ser. No. 082,470 filed by J. Reuther and T. Giras, entitled "System and Method for Operating Industrial Gas Turbine Apparatus and Gas Turbine Electric Power Plants Preferably with a Digital Computer Control System", and assigned to the present assignee.

Ser. No. 082,469 filed by R. Kiscaden and R. Yannone, entitled "System and Method for Accelerating and Sequencing Industrial Gas Turbine Apparatus and Gas Turbine Electric", and assigned to the present assignee.

Ser. No. 082,467, now U.S. Pat. No. 3,898,439, filed by J. Rankin and T. Reed, entitled "Improved Control Computer Programming Method and Improved System and Method for Operating Industrial Gas Turbine Apparatus", and assigned to the present assignee.

Ser. No. 155,905 filed by R. Yannone and T. Reed, entitled "Improved System and Method for Monitoring and Controlling Operation of Industrial Gas Turbine Apparatus and Gas Turbine Electric Power Plants Preferably with a Digital Computer Control System" and assigned to the present assignee.

Ser. No. 189,632 filed by R. Yannone and R. Kiscaden entitled "Improved Digital Computer Control System And Method For Monitoring And Controlling Operation of Industrial Gas Turbine Apparatus To Drive Simultaneously An Electric Power Plant Generator and Provide Exhaust Gases To An Industial Process," and assigned to the present assignee.

Ser. No. 189,633 filed by J. Reuther and T. Reed, entitled "Improved Digital Computer Control System And Method For Monitoring And Controlling Operation Of Industrial Gas Turbine Apparatus Employing Expanded Parametric Control Algorithm," and assigned to the present assignee.

Ser. No. 234,580, now U.S. Pat. No. 3,924,140, filed by R. Yannone, entitled "Improved System And Method For Monitoring And Controlling Industrial Gas Turbine Power Plants Including A Facility For Dynamic Calibration Of Control Instrumentation," and assigned to the present assignee.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses the gas turbine may have one or more shafts and many other rotor, casing, support, and combustion system structural features which can vary relatively widely among differently designed units. They may be aviation jet engines adapted for industrial service as described, for example, in an ASME paper entitled "The Pratt and Whitney Aircraft Jet Powered 121MW Electrical Peaking Unit" presented at the New York Meeting in November-December, 1964.

Gas turbine electric power plants are usable in base load, mid-range load and peak load power system applications. Combined cycle plants are normally usable for the base or mid-range applications, while the power plant which employs a gas turbine only as a generator drive typically is highly useful for peak load generation because of its relatively low investment cost. Although the heat rate for gas turbines is relatively high in relation to steam turbines, the investment savings for peak load application typically offsets the higher fuel cost factor. Another economic advantage for gas turbines is that power generation capacity can be added in relatively small blocks such as 25MW or 50MW as needed for expected system growth, thereby avoiding excessive capital expenditure and excessive system reserve requirements. Further background on peaking generation can be obtained in articles such as "Peaking Generation," a Special Report of Electric Light and Power dated November, 1966.

Startup availability and low forced outage rates are particularly important for peak load power plant applications of gas turbines. Thus, reliable gas turbine startup and standby operations are particularly important for power system security and reliability.

In the operation of gas turbine apparatus and electric power plants, various kinds of controls have been employed. Relay-pneumatic type systems form a large part of the prior art. More recently, electronic controls of the analog type have been employed as perhaps represented by U.S. Pat. No. 3,520,133 entitled "Gas Turbine Control System" and issued on July 14, 1970 to A. Loft, or by the control referred to in an article entitled "Speedtronic Control, Protection and Sequential System," and designated as GER-2461 in the General Electric Gas Turbine Reference Library. A wide variety of controls have been employed for aviation jet engines including electronic and computer controls as described, for example, in a March, 1968 ASME Paper presented by J. E. Bayati and R. M. Frazzini, and entitled "Digatec" (Digital Gas Turbine Engine Control), an April, 1967 paper in the Journal of the Royal Aeronautical Society authored by E. S. Eccles and entitled "The Use Of A Digital Computer For On-Line Control Of A Jet Engine," or a July, 1965 paper entitled "The Electronic Control Of Gas Turbine Engines" by A. Sadler, S. Tweedy and P. J. Colburn in the July, 1965 Journal of the Royal Aeronautical Society. However, the operational and control environment for jet engine operations differs considerably from that for industrial jet turbines. In referencing prior art publications or patents as background herein, no representation is made that the cited subject matter is the best prior art.

In connection with prior art gas turbine electric power plant operating and control systems and operating methods therefor, reference is made to copending related application Ser. No. 082,470 which, in conjunction with other enumerated related patent applications, comprises a description of an improved gas turbine plant operating and control system. The present disclosure represents a further advancement over the prior art discussion herein contained and should be considered as exclusive of the referenced application.

Generally, the operation of the industrial gas turbine apparatus and gas turbine power plants has been limited in flexibility, response speed, accuracy and reliability.

Further limits have existed in the efficiency or economy with which single or multiple units are placed under operational control and management. Control loop arrangements and control system embodiments of such arrangements for industrial gas turbines have been less effective in operations control than is desirable. Limits have also existed on how close industrial gas turbines can operate to the turbine design limits over various speed and/or load ranges.

More particularly, in gas turbine control, substantially continuous monitoring of turbine parameters accurately reflecting operating conditions at the various operation cycle positions is essential. Optimum operation over a wide range of operating conditions can be assured only by such monitoring and by reliable, accurate control loop response to variations in one or more of such parameters. Further, certain critical parameters must be continuously sensed in order to prevent damage to combustor elements, hot parts, rotor blades, etc., in the event of over-temperature or overload conditions.

Process sensors of various types have been employed to furnish control system inputs. For example, temperature and pressure sensors have been located at various turbine cycle positions and in varying configurations.

Accurate reliable temperature and pressure indications have been increasingly recognized as essential to maintaining the integrity of a system having one or more control loops wherein it is sought to control turbine speed and/or load in response to a temperature and/or pressure derived fuel demand signal. During turbine startup, accurate combustor shell pressure indications have been found to be of particular importance. Again, under load accurate pressure readings may become essential to efficient operation.

During those modes of operation characterized principally by temperature control, the accuracy and reliability of such indications determine the degree to which optimum operating conditions may be attained. A description of an improved control system employing optimally arranged turbine system thermocouples, suitable for use in the gas turbine electric power plant of the present invention, may be found in copending application Ser. No. 155,905.

As gas turbine automatic control system developed, it became increasingly essential to obtain reliable temperature and pressure indications for use as control parameters in developing a fuel control input in the various control modes of operation. It became necessary to continuously review such measurements, not only for the purpose of assuring reliable, safe operation, but further to insure the availability of control variables which would enable efficient operation of the gas turbine near design limits to thereby enhance overall efficiency of the automatic control system. Known prior art control systems have lacked a facility for deriving consistently accurate control variables representative of critical parameters such as turbine inlet temperature, combustor shell pressure and turbine exhaust temperatures.

Although known prior art gas turbine control systems have provided multiple control loops in part responsive to temperature and pressure inputs, difficulties in obtaining continuous control over all operating modes has persisted, in a large part, as a result of an inability to obtain precise temperature and pressure inputs over a broad range of operating conditions. Over some portions of gas turbine operation, for example, temperature measuring errors and poor response of temperature measuring instrumentation have produced thermal lag so that response to step impulse inputs has been inadequate to achieving the highly responsive and flexible control necessary in most applications of gas turbine apparatus. Clearly, an alternative to temperature control has been indicated, in order to reduce undesirable thermal transients. Controlling as a function of combustor shell pressure over this interval of gas turbine operation presents an immediate alternative. However, problems have persisted in such control as hereinbefore indicated.

Problems encountered in controlling fuel system operation as a function of compressor shell pressure during gas turbine start-up and during subsequent modes of operation have indicated reliance on other operating parameters to achieve positive control during this time interval. Characteristically, such systems have not provided adequate control over a broad range of ambient temperatures. Variations in such ambient temperatures are known to cause significant variations in internal temperatures which may shorten the life of turbine components, such as blading and the like. A characteristic prior art control system calls for an initial shot of fuel upon detection of flame at light-off, with a subsequent cut-back from the initial impulse level to reduce thermal shock to hot path parts. At the end of the warm-up period, positive control is resumed as a function of temperature or acceleration. Clearly, such control is inadequate to preventing the effects of thermal transient or thermal shock to the critical turbine components.

Various methods and apparatus exist for obtaining, calibrating and displaying instantaneous values of critical turbine operating parameters. Characteristically, however, calibration of various instrumentation employed in obtaining control system inputs has been limited to a one-time setting prior to turbine start-up of instruments to indicate extreme values on a known scale, e.g., alignment of the particular dial at the zero and maximum setting, for example, a combustor shell pressure transducer provides readings from zero to 160 psig. Previously, calibration procedures had suggested an alignment of a dial at zero and 160 with an implicit assumption that increments between the two extreme values will be linearly a function of combustor shell pressure. Nowhere is there suggested in known prior art control systems a facility for dynamically correcting for transducer error. Prior art controllers have had no facility for remembering the zero point as read when the unit was shut down so that re-zeroing might be accomplished during gas turbine operation. For the foregoing and for other reasons, difficulties have existed in obtaining the reliable, accurate combustor shell pressure indications necessary to the provision of responsive surge control during gas turbine start-up and during the other operating modes of industrial gas turbine apparatus. Dynamic calibration techniques have been lacking so that calibration before start-up has been relied upon exclusively. Specifically a variety of field experiences have demonstrated particular problems in calibrating combustor shell pressure transducers so that they repeat exactly to a zero reading after shut-down. The readings in the vicinity of 0 pounds are very critical during the initial light-off period since, as discussed previously, combustor shell pressure is desirably considered in preventing compressor surge during this period. Variations in zero setting cause greatly varying light-off temperature control as verified by recorder traces taken in the field. Certain, otherwise adequate control algorithms and systems dictate inhibition of start-up if the pressure transducer is uncalibrated by more than one half pound at the zero point. Thus the problem of transducers repeating to zero pounds has affected availability and reliability.

SUMMARY OF THE INVENTION

One or more industrial gas turbines or gas turbine power plants are operated by a control system which preferably is a programmed digital computer in a hybrid control system arrangement preferably to control fuel flow and thereby provide load and loading rate control over the turbine and generator or other load unit and further provide speed, surge and temperature limit control with nonlinear control loop characterization. Control loop integrity is enhanced by dynamic testing of control system input parameters and correction of process instrumentation calibration errors.

More specifically, as regards control system actions in response to deviation of process sensor inputs from predetermined calibrated limits, programmed computer operations are performed on a periodic basis to correct predictable excursions so that error free control variables are available for further processing. Combustor shell pressure readings are thus corrected to provide highly accurate compressor surge limiting essential to accurate fuel scheduling during critical light-off period.

BRIEF DESCRIPTION OF THE DRAWINGS

FIGS. 4-6 show a fuel nozzle and parts thereof employed in the gas turbine of FIG. 3;

FIG. 9 shows a block diagram of a digital computer control system employed to operate the gas turbine power plant of FIG. 1;

FIG. 10 shows a bock diagram of a control loop which may be employed in operating the computer control system of FIG. 9 and the power plant of FIG. 1;

FIGS. 12, 13 and 14 illustrate various curve data employed in the control system computer in the operation of the gas turbine power plant;

FIGS. 16A and 16B show a schematic diagram of analog circuitry associated with the computer in the control system to provide control over gas turbine fuel supply system operations and certain other plant functions;

FIGS. 26A-D show respective control configurations of software elements associated respectively with Mode 0 through Mode 4 operations;

DESCRIPTION OF THE PREFERRED EMBODIMENT

A. POWER PLANT

1. General Structure

Figure 1:
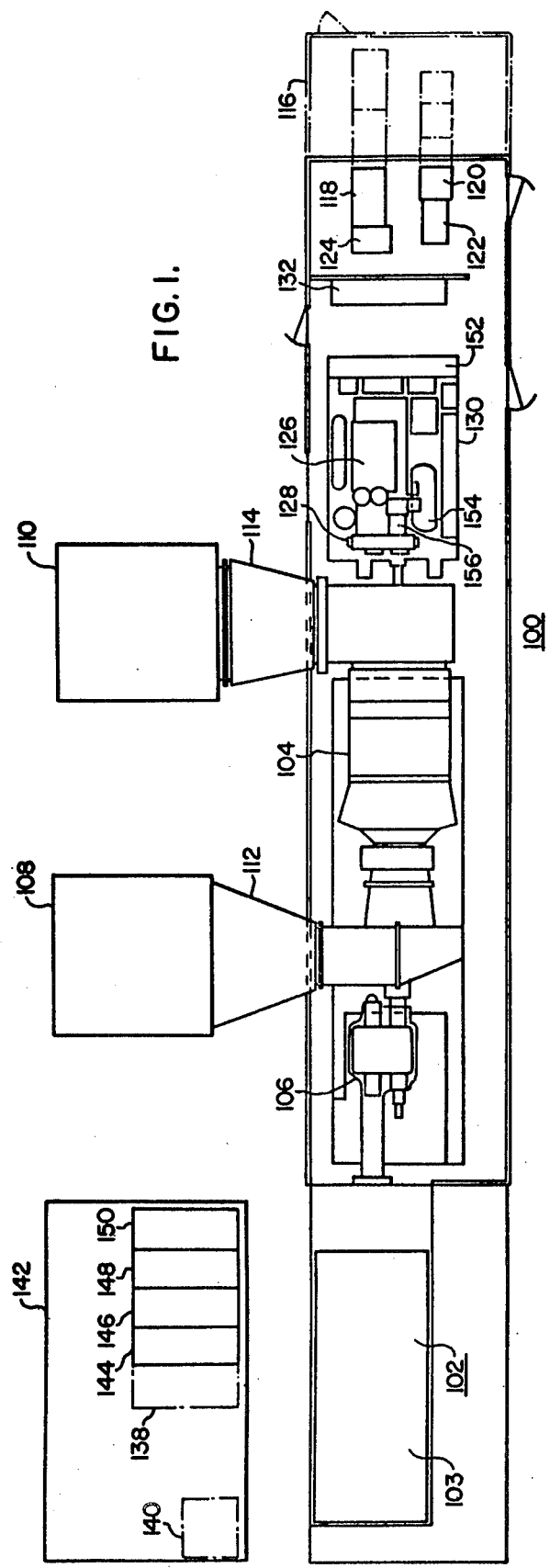
FIG. 1 shows a top plan view of a gas turbine power plant arranged to operate in accordance with the principles of the invention.

More particularly, there is shown in FIG. 1 a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristicly associated with turbine power plants.

Digital computer and other control systems circuitry in a cabinet 118 provides for operation of the power plant 100 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor loads, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

2. Generator and Exciter

Figure 2:
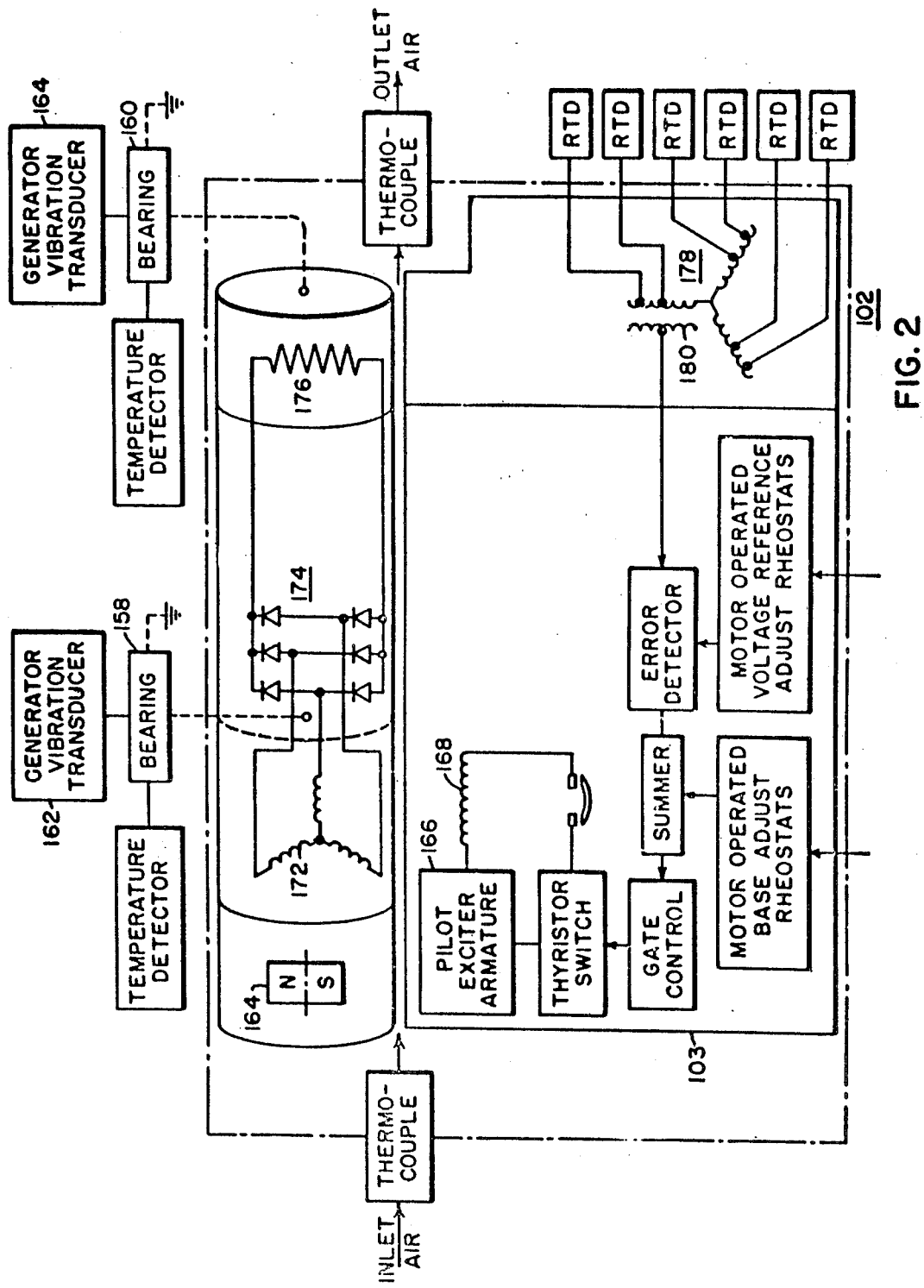
FIG. 2 shows a schematic view of a rotating rectifier exciter and a generator employed in the gas turbine power plant of FIG. 1.

The generator 102 and its brushless exciter 103 are schematically illustrated in greater detail in FIG. 2. Structural details as well as details of operation are considered more fully in the aforementioned copending application Ser. No. 082,470, Section A2, pages 21 to 24.

Briefly, a permanent magnet field member 164 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 17 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

3. Gas Turbine a. Compressor

Figure 3:
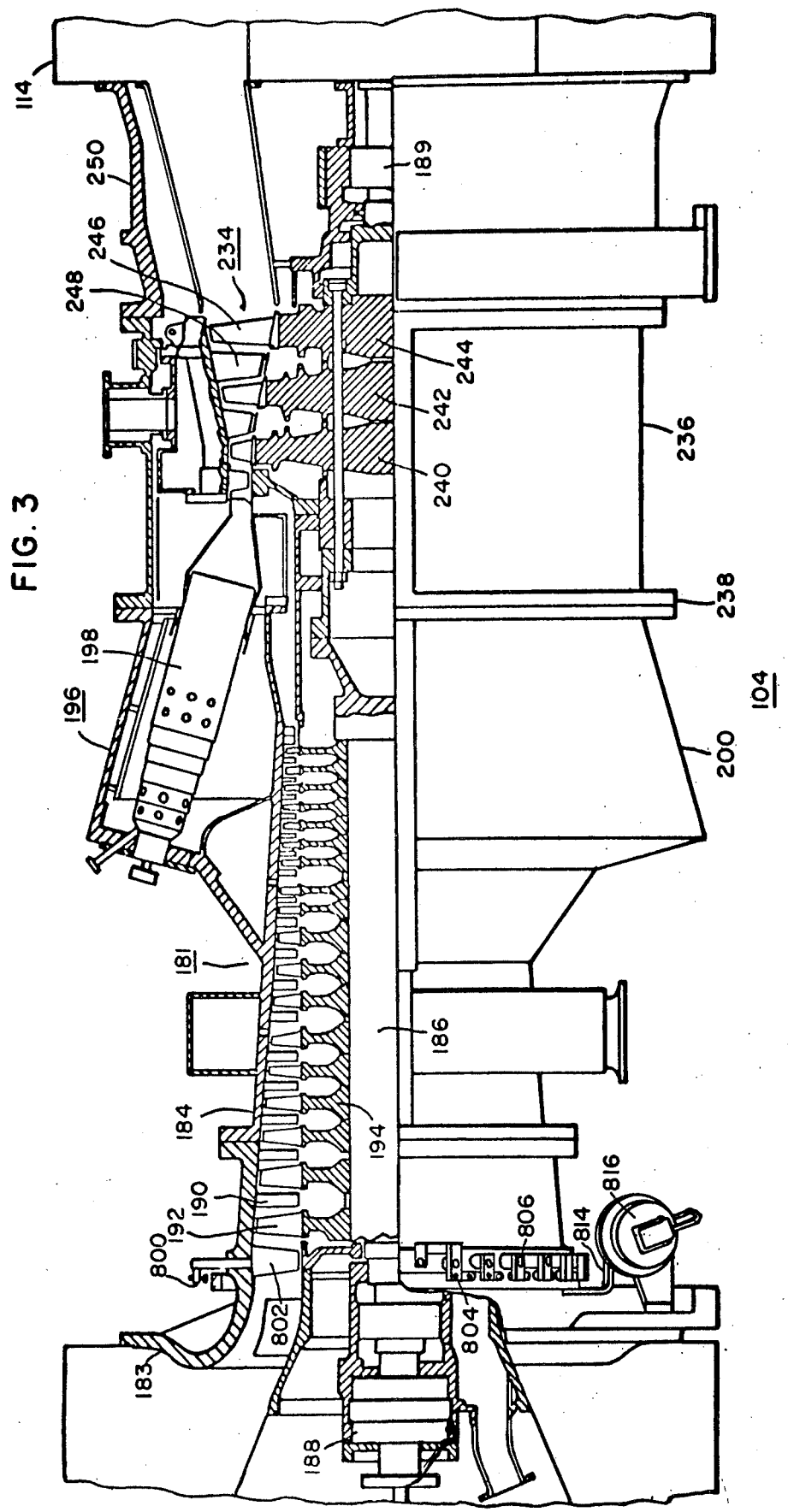
FIG. 3 shows a front elevational view of an industrial gas turbine employed in the power plant to drive the generator and it is shown with some portions thereof broken away.

The gas turbine 104 in this case is the single shaft simple cycle type having a standard ambient pressure ratio of 9.0 to 1 and a rated speed of 4894 rpm and it is illustrated in greater detail in FIG. 3. Filtered inlet air enters a multistage axial flow compressor 181 through a flanged inlet manifold 183 from the inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 182.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 9) are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

The compressor inlet air flows annularly through a total of eighteen stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples (FIG. 9).

b. Combustion System

Pressurized compressor outlet air is directed into a combustion system 196 comprising a total of eight combustor baskets 198 conically mounted within a section 200 of the casing 184 about the longitudinal axis of the gas turbine 104. In accordance with one aspect of the principles of the present invention control system inputs representative of combustor shell pressure are obtained by a suitable strategically located, sensor (FIG. 9) coupled to the compressor combustor flow paths located in the pressure switch and gauge cabinet 152. The pressure detector/transducer can for example, be one such as that described in Product Bulletin (PB)-107–109 published by Hagan Computer and Instrumentation Division of Westinghouse Electric Corporation and designated "Transducer High Pressure Model-109."

As schematically illustrated in FIG. 4, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 are associated with each of the end combustor baskets in the respective basket groups in order to verify ignition and continued presence of combustion in the eight combustor baskets 198. The flame detectors 212 can for example be Edison flame detectors Model 424–10433.

In FIG. 5, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle is disposed about the atomizing air nozzle 220 to complete the assembly of the fuel nozzle 216.

As indicated in the broken away side view in FIG. 6, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 110 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234 (FIG. 3). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas into turbine rotation, i.e. to drive the compressor 181 and the generator 102. The turbine rotor is formed by a stub shaft 240 and three disc blade assemblies 240, 242 and 244 mounted on the stub shaft by through bolts. Thermocouples (FIG. 9) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

Figure 15:
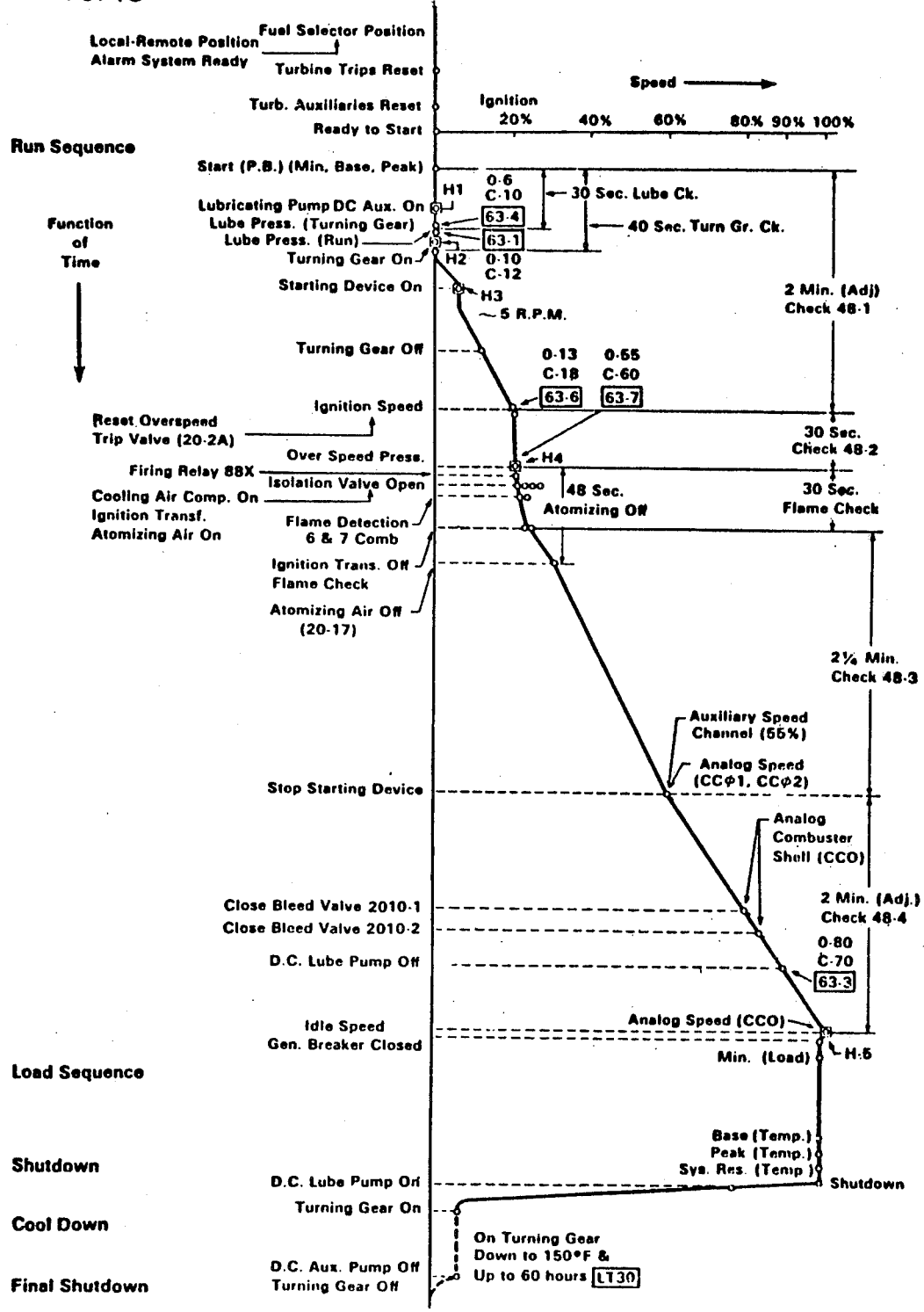
FIG. 15 shows a sequence chart for startup and shutdown of the gas turbine power plant.

The generator and gas turbine vibration transducers (FIG. 9) can be conventional velocity transducers or pickups which transmit basic vibration signals to a vibration monitor for input to the control system. A pair of conventional speed detectors (FIGS. 9 and 15A) are associated with a notched magnetic wheel (FIG. 15A) supported at appropriate turbine-generator shaft locations. Signals generated by the speed detectors are employed in the control system in determining power plant operation.

Thermocouples (FIG. 9) are associated with the gas turbine bearing oil drains. Further, thermocouples (FIG. 9) for the blade path are supported about the inner periphery of the exhaust manifold 250 to provide a fast response indication of blade temperature for control system usage particularly during plant startup periods. Exhaust temperature detectors (FIG. 9) are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

e. Fuel System

Figures 7, 8:
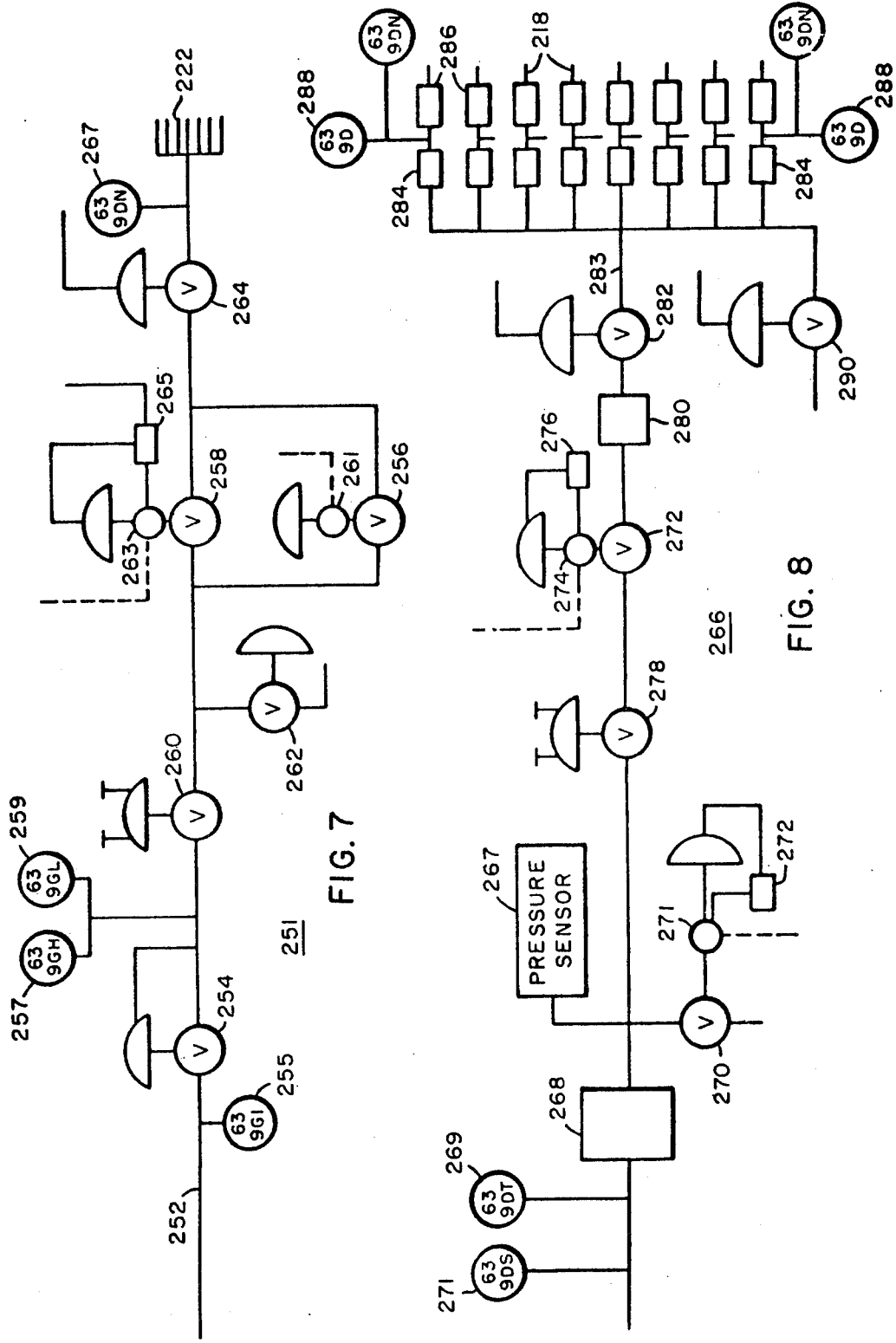
FIGS. 7 and 8 respectively show schematic diagrams of gas and liquid fuel supply systems employed with the gas turbine of FIG. 3.

A fuel system 251 is provided for delivering gaseous fuel to the gas nozzles 222 under controlled fuel valve operation as schematically illustrated in FIG. 7. Gas is transmitted to a diaphragm operated pressure regulating valve 254 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switch-gear device numbers are generally used herein where appropriate as incorporated in American Standrad C37.2-1956.

A starting valve 256 determines gas fuel flow to the nozzles 222 at turbine speeds up to approximately 10% rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110% rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 9). A pressure switch 267 indicates fuel pressure at the inlet to the nozzle 222.

As schematically shown in FIG. 8, a liquid fuel supply system 26 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 269. A bypass valve 271 is pneumatically operated by an electro-pneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 272 is held at a minimum position during the ramp pressure control action on the discharge pressure regulator valve 270. A pressure switch 269 provides for DC backup pump operation on low pressure, and a pressure switch 271 indicates whether the pump 268 has pressurized intake flow.

After pressure ramping, the pneumatically operated throttle valve 272 is positioned to control liquid fuel flow to the nozzle 218 as determined by an electropneumatic converter 274 and a booster relay 276. An electric control signal determines the converter position control action for the throttle valve 272. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, in the gas fuel system 251, an electrically actuated and pneumatically operated isolation valve provides on/off control of liquid fuel to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzle 218. A manifold drain valve 290 is pneumatically operated under electric signal control during turbine shutdown to drain any liquid fuel remaining in the manifold 283.

4. Plant Performance Characteristics

Details concerning plant performance characteristics are contained in the aforementioned related application Ser. No. 082,470, Section A4, pages 32 to 36.

B. Power Plant Operation And Control

1. General

The preferred embodiment of the integrated turbine generator control system 300 (FIG. 9) employs analog digital computer circuitry to provide sequenced start-stop plant operation, monitoring and alarm functions for plant protection and accurately, reliably and efficiently performing speed/load control during plant startup, running operation and shutdown. The plant control system 300 is characterized with centralized systems packaging having a single operator's panel and embracing elements disposed in the control cabinet 118, the pressure switch and gauge cabinet 152 and other elements included in the electric power plant 100 of FIG. 1. If multiple plants like the power plant 100 are to be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be unattended and operated by direct wired remote or supervisory control.

2. Control Loop Arrangement - Characterization

In FIG. 10 a control loop arrangement 302 represented by SAMA standard function symbols characterizes the preferred general control looping embodied in the preferred control system 300 and applicable in a wide variety of other applications of the invention. Reference is made to the aforementioned copending application Ser. No. 082,470, Section B2, pages 39 and 51, wherein there is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made in FIG. 10 between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better overall power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322. Thus, the operation of the plural control loop 302 as a function of the various limit representations varies during the various control modes of operation.

At the output of the low fuel demand selector 316 the fuel demand representation is applied to a dual fuel control 317 where the fuel demand signal is processed to produce a gas fuel demand signal for application to the gas starting and throttle valves or a liquid fuel demand signal for application to the oil throttle and pressure bypass valve or a combination of gas and liquid fuel demand signals for application to the gas and oil valves together.

In order to start the plant 100, the control system 300, operating in control Mode 0, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes a feedforward characterization is preferably used to determine representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably non-linear in accordance with the non-linear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The fuel demand in the control arrangement 302 provides position control for turbine gas or liquid fuel valves. Further, the control arrangement 302 can provide for simultaneous burning of gas and liquid fuel and it can provide for automatic bumpless transfer from one fuel to the other when required.

As will be appreciated from the foregoing discussion control arrangement 302 is implemented such that different process variables are given greater weight in determining the control function to be performed as control progresses sequentially through the various modes of operation. Attention is directed to the critical startup period from light off to attainment of synchronous speed. It is within this time frame of reference that surge control is of particular importance in minimizing risk of exceeding gas turbine design temperature limits. The surge control 318 includes a characterization block 325 which responds to sensed combustor shell pressure and compressor inlet temperature to generate the surge limit representation for compressor surge prevention as illustrated in FIG. 11B.

Referring to FIG. 12, the curve 326 limits startup fuel demand for an ambient temperature of 120° F and the curve 328 limits startup fuel demand for an ambient temperature demand of −40° F. (Common curve portions 330 are operative to provide a substantially linear surge limit during subsequent load operations.

Figure 11C:
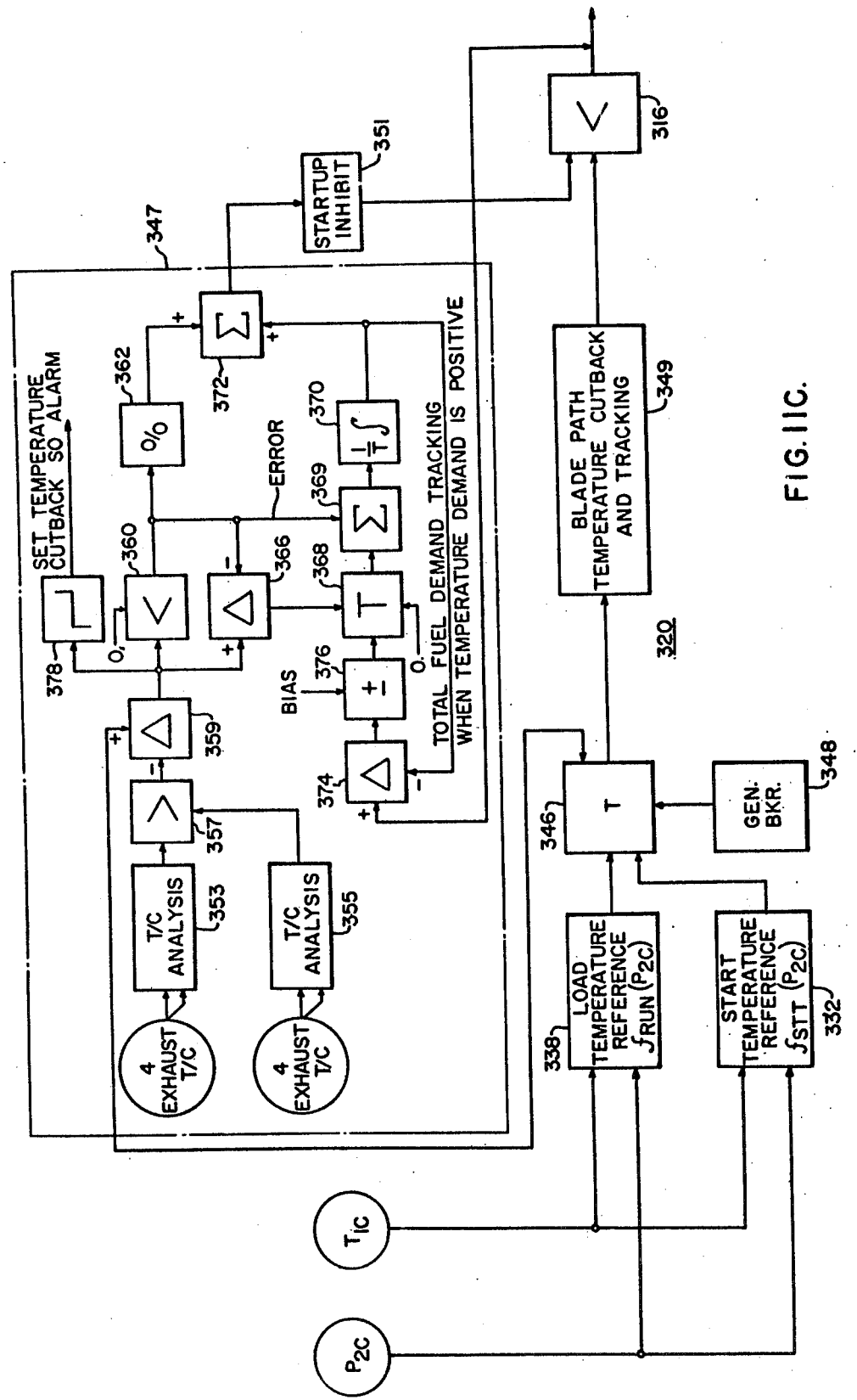
FIGS. 11A-B show schematic diagrams of control loops which may be employed in operating the computer control system of FIG. 9 and the power plant of FIG. 1.
Figure 13:
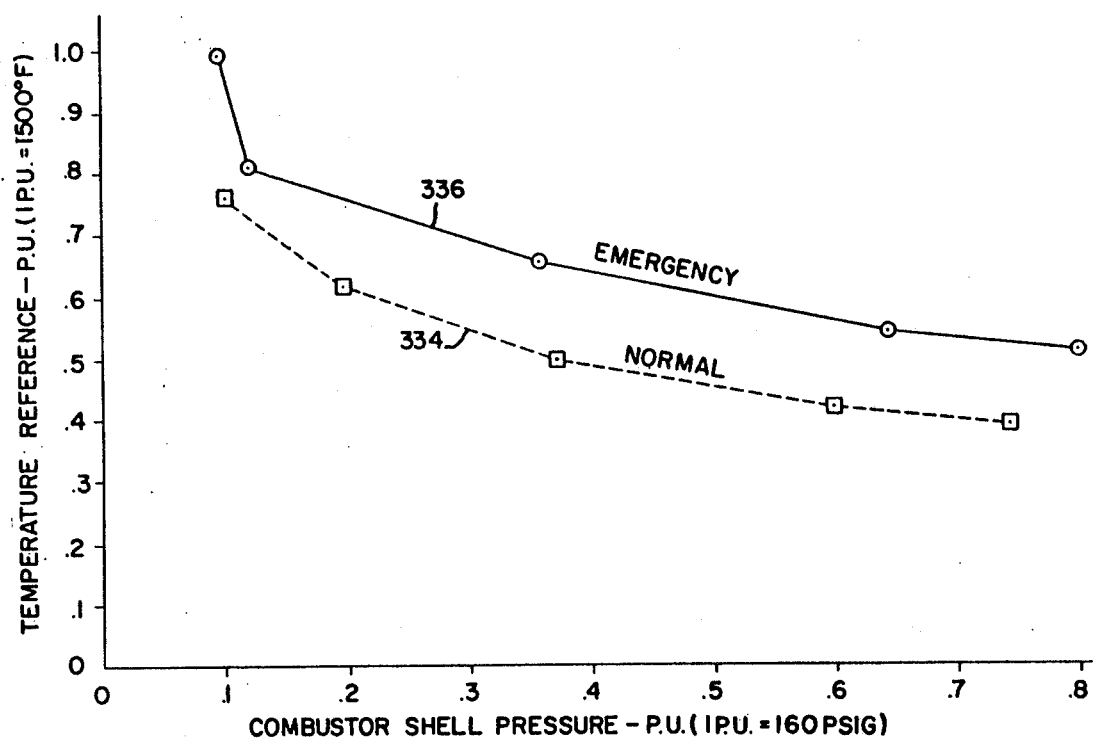
Figure 14:
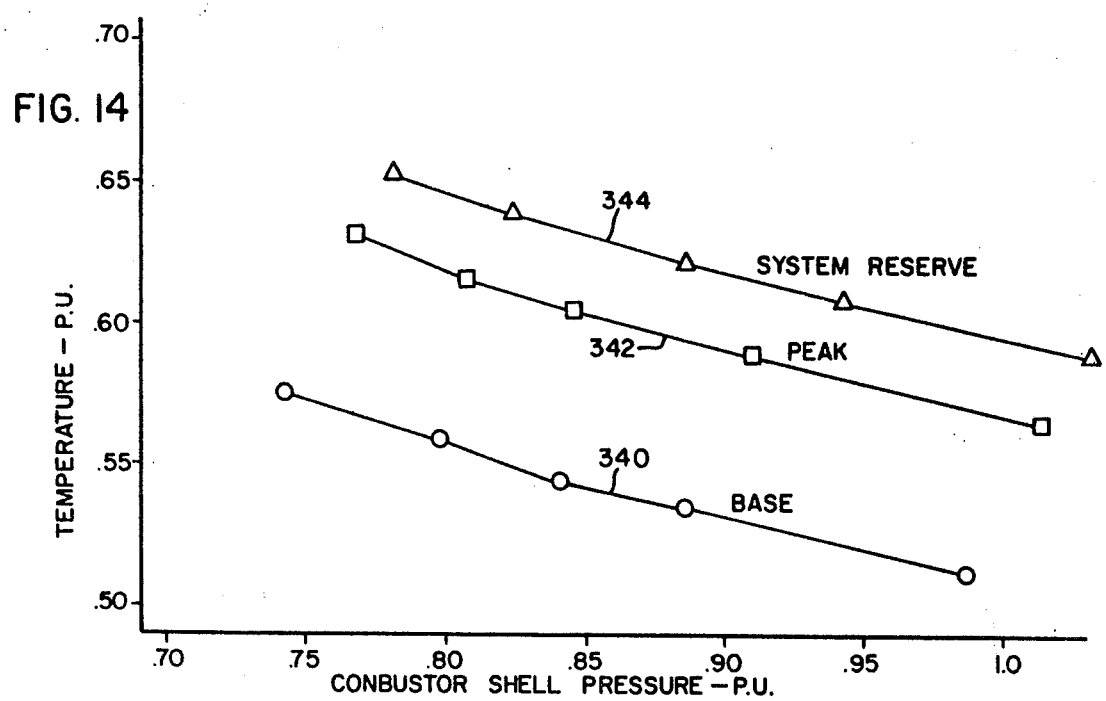

As shown in FIG. 11C, the blade path temperature control 320 includes a block 332 which responds to combustor shell pressure in accordance with a preferably nonlinear temperature reference characteristic 334 for normal startup and a second preferably nonlinear temperature reference characteristic 336 for emergency startup as illustrated in FIG. 13. The exhaust temperature control 332 includes a block 338 which responds to combustor shell pressure in accordance with temperature reference characteristic 340 for base load operation, 342 for peak load and 344 for system reserve load operation as shown in FIG. 14. Again each characteristic is preferably nonlinear. The startup curves 334 and 336 correspond respectively to 1200° and 1500° F turbine inlet temperature while the load curves correspond to respectively higher values of turbine inlet temperature operations.

The control loop features described above provide the most accurate and reliable turbine control during startup operations, i.e., over the operation time interval indicated control as a function of combustor shell pressure is found to be the most reliable. Difficulties in metering fuel and firing at low speeds are overcome. Low air flow, further complicated by temperature measuring errors and slow response of temperature sensors creates a control environment in which parametric fuel scheduling, required to reduce thermal transients, is highly desirable. Thermal shock, contributing to considerable wear and early deterioration of turbine components, is significantly reduced.

As will be hereinafter more fully described, the control system implemented in accordance with the principles of the present invention provides for positive highly responsive control over all modes of turbine operation. The low fuel demand select features in the described system allow precise control consistent with satisfying the most appropriate constraint at any given time. Instruments known to provide the best indications of operating conditions at any given time are calibrated dynamically yielding error free control variables, significantly enhancing accurate response.

Control over early time intervals as a function of combustor shell pressure eliminates problems encountered in systems wherein approximate fuel requirements dictate initial scheduling at a level corresponding to an impulse step control input. As seen by a reference to FIGS. 12, 13 and 14, temperature and pressure is simultaneously considered in deriving a most favorable fuel schedule for efficient operation.

3. Control System

The control system 300 is shown in block diagram detail in FIG. 9. It includes a general purpose digital computer system comprising a central processor 304 and associated input/output interfacing equipment such as that sold by Westinghouse Electric Corporation under the trade name Prodac 50 (P50). Generally, the P50 computer system employs a 16,000 word core memory, with a word length of 14 bits and a 4.5 microsecond cycle time.

More specifically, the interfacing equipment for the computer 304 includes a contact closure input system 306 and a conventional analog input system 308. Sixty-four input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 306 and the analog input system 308. The contact closure input (CCI) system is coupled to the operator console panel 120 and remote operator's panel 322. Characteristic CCI's are those related to the starting engine contacts. Also, a facility exists for customer selection of devices to be coupled to the CCI system.

Characteristic inputs to the analog input system 308 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 308 through an analog speed control 324 and an auxiliary speed limiter 326, respectively.

The computer supplies essential outputs of various description for display at the operator's console 120 or the like. They are also applied as analog inputs as indicated by reference character 330. The contact closure output system 316 transfers digital speed reference, speed/load limit and fuel transfer outputs to its external circuitry as indicated respectively by the reference characters 332, 334 and 336.

The coupling of the contact closure output system 316 with the analog speed control 324 is within the framework of the preferred software/hardware hybrid control system. Another contact closure output 338 to the analog speed control 324 provides for a minimum fuel flow into the turbine combustor system in order to prevent flameout after ignition.

An analog dual fuel control system 337 is operated by the speed control 324 to determine the position of the liquid and gas fuel valves considered in connection with FIGS. 9 and 10. A contact closure output coupling to the dual fuel control 337 provides for transfer between fuels or relative fuel settings for two fuel or single fuel operation as indicated by the reference character 336.

The contact closure output system 316 is also connected to the operator's panel 120 and to sequence the starting engine 126. A synchronizer detection circuit 342 has bus line and generator potential transformers coupled to its input and the contact closure output system 316 signal provides a visual panel indication for manual synchronization. The detection circuit 342 supplies signals to the analog input system 308 for automatic synchronization when such synchronization is employed as considered more fully in the aforementioned Reuther and Reed copending patent applications.

Other devices operated by the contact closure outputs include the generator field breaker and the generator line breakers 132 and 137. The motor operator generator exciter field rheostat 171 and 177 and various devices in the motor control center 130 and the pressure switch and gauge cabinet 152 also function in response to contact closure outputs. The printer or teletype 310 is operated directly as a special input/output channel to the main frame 304. A guide vane control circuit 338 is also operated by the speed control 324 to control the position of the guide vanes through a guide vane electropneumatic converter 340 which actuates the positioning mechanism.

The foregoing is an abbreviated specification of a control system employed in implementing the preferred embodiment of the present invention, suitable for use in gas turbine electric power plant control. A more complete discussion of the preferred control system may be found in the aforementioned copending application Ser. No. 082,470, Section B3, pages 51 to 62.

Analog Circuitry

Figure 16A:
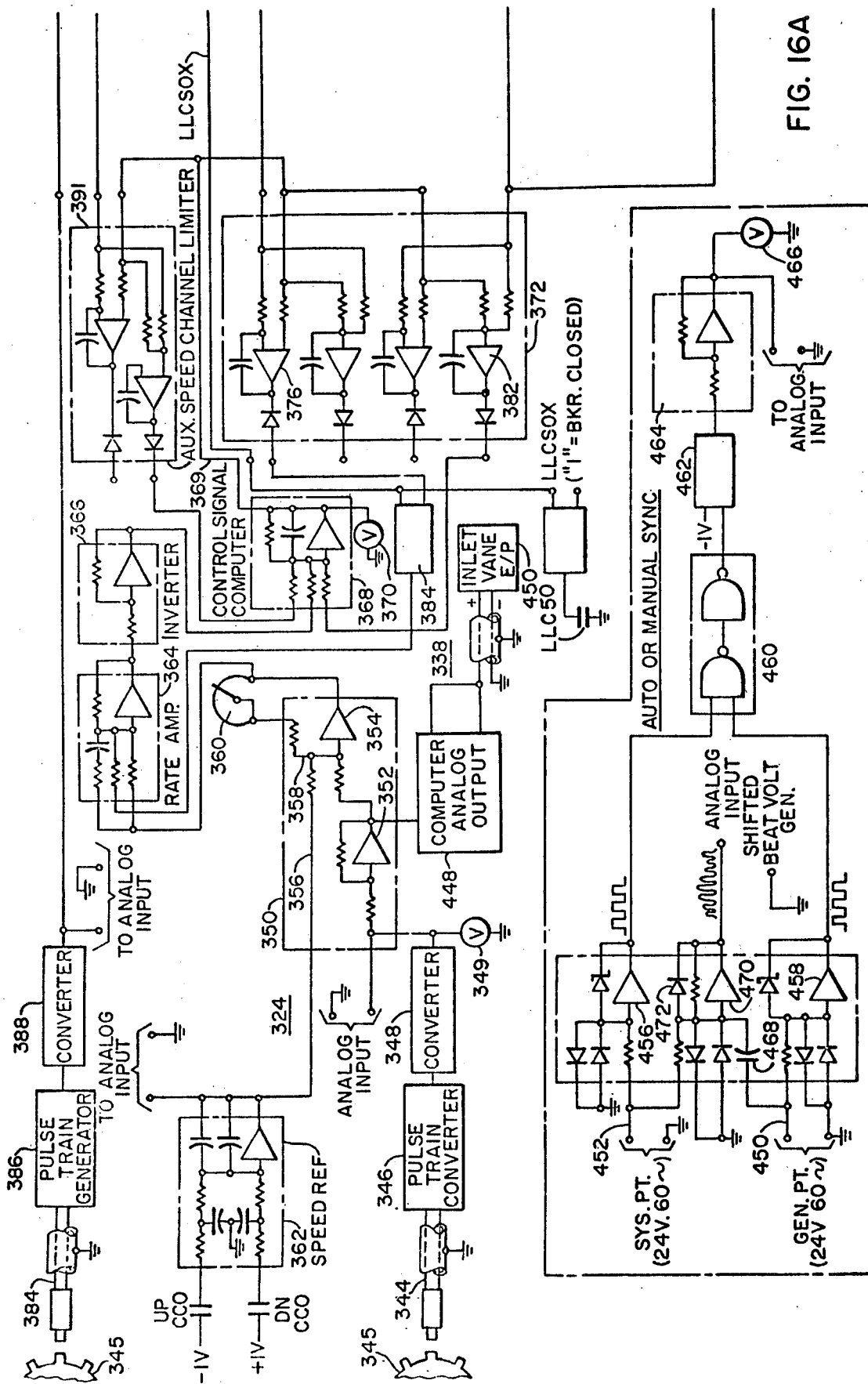

The speed control circuit 324 operates in response to a main speed signal generated by a main turbine speed sensor 344 associated with a 44 tooth magnetic rotor wheel 345 as shown in greater detail in FIG. 16A. The main speed signal is converted into a sinusoidal output waveform having a constant width pulse at twice the input frequency. To derive a representation of the actual turbine speed, circuit block 348 converts the pulse train into a proportional direct voltage output which is then applied to error detector circuit block 350 and to analog input system 308 (FIG. 9).

A speed reference signal 356 derived from an analog output circuit block 362 and a speed regulation feedback signal 358 are also inputs to circuit block 350. The speed reference signal is determined from a digital command value generated by the computer.

Within circuit block 350 actual speed and speed feedback regulation signals are added to the speed reference signals to determine a speed error output signal. In the absence of fuel demand limit action, the speed error, amplified in circuit block 368, is generated on line 369 as the fuel demand signal, or, contact signal output (CSO), and input to the fuel control system 337. Monitoring is provided by meter 370.

Low and high limits are generated by setpoint signal generators 374 and 378 and imposed on the fuel demand signal in circuit block 372 by clamp amplifiers 376 and 382, respectively.

A backup speed limit is imposed on a backup speed limiter 326 in a manner similar to the foregoing. As will be readily appreciated, there exists a one-to-one functional correspondence between circuit elements 344 and 384, 346 and 386, 348 and 388 and other elements shown as similarly disposed in the schematic diagram depicted in FIG. 16A.

Additional clamp amplifier circuit 390 and speed limiter setpoint generator 392 cause the fuel demand signal output from circuit block 368 to be cut back to a predetermined minimum value if either of two logic conditions is satisfied. The first of such conditions is the operation of the turbine in excess of 108% of rated speed. An auxiliary speed signal is applied to the input of comparator circuit 396 which generates an output signal for application to an OR circuit 397 when the speed signal is too high. As shown, AND circuit 402 responds if LLCSOX exists, to generate a switching signal via the logic inverter 402.

In a like manner a speed derivative signal is processed to detect as a second logic condition an excess acceleration between 102 and 108% of rated speed, such that, upon comparison with a predetermined acceleration limit and determination in circuit block 398 that the speed derivative signal is greater, an output to logic switch 394 is generated and coupled to the control input of clamping amplifier 390 as already described. The fuel demand signal generated at the output of the fuel demand amplifier 368 accordingly is representative of the fuel needed to satisfy the computer generated speed reference, the fuel needed to satisfy a computer determined limit action, the low limit fuel demand needed to prevent flameout during normal speed operations, or to cause turbine speed cutback without flame-out when overspeed conditions are detected by the auxiliary speed limiter circuit 326.

At an input 410 to the duel fuel control system 337 the fuel demand signal is applied across a computer controlled digital potentiometer 412 which is illustrated schematically as an analog potentiometer. The fuel demand signal is also applied to the computer analog input system 308 for programmed computer operations. The total fuel demand signal is ratioed between the gas fuel control systems 414 and 416 to produce the individual fuel flows which satisfy gas turbine operation demands.

The gas fuel demands signal is applied to signal range adjuster amplifiers 418 and 420 which provide predetermined operation characterization for the gas start valve and the gas throttle valve respectively. A signal range adjuster amplifier 424 operates on the liquid fuel demand signal to produce control on the liquid fuel throttle valve electropneumatic converter again, in accordance with a predetermined operation characterization. Additional liquid fuel control is provided by a pressure reference generator 434 and a rate controller 436 which serve to operate the liquid fuel bypass valve electropneumatic converter 270 in accordance with a predetermined pump discharge pressure characterization.

The inlet guide vane control 338 considered previously in connection with FIG. 9 may include a controller 448 which generates a guide vane position control signal as a linear function of the sensed speed signal derived from the error detector block 350 in the main speed channel. The subject is considered in greater detail in copending related applications Ser. Nos. 189,632 and 189,633.

Additional functions performed by the analog system indicated in FIG. 9, as well as a more definite discussion of those elements enumerated above may be found in copending application Ser. No. 082,470, pages 63 to 74.

Control Panels

The operator's panel considered in connection with FIG. 1 is included as part of an operator's console through which various process control functions may be initiated or altered. Additionally, process monitoring is provided in the form of various meters and alarms.

Among the general control functions provided are the following:
 a. Breaker pushbutton control,
 b. Automatic synchronization ON/OFF,
 c. Synchronizing mode selection.

Control functions which may be included specific to the gas turbine, are as follows:
 a. Normal start/stop,
 b. Emergency start/stop,
 c. Fuel selection,
 d. Automatic fuel transfer.

Flexible generator control is provided in the form of panel functions which permit selection of manual or automatic voltage regulation.

Alarm condition indicators are provided by alarm lights and a horn blow. Typical conditions giving rise to alarm status indications are those pertaining to system failures during startup. Alarms are provided which are associated with specific process monitoring devices such as generator vibration detectors, combustor basket flame detectors, and blade path and exhaust manifold thermocouples. A facility is provided for initiating computer determined alarm status responsive control functions.

In the preferred embodiment increased control flexibility is achieved through the provisions of one or more remote control panels which, desirably, duplicate the functions of the local operator's panel.

A detailed discussion of the control panels may be found in the aforementioned copending application Ser. No. 082,470, at pages 74 through 97 thereof. Included is a listing of local and remote operator's panel contact closure output assignments, and a description of the entering of control parameter changes into the control system 300.

D. PROGRAM SYSTEM

1. General Configuration

Figure 17:
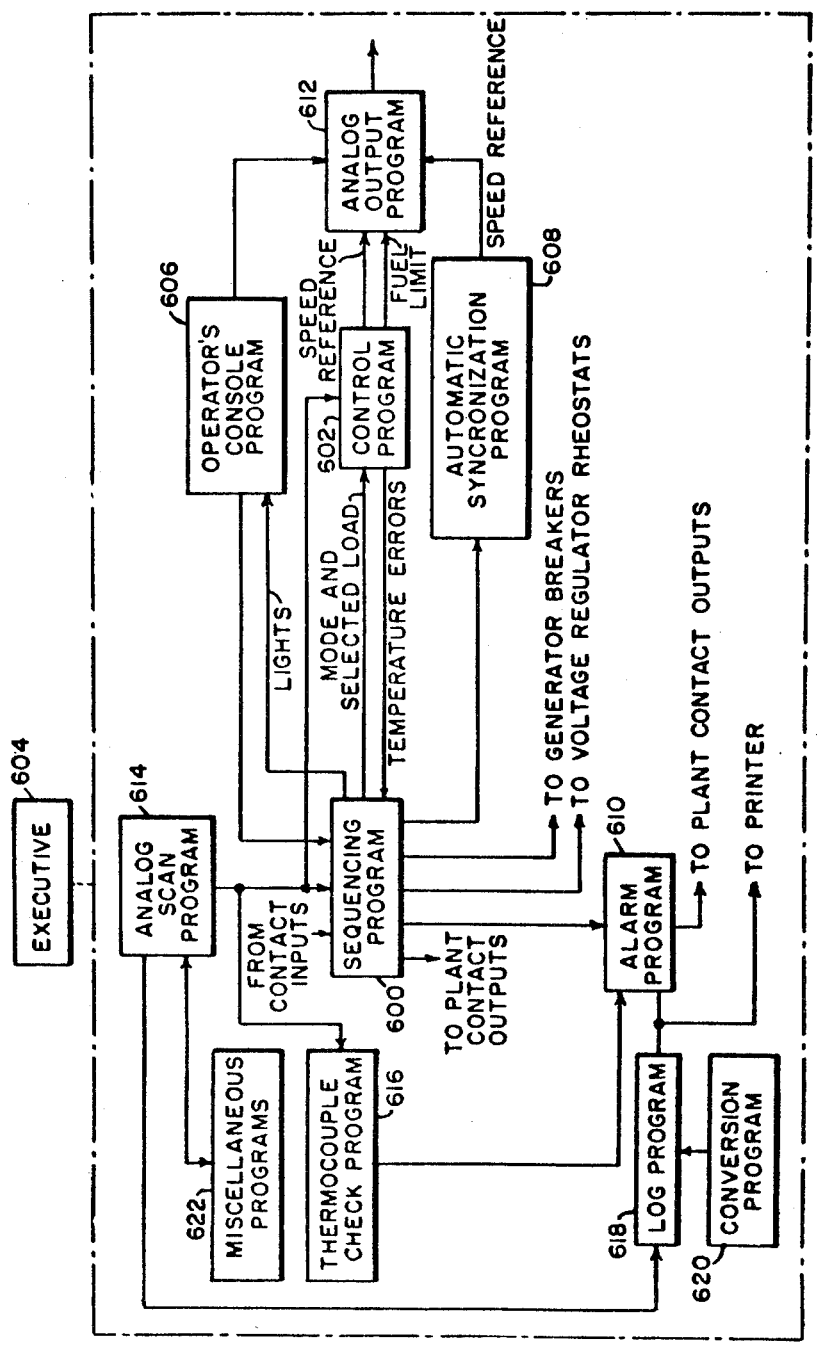
FIG. 17 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 17, the program system comprises a sequencing program 600 and a control program 602 which make most of the plant operational determinations for output to the control system interfacing and control hardware. An executive program 604 schedules the use of the computer 304 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 17, the sequencing program 600 supervises the control program 602 by specifying the control mode and the selected load. The control program 602 transmits data to the sequencing program 600 including for example hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing prgoram 600 processes manual synchronization operation. It also transmits lamp light determinations to the opertor's console program 606 and alarm determinations to an alarm program 610.

The operator's console program 606 is a package of subprograms which provides for interfacing the operator's panel 120 with the computer 304. The alarm program 610 provides for printout of detected alarms.

During the various mode of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequencing program 600 or the control program 602 and generates an alarm for alarm program printout when a thermocouple reading indicates an open circuit.

A log program 618 operates in conjunction with a conversion program 620 to generate a periodic printout of the values of predetermined analog inputs. Other programs included in the program system are classified as miscellaneous programs 622.

2. Executive System

In the program system, the individual programs are repeatedly executed under control of executive program 604, typically with only the program variables changed. An executive priority system consisting of sublevel structured dominant and secondary levels defines the order in which programs are executed.

Dominant sublevel programs are executed according to real time, i.e. a program which is first bid is executed first if two programs are bidding to run simultaneously. Secondary sublevel programs are executed according to a preestablished hierarchy.

3. Programmer's console Package

The programmer's console programs are provided to facilitate communication with the P50 computer. Generally, the console package provides a means for loading programs into the computer, executing programs, loading contants or instructions and dumping areas of main and extended core memory. Core locations can be dumped in binary on tape or in octal on a keyboard. The programmer's console package operates within the priority structure of the executive program 604, and its elements are generally classified as a part of that program.

4. Operator's Console Program

Figure 22:
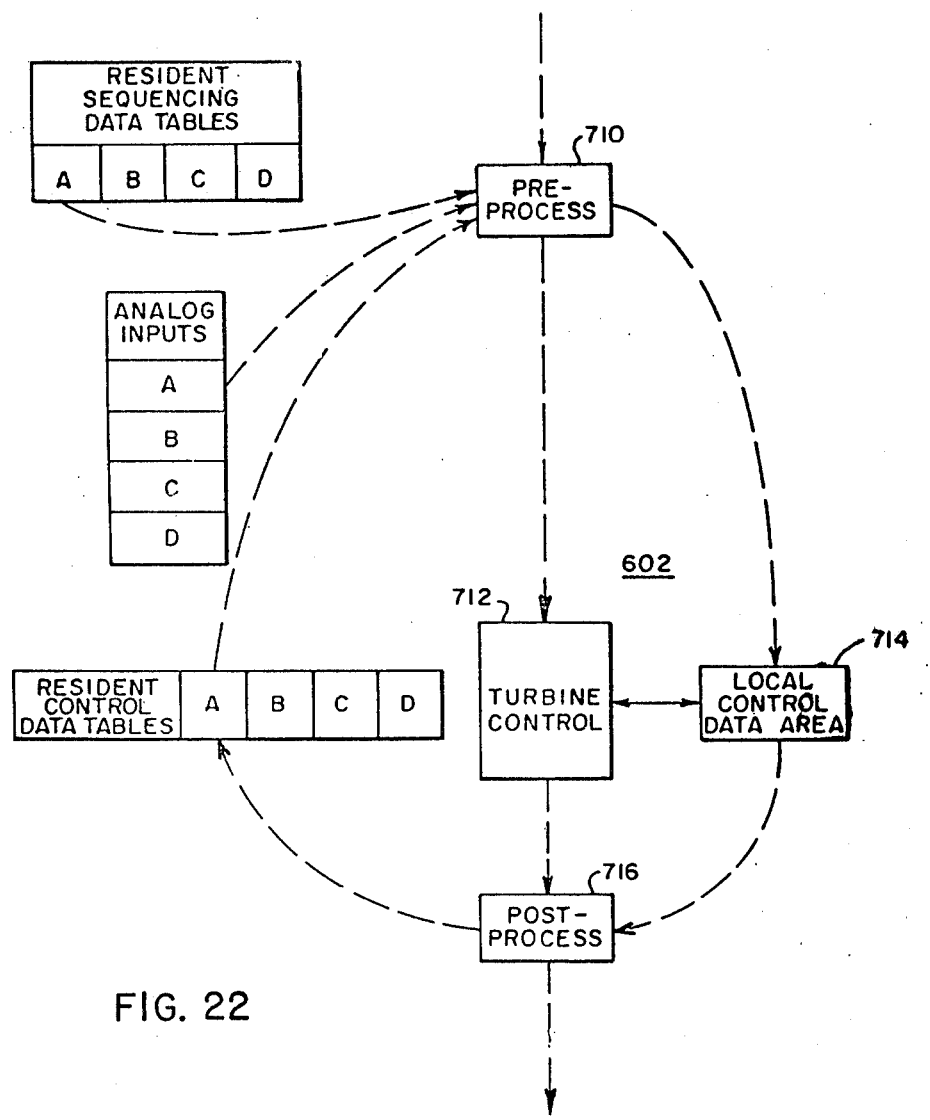
FIG. 22 shows a data flow diagram associated with control program operations during controlled operation of multiple gas turbine power plants with a single control computer.

As indicated in FIG. 22, an operator's console program is provided with interfaces with both the sequencing program 600 and the analog output program 612. Generally, a depressed local operator's pushbutton causes the interrupt routine to bid a dominant level operator's console program, which when active determines the requested action. In the event that generator breaker closing, line breaker closing or emergency shutdown have been requested, priority execution of associated programs results. Other indicated actions occasion the requesting of an associated secondary sublevel program, which is then placed into the bidding state. Operator/Executive System communication is provided during all modes of gas turbine control.

5. Analog Scan Program

Generally, the analog scan program provides an executive function in reading all analog points associated with the power plant 100 and any similar plant units. The frequency at which the analog points are read is determined by the needs of the process operation, and in this instance, it is set at 30 points per second. The analog scan program can be executed under hardware or software interrupt lockout.

6. Analog Output Program

As previously considered, the general approach employed for generating analog outputs is to employ external holding type operational amplifiers with the amplifier output measured by the computer through the analog input system 308. The measured value is compared with the desired value and the difference is employed in determining how long raise or lower contact closure outputs must be closed to make the holding amplifier integrate to the desired value. The raise or lower value is computed in tenths of a second, and it is determined by an element of the analog output program 612, which is run on a secondary level while the actual contact closure output pulsing is performed by a pulser element of the analog output program 612, run on a dominant level every tenth of a second. The secondary level analog output program element is run every second for speed reference and load limit and every five seconds for the remaining outputs.

The foregoing brief discussions of system components 2 through 6 are herein included to provide in summary form a general description of the control environment which is more fully described in copending application Ser. No. 082,470, Sections D2 through D6, pages 101 through 115.

7. Sequencing Program a. Functional Philosophy

Figure 18:
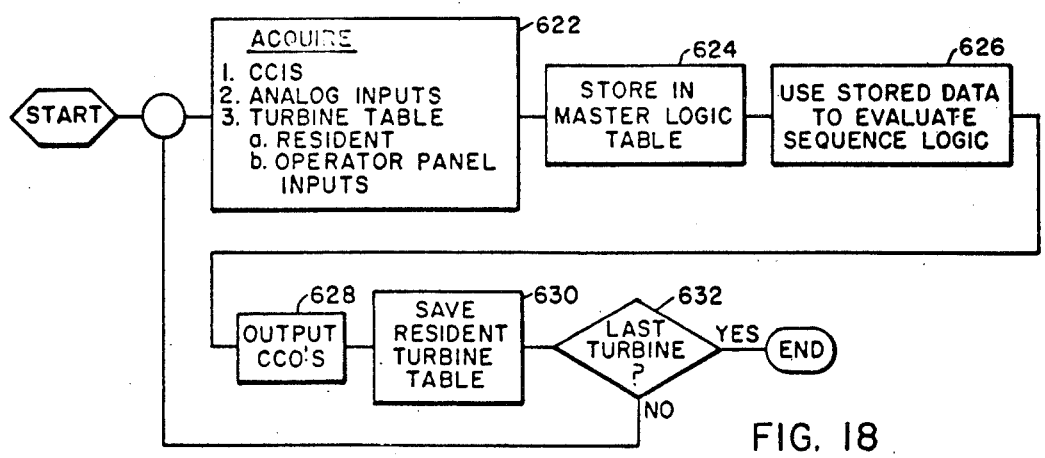
FIG. 18 illustrates a flowchart for a sequencing program associated principally with startup operations for the gas turbine.

Generally, the sequencing program 600 is represented by a flowchart shown in FIG. 18 and it is run once every second to provide the plant sequencing operations required during turbine startup, to provide certain alarm detections and to provide sequencing for various plant tasks during time periods other than the turbine startup time period. As indicated by block 622, certain information regarding the status of the turbine plane 100 and other controlled plants is required for sequencing program execution. The required plant status information which is acquired includes continuous analog data and contact input closures generated by operator panel switches, pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 622 is saved in the original core memory location while non-resident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic processing in the current sequencing program execution.

Figure 19:
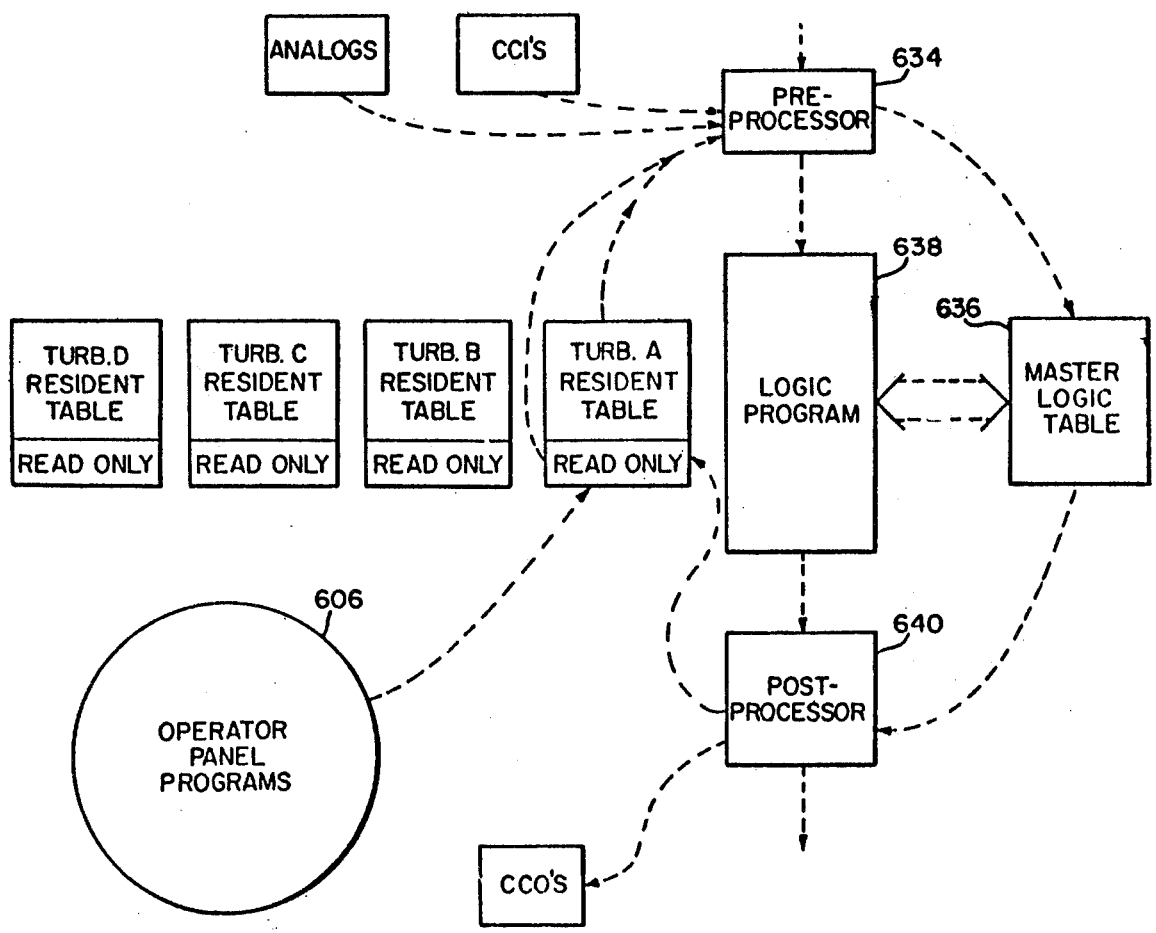
FIG. 19 shows a data flow diagram which illustrates the manner in which the sequencing program is executed to provide multiple power plant operations with a single control computer.

In FIG. 19, there is illustrated a data flow map for the sequencing program 600. As shown, there are four turbine data tables for the respectively designated gas turbines A, B, C, and D. Each gas turbine data table comprises a resident portion and a read only portion which is derived from the operator panel program 606. A preprocessor block 634 corresponds to the block 622 shown in FIG. 18, and it obtains data from analog inputs, contact closure inputs, the resident turbine A table and the read only turbine A table. The acquired data is stored in a master logic table as indicated by block 636 which corresponds to block 624 in FIG. 18. The master logic table is employed in the execution of logic program block 638 which corresponds to block 626 in FIG. 18.

After the sequence logic has been evaluated by the program 638 a postprocessor 640 is entered and it corresponds to blocks 628, 630 and 632 in FIG. 18. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been employed, an exit is made from the postprocessor block 640.

b. Sequencing Program Table Data Tables and Preprocess and Postprocess Routine Information on core organization of the turbine read/write and read only tables, contact closure input and output data tables, the master logic table and turbine alarm data tables may be found in Section D7b., pages 117 to 150 of the aforementioned copending application Ser. No. 082,469. Additional information on the contact closure input routines, analog input routines, contact input and contact closure output routines employed in blocks 622 and 628 is included therein.

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

In the startup process, a programmed computer master contactor function and operation selectors are employed to force the sequence of starting and operation to assure that turbine startup will normally take place over a fixed predetermined time interval. The software master contactor serves to establish and disestablish logic conditions necessary for initiating the making and breaking of external control circuits for equipment startup and shutdown operations under predetermined plant and equipment conditions.

After ignition programmed sequencing logic causes the control system 300 to be placed in Mode 1 operation and the gas turbine speed reference is increased in a program controlled nonlinear manner to determine the fuel valve positioning.

When the turbine 104 has been advanced to idle (or top or synchronous) speed, it is ready to be synchronized and the control system 300 is transferred to Mode 2 operation in which either manual or automatic synchronizing is performed following field breaker closure. When the turbine-generator unit is synchronized and the generator breaker is closed, the control system 300 is transferred to Mode 3 or Mode 4 operation and the speed reference is set at a value of 106% rated speed. Load is ramped to a predetermined level at a predetermined rate under programmed computer operation.

Shutdown of the gas turbine is caused if any of three time checks fail during the startup sequence. The first time check measures time from initiation of the master contactor function to ignition speed. In addition, a check is made on the time from detection of flame in combustor baskets to 60% speed. Further, a check is made on the time from starting engine trip at 60% rated speed to idle speed.

d. Sequence Logic Charts

Figure 20A:
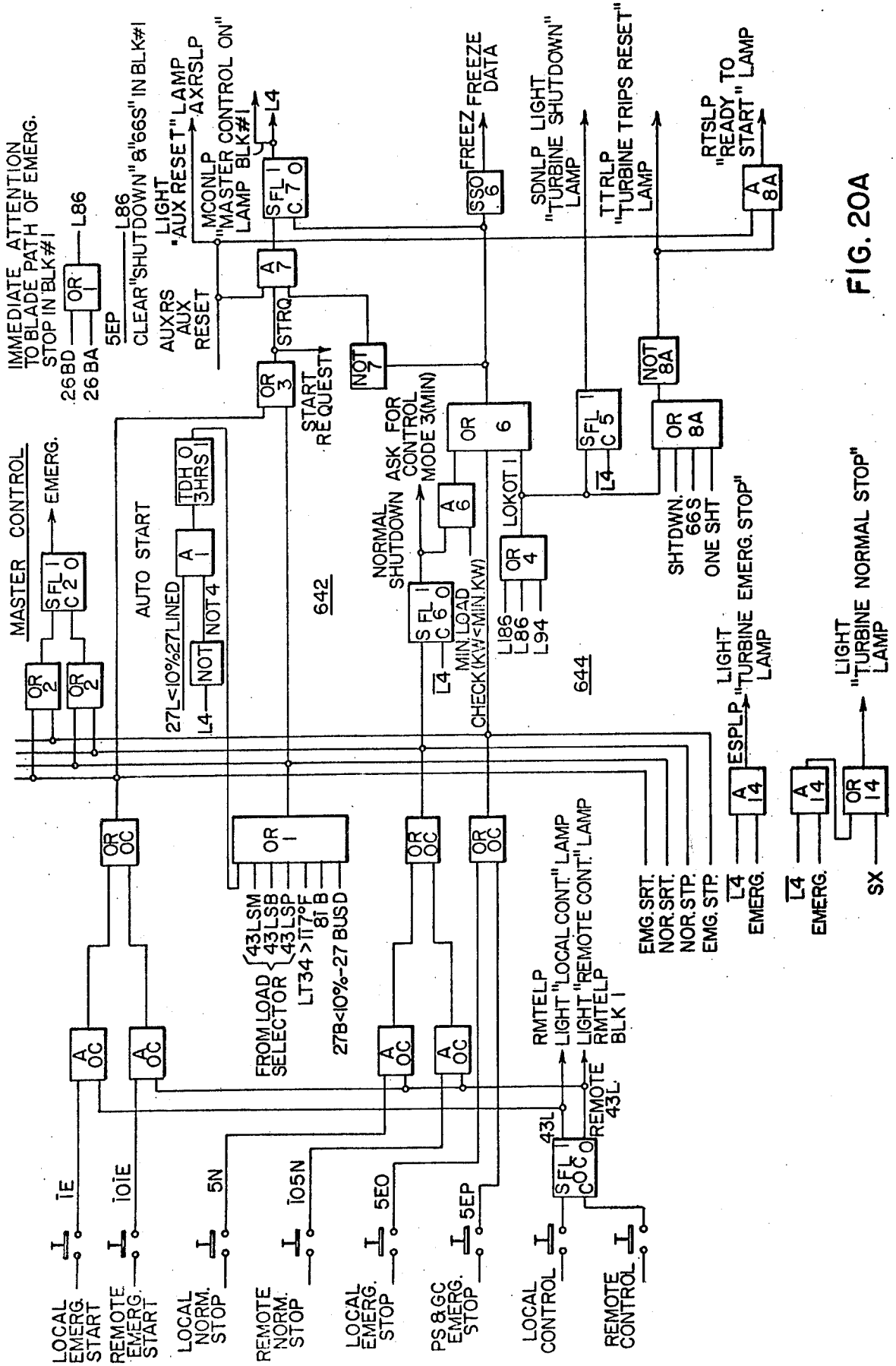
FIGS. 20A-B shows a logic diagram representative of the sequencing logic performed by the sequencing program.
Figure 20B:
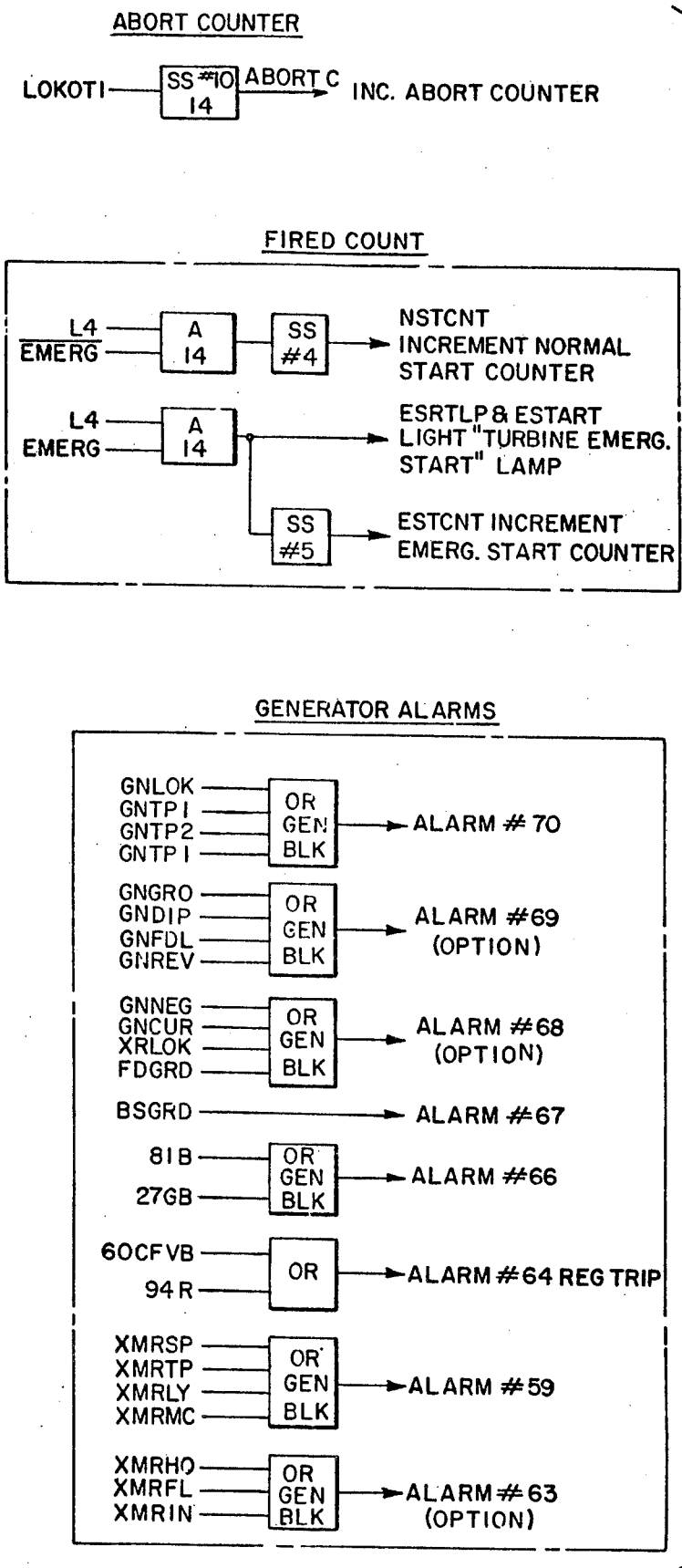

In FIGS. 20A and B, there are shown logic diagrams of representative alarm and sequencing functions performed by the sequencing program 600 in the block 626 (FIG. 18) each time it is executed. Predetermined logic building blocks are employed in defining the conditions for the performance of the sequencing program functions. Each block contains a symbol identifying its function and a number of alpha-numeric character providing a program block identification. The logic function identifying symbol is generally located above the program block identification character. The following is a list of the logic symbols and the logic functions to which they correspond:

| A | And |
|---|---|
| OR | OR |
| FL | FLIP FLOP |
| SS | SINGLE SHOT |
| DB | DEAD BAND |
| NOT | INVERSION |
| TDH | TIME DELAY - HOURS |
| TDS | TIME DELAY - SECONDS. |

There is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, alarm shutdowns are initiated by line L86 through block OR4. On shutdown, single shot block 6 provides for registering predetermined data.

Other sequencing programs logic functions set forth in logic diagram form in FIGS. 20A and B include a plurality of generator alarms designed as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

Further description of the plant sequence functions, associated sequence logic charts, macro instructions for sequencing logic and logic subroutines and macros related thereto may be found in the aforementioned copending application Ser. No. 082,467, now U.S. Pat. No. 3,898,439, Section D.7c. through D.7e. found at pages 151 to 164 thereof.

8. Control Program

The following brief discussion of a control program suitable for use in the preferred embodiment of the present invention may be considerably amplified by a reference to the corresponding section of one of the aforementioned copending applications, e.g., W.E. 40,062.

Figure 21:
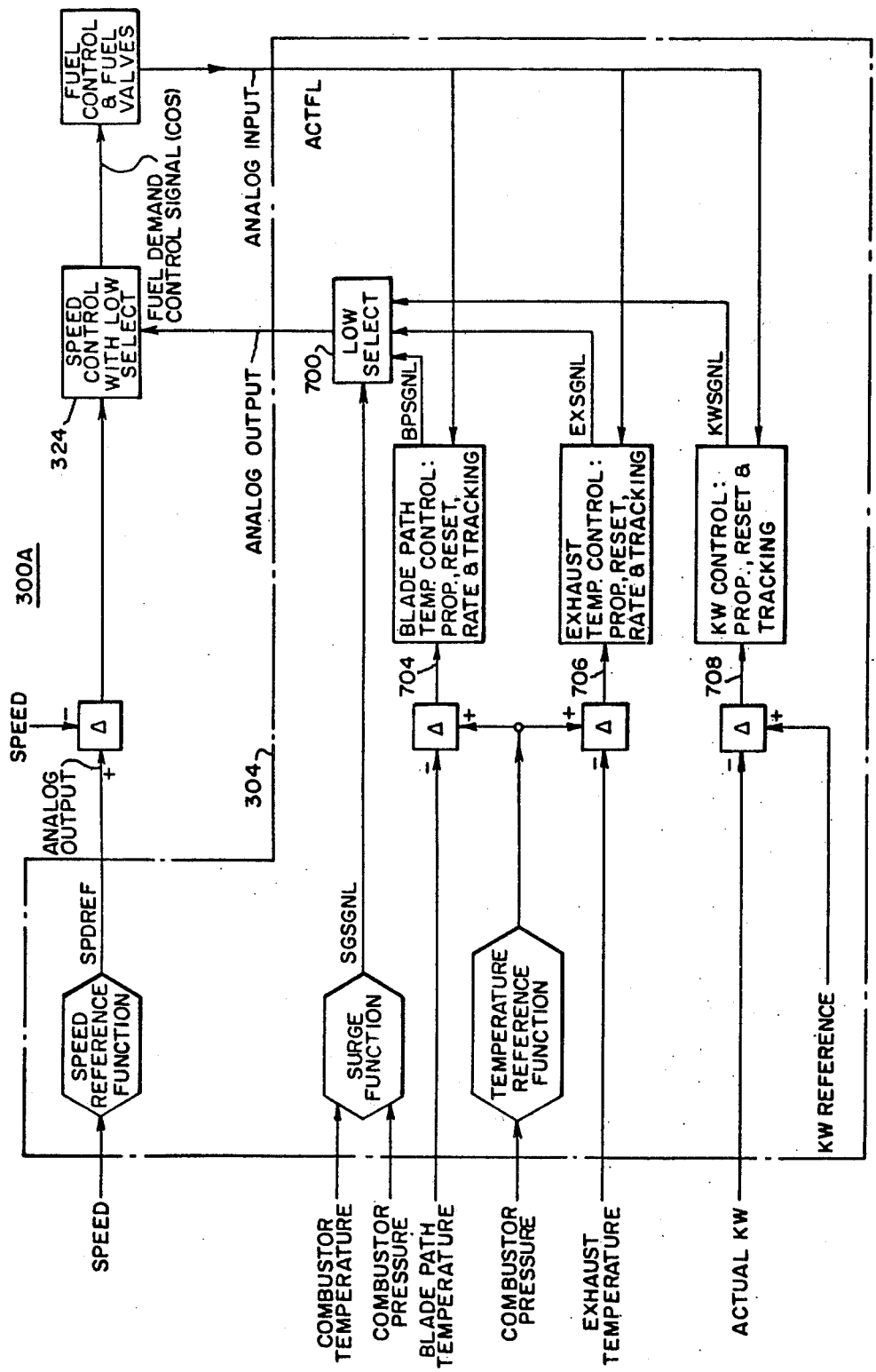
FIG. 21 shows a block diagram of a control loop arrangement implemented in the preferred embodiment.
Figure 30:
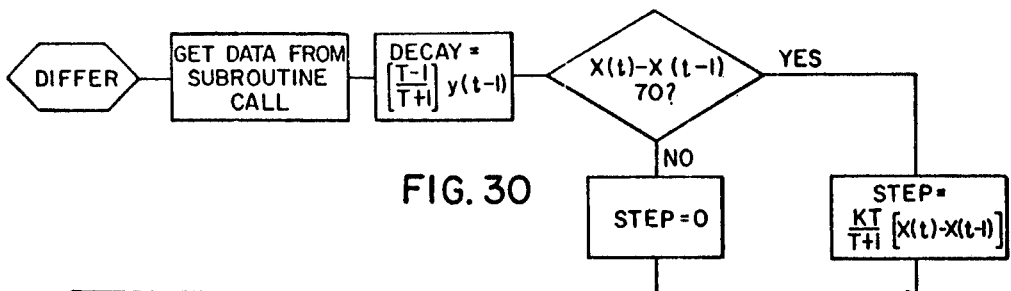
FIG. 30 shows a flowchart for a rate function employed in temperature limit operations.

As indicated in FIG. 17 the control program 602 interacts with the sequencing program 600 providing control loop determination of the operation of the gas turbine plant 100 and like plants if provided. A preferred control arrangement is considered in FIG. 21. Upon determination by the sequencing program 600 of the control mode in which the control program 602 is to be operated and the accomplishment of the sequencing steps previously discussed, control program 602 becomes active, operating in the control loop arrangement 300A. The hybrid interface depicted provides for software speed reference generation and selection of a single low fuel demand limit in software low select block 700 for application to analog hardware speed control 324.

The output fuel demand signal is selected as the lowest of a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Referring now to FIG. 22, execution of control program 602 proceeds as follows:

a. Preprocessing by block 710 of the resident control data table containing various parameters indicating current turbine status and a pointer to the sequencing table which contains a control mode indicator and the selected load and start-up status.
b. Analog control program data acquisition including blade path, exhaust and compressor inlet temperatures, combustor shell pressure, actual fuel demand signal and actual kilowatt output.
c. Reliability testing of acquired analog temperature readings to prevent overheating of critical turbine parts.
d. Execution of turbine control block 712, to be hereinafter outlined.
e. Block 716 postprocessing including table updates as indicated by the circular data flow.

The foregoing steps are repeated cyclically for turbines B, C and D if provided.

Figure 23:
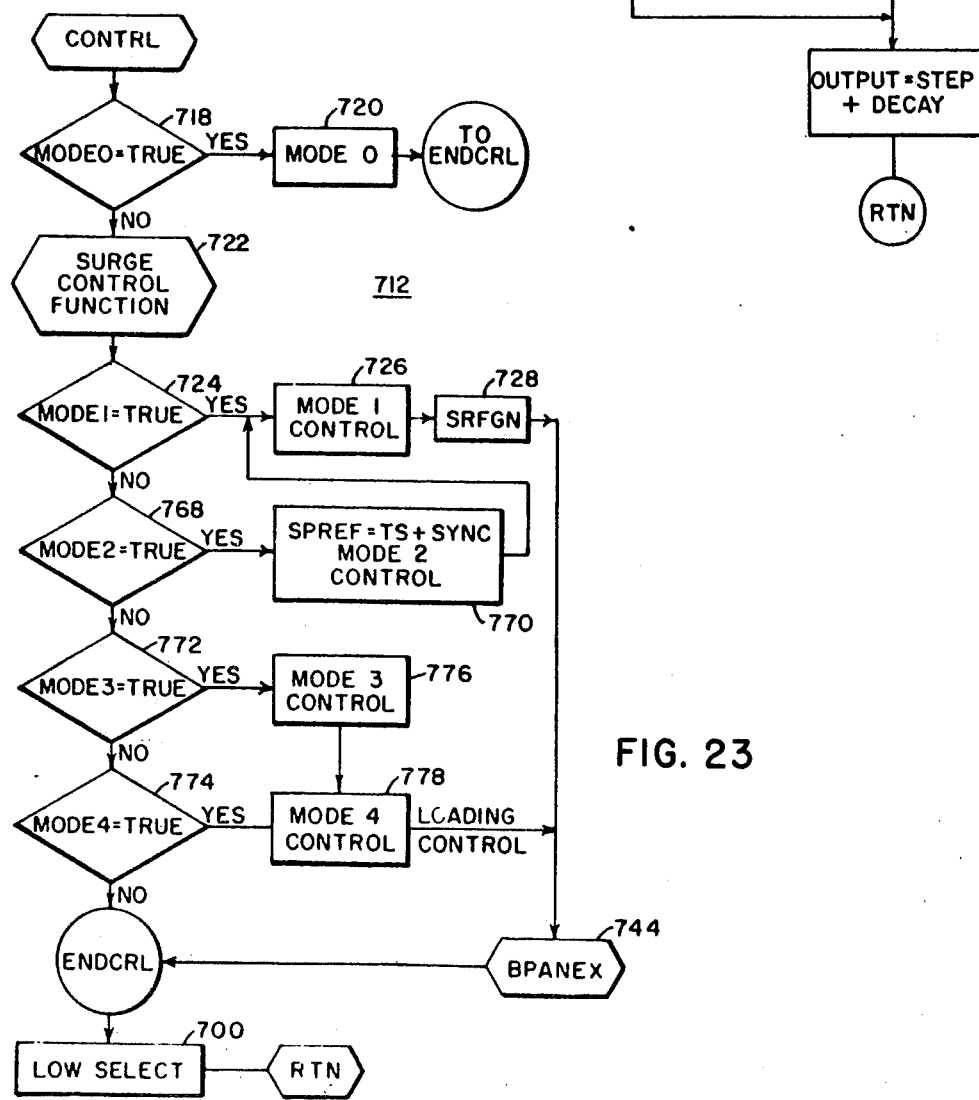
FIG. 23 illustrates a flowchart which represents control program operations in the preferred embodiment.

Turbine control block 712 is shown in greater detail in FIG. 23. As shown, control actions are directed consistent with turbine control mode directives. If block 718 determines that the turbine is in Mode 0 status, initialization is accomplished by the execution of block 720. Actual turbine speed tracking is provided so that a smooth transition is made in the computer generated speed reference during transfer from Mode 0 to Mode 1.

Figure 31A:
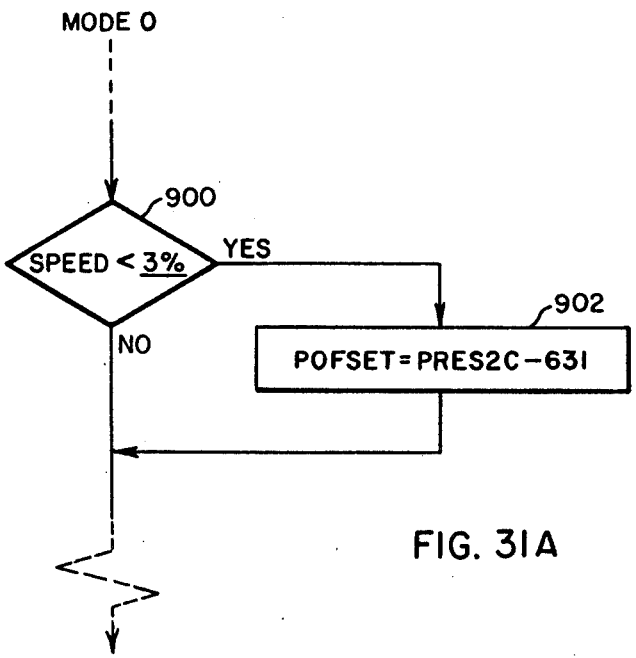
FIGS. 31A-B show flow diagrams for the program steps employed in accomplishing the dynamic calibration and error correction of the present invention in operating Modes 0 and 1, respectively.

Referring to FIG. 31A a flowchart is shown for those steps of the control program implemented in accordance with the principles of the present invention which are executed in Mode 0. Block 900 determines whether the turbine has reached a speed corresponding to that desirably attained at light-off. As shown an offset value is computed as the difference between a scaled analog input value PRES2C (one half the combustor shell pressure) and a constant $631_8$ which is the actual equivalent of one half the number corresponding to one volt, the voltage level representing a pressure transducer reading of 0 psig. (Various scaling techniques are used throughout the control program system. In this instance results are carried at half value). Execution of block 902 occurs once each second until light-off. Thus, upon the occurrence of such event location OFFSET contains a scaled number representative of an error attributable to instrumentation drift at shutdown, i.e., drift compensation is dynamic through initial program execution and becomes fixed at the shutdown value at light-off. In this manner improper transducer rezeroing is eliminated.

If the control is not in Mode 0, block 722 next determines the surge control function for use in the surge control loop (FIG. 21) in all other modes of operation. To prevent compressor surge under excessive pumping demands, the surge control function determines a maximum fuel demand limit as a function of the compressor inlet temperature and the combustor shell pressure. A discussion of the surge limit function determination may be found in copending application Ser. No. 082,470, beginning at page 186 thereof. Analog inputs representative of temperature are reliability checked as described in copending related application Ser. No. 155,905. Combustor shell pressure readings are extremely accurate, having been obtained as a result of the dynamic calibration and error correcting system and method of the present invention.

In Mode 1 control block 726 is executed to provide acceleration control from ignition speed of approximately 1000 RPM to the top speed of 4894 RPM. Fuel demand signal tracking is provided and a nonlinear temperature reference is generated in a manner similar to that employed in surge limit functional determination, again, as discussed in the aforementioned copending application Ser. No. 082,470. Temperature references as a function of combustor shell pressure are determined for both normal and emergency startups.

Repeated executions of the control routine 712 are made during the time period that the gas turbine 104 is placed under sequencing and acceleration operations in Mode 1 control. A speed reference for analog output to the speed control 324 is provided in block 728. Such reference is derived from previously input nonlinear curve representative of optimum fixed time acceleration for both normal and emergency startup as previously indicated. A linear interpolation routine similar to that described in connection with the surge limit functional determination is employed to derive acceleration values at working time points between the time points corresponding to the stored curve points. The speed reference algorithm may be found at page 50 of copending application Ser. No. 082,470.

Figures 24, 25:
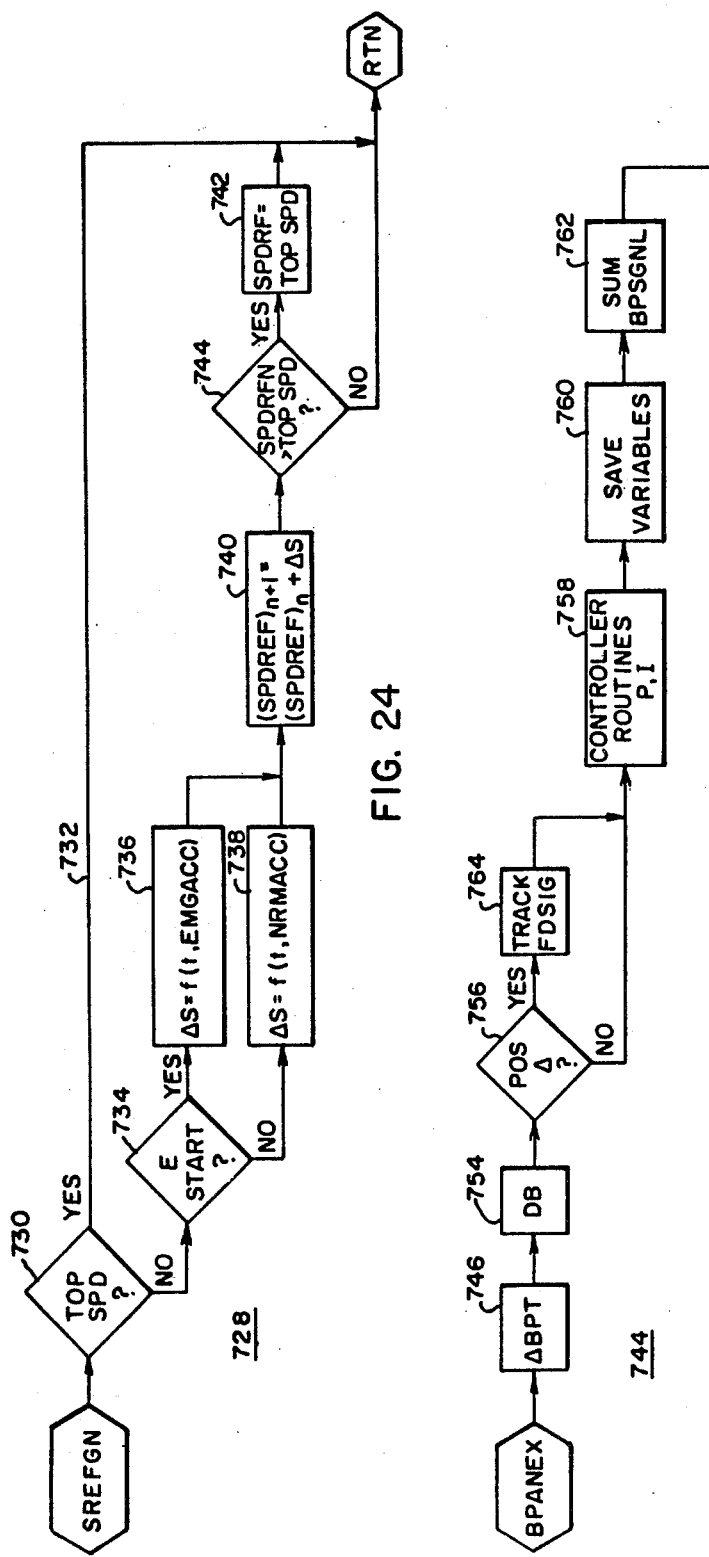
FIG. 24 shows a more detailed flowchart for a speed reference generation function included in the program of FIG. 23.
FIG. 25 shows a more detailed flowchart for a gas turbine blade path and exhaust temperature limit function employed in the program of FIG. 29.

The speed reference generation program is shown in greater detail in FIG. 24. Block 730 first determines if the gas turbine 104 has attained top or substantially synchronous speed. If this condition is satisfied, the speed reference routine is bypassed and a return is made to the turbine control program execution. If not, block 734 determines whether an emergency start has been requested. Block 736 and 738 correspond respectively to emergency and normal startups, and as shown a change in the speed reference required for the next sampling time interval is calculated. In block 740 the speed reference step change is added to the preceding speed reference.

A top speed limit is next placed on the speed reference by block 742 if block 744 detects an excessive speed reference value. If not, the speed reference value is stored and a return is made to the execution of the control block 712.

Temperature control is provided as shown in FIG. 25. In the temperature limit routine 744 a temperature error is first determined by taking the difference between the temperature reference previously derived and the actual and preprocessed average blade path temperature. The output of block 746 is compared with a predetermined deadband in block 754. If an error exists outside the deadband, the sign is determined in block 756. If the blade path temperature error is negative, control action is imposed by block 758 with a proportional routine and an integral routine. Blade path temperature and temperature error variables are stored by block 760 and block 762 sums the results of the proportional and integral operations of block 758 to generate the blade path output limit representation BPSGNL.

If the blade path temperature error is positive, fuel demand signal tracking block 764 is executed so that faster control action may follow a change in temperature error from positive to negative, since through this device the reset routines do not have to integrate back from some saturated output value. In particular, the tracking action is such that the reset block output never exceeds the fuel demand signal by more than a difference value.

To obtain the tracking action, the desired difference value is added to the low selected fuel demand signal and the result is differenced from the output of a reset or integrator routine and applied to the input of the reset routine. The output of the integration operation accordingly tracks the fuel demand signal with a positive bias. Such tracking operation allows the tracking control loop to enter quickly into fuel control if required by a change in the error quantity controlled by the tracking control loop. The integration routine may be found at page 202 of copending application Ser. No. 082,467, now U.S. Pat. No. 3,898,439.

After execution of the block 762, the exhaust temperature control or tracking action is determined in a series of blocks similar to those just considered in connection with blade path temperature control and tracking action. Further, a save variable block 769 provides for storing the exhaust temperature error and the track function output initiated by block 769. After the exhaust temperature output limit is determined in block 766 a return is made to the routine 713 in FIG. 23. Next, a software low selection is made by block 700 in Mode 1 control program execution.

Figure 31B:
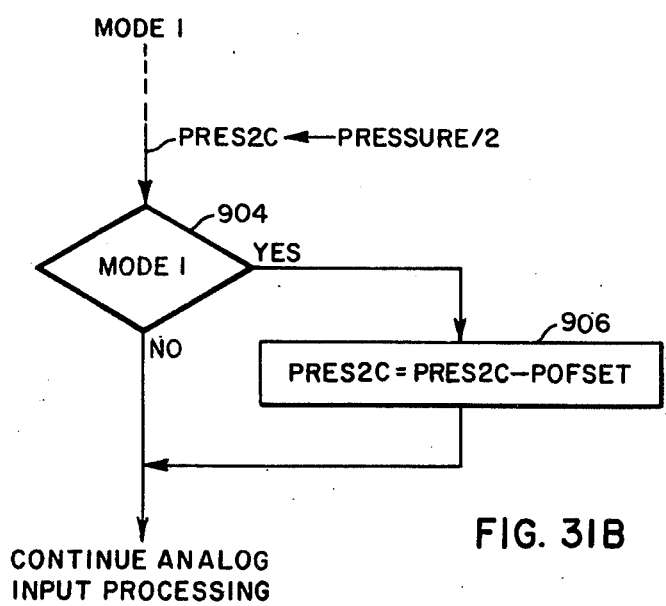

Throughout Mode 1 drift offset error corrections are made in deriving a combustor shell pressure value for use in surge limiting. Referring to FIG. 31B, the initial pressure value obtained from an analog input table is divided by 2, consistent with internal program scaling previously discussed, and stored in PRES2C. If Mode 1 program switch is set on (block 904), the value is PRES2C is replaced by the value PRES2C - OFFSET as indicated at 906. Thus the dynamic calibration and error correction steps of the present invention are accomplished.

Summarizing and expressing the foregoing in equation form:

Consistent with the assumption that the pressure transducer is calibrated over its full range and that the error is in the form of a constant offset then any transducer reading is given as:

1. $P2C_{transducer} = P2C_{actual} + P2C_{error}$

When the unit is on turning gear $P2C_{actual}$ should equal zero. Thus (1) becomes 2. $P2C_{transducer} = P2C_{error}$ Therefore, a reading taken at shutdown is a direct measure of the error. After start a corrected pressure reading may be obtained by subtracting $P2C_{error}$ from $P2C_{transducer}$. Thus, 3. $P2C_{corrected} = P2C_{transducer} - P2C_{error} = P2C_{actual} + P_{error} - P_{error} = P_{actual}$ To briefly examine an example of the operation of the principles of the present invention, consider the case where the pressure transducer had returned to a 1 lb. setting instead of to 0. This would be read and noted by the computer and saved in memory. If the transducer slowly drifted back toward 0 during the shutdown period, the successive changes would also be noted. Assume that upon restarting P2C reads 0.6 pounds. Then the reading saved would be 0.6 lbs. Thus, at startup $P_{corrected} = 0.6_{psig} - 0.6_{psig} = 0$. All future readings would then be offset by a similar amount.

Once synchronous speed is reached, block 768 in FIG. 23 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

Figure 26C:
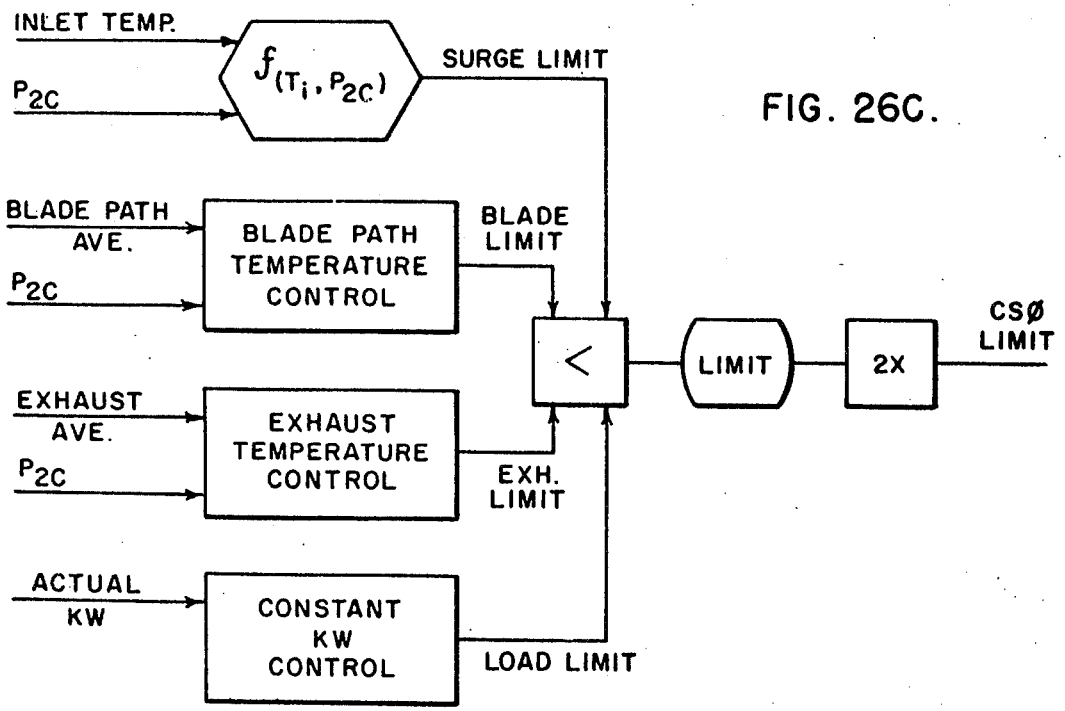

After synchronization block 772 or 744 directs control program operations to a Mode 3 control block 766 or a Mode 4 control block 778 according to the operator's panel selection. Mode 3 control, depicted in FIG. 26C provides for determining kilowatt error from the difference between a kilowatt reference and actual kilowatts. Proportional and integral control routines are then applied to the kilowatt error and the resultant controller outputs are summed in order to provide for constant kilowatt control with temperature limit backup. Further, a loading rate limit is imposed to prevent excessive thermal transients due to excessive loading rates under automatic or manual incremental loading. A discussion of the loading limit subroutine and its operation in Modes 1, 2 and 3 may be found at page 194 of copending application Ser. No. 082,470.

Initially, in Mode 3 operation, the kilowatt reference is set at a minimum value pending operator selection of a reference value which may not exceed a value corresponding to the base load exhaust temperature limit. Thus, the primary Mode 3 controls are the exhaust temperature control and the constant kilowatt control, with blade path and surge controls providing backup protection.

Figure 26D:
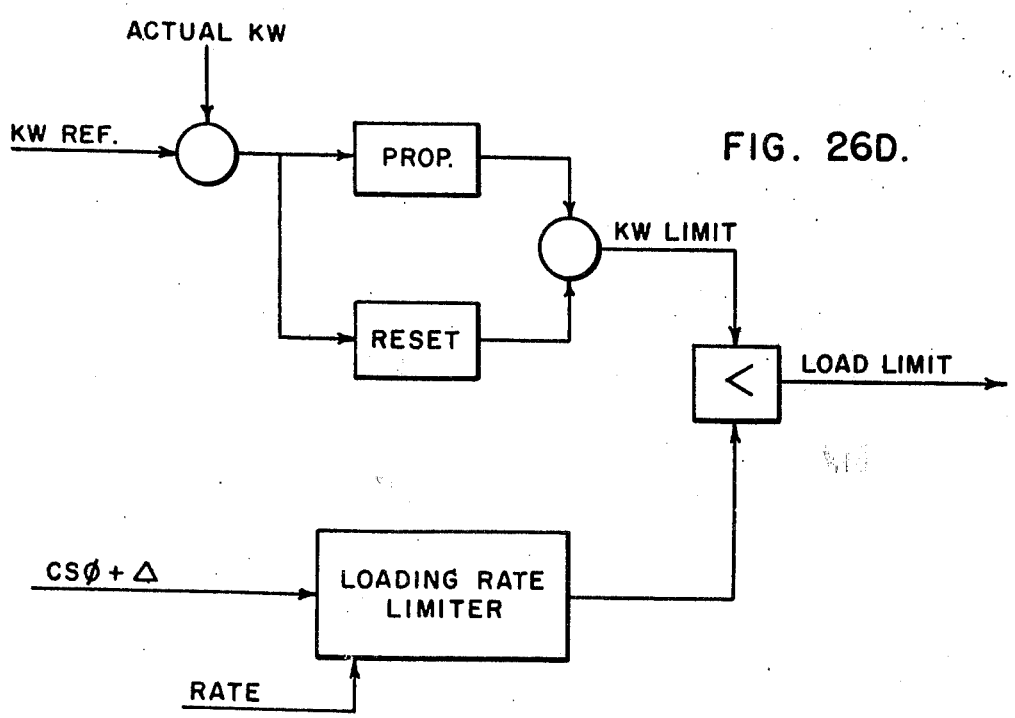
Figure 27A:
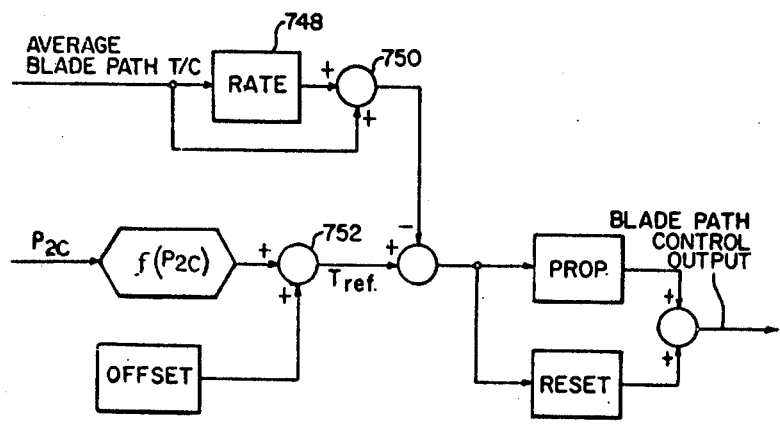
FIGS. 27A-B respectively show software control configurations for the blade path temperature and exhaust temperature limit functions.
Figure 27B:
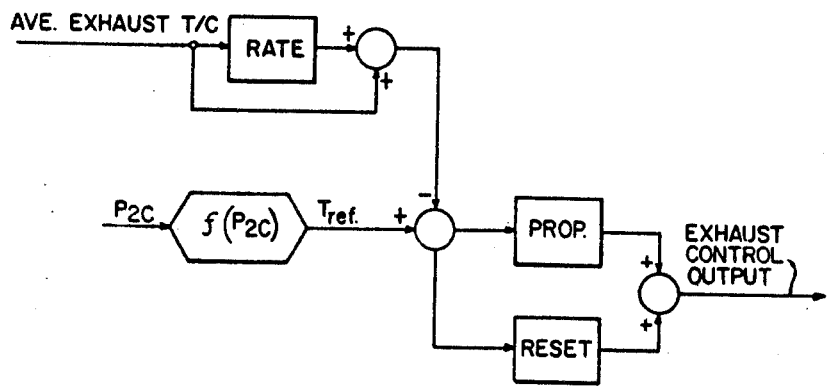
Figure 28:
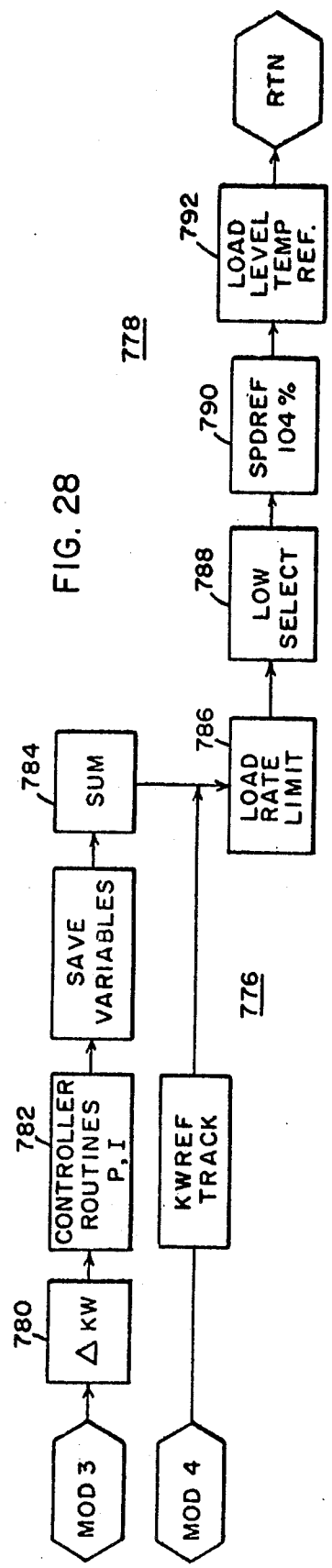
FIG. 28 shows a flow diagram for control program operations which provide load control and load limit functions for the gas turbine power plant.
Figure 29:
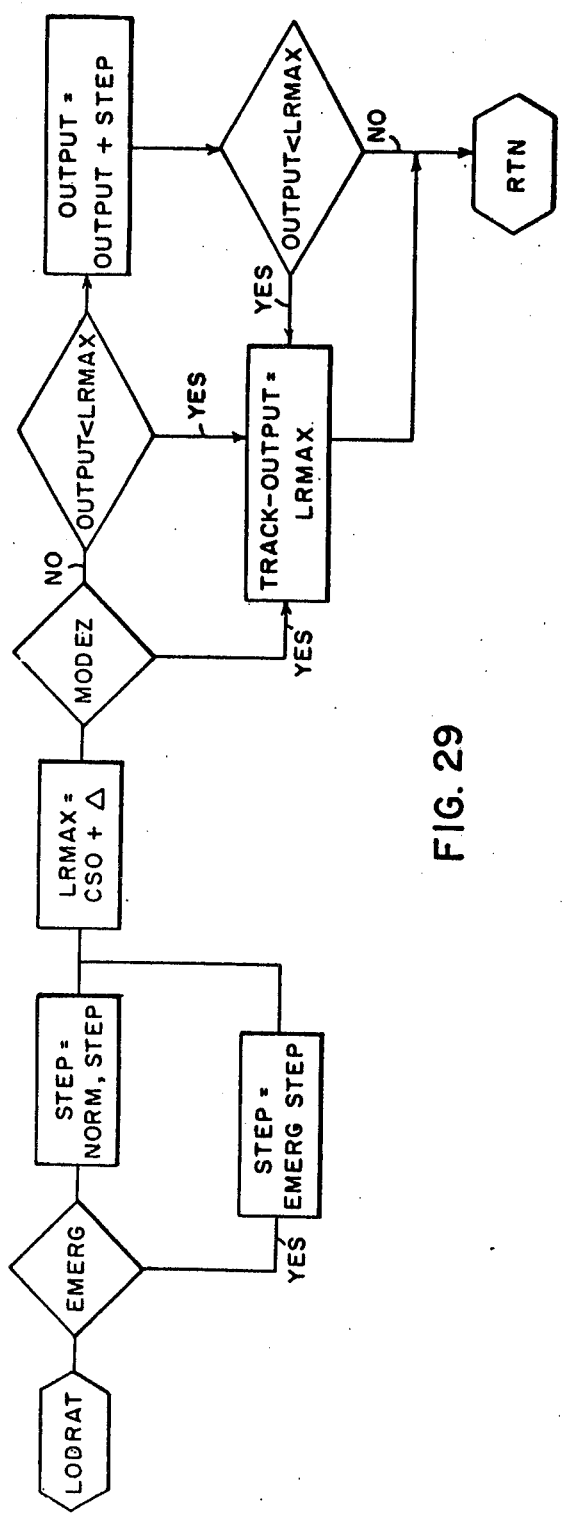
FIG. 29 illustrates a flowchart for a load rate limit function employed in the load control and limit operations illustrated in FIG. 28.

Mode 4 control (FIG. 26D) differs from Mode 3 control in that no constant kilowatt function is provided for Mode 4. However, a loading rate limit is imposed. A temperature reference is determined for use in the blade path and exhaust temperature limit control block 744.

In both Mode 3 and Mode 4, the block 744 is executed in a manner considered previously in connection with Mode 1. Since no constant kilowatt function is provided for Mode 4, the block 744 provides for a temperature loading operation through exhaust temperature limit action. Under temperature control, the generated power varies with the ambient error temperature such that more power is generated with lower inlet air temperature.

Load Mode 3 and load Mode 4 program executions are completed through low select block 700 which selects the lowest fuel demand representation associated with the temperature, surge and load limits to provide the control operation as described. Control program execution through the block 766 and/or 788, 744 and 700 continues for the duration of Mode 3 or Mode 4 load control.

A variety of special control program macros and subroutines are employed in the preferred implementation of the control program 602. A discussion of such may be found in Section D8 of the aforementioned copending application Ser. No. 082,467, now U.S. Pat. No. 3,898,439, pages 198 to 203.

9. Alarm and Thermocouple Check Programs

In the alarm system, alarms are generated in response to sensors considered in connection with FIG. 9. Printout of alarms is made as in the following example:

| Time | Status | Turbine Identification | Description |
|---|---|---|---|
| 12:30 | ALRM | A | Flame A |

The status conditions of the alarms are listed below:
NORM — Normal
ALRM — Alarm Alarms are determined by the sequencing program 600 and the thermocouple check program 616 as previously considered. The alarm program 610 is periodically executed to print out all points in alarm. Multiple confusing alarm lightings as encountered with conventional annunciator panels are thus avoided.

The thermocouple check program 616 also runs on a periodic basis. When it is executed, a check is made of the values stored for all thermocouples not checked by the control program 602 to determine if the thermocouple value is more negative than a predetermined check number stored in location CHKNO An excessive negative number is considered an open circuit and an alarm bit is set for the alarm program 610.

10. Data Logging Program

A formated log is printed in response to execution of the log program 618 on a periodic basis selected by the plant operator within the range of 15 minutes to two hours. The printed readings are instantaneous values obtained from the last analog scan cycle. The plant operation may select any 20 analog points per turbine under control.

Generally, the analog conversion program 602 provides for converting entered analog values into the engineering value represented by the input and vice versa. Generally, four types of conversion are provided, i.e., flow straight-line, thermocouple, and segmented straight-line.

11. Miscellaneous Programs

The miscellaneous programs 622 include a programmer's console function program, a dead switch computer program, a power failure and restart program, and a horn and alarm lamp program. Additional programmer's console functions designated herein as being implemented by miscellaneous programs rather than the executive program include a CCI print status program, an analog engineering units print program, a contact output operate program, a test dead computer system program and a time program.

The alarm and thermocouple check programs, data logging program, and miscellaneous programs are more fully discussed in the aforementioned copending application Ser. No. 082,470, Section D9 to Section D11, pages 204 to 210.

The program system described in Section D herein substantially embraces that described in the corresponding section of application Ser. No. 082,470. Contained herein is the description of a preferred embodiment of an increment thereto giving rise to an enhanced monitoring and control capability.

Although the detailed flowcharts corresponding to the appended program printout may have certain differences from certain aspects of the described flowcharts, the list of programs do provide for an essential implementation of the subject matter described herein.

Most developed system software may be characterized with relatively minor faults known as bugs which sometimes take long periods of time to detect and/or diagnose. Ordinarily the correction of such faults is within the skill of control and system programmers. The program listing which follows accordingly may be expected to contain some faults of this kind but all such faults which have been detected have required only programmer's skill for correction in field applications.

```
PROGRAM  -      CONTROL
COMPUTER -      WESTINGHOUSE P-50
GENERATION UNIT - 501-AA GAS TURBINE
DATE COMPILED  - APRIL 1, 1971
```

```
        EJE

AL1     MAC FROM,INDIR          THIS IS THE MACRO TO ENTER THE ACCUMULATOR
        ENL FROM,INDIR
        TER

AS1     MAC WHERE,INDIR          THIS IS THE MACRO TO STORE THE ACCUMULATOR.
        STL WHERE,INDIR
        TER

THIS IS THE TRANSFER MACRO.  IT TRANSFERS THE
                                 CONTENTS OF ONE WORD INTO ANOTHER.
XFR     MAC FROM,TO
        ENL FROM
        STL TO
        TER

FOLLOWING IS THE LOGICAL SET MACRO.  IT IS USED
                                 TO MAKE A VARIABLE EITHER TRUE OR FALSE.
                                 THE TRUE CONDITION SETS THE MOST SIGNIFICANT BIT
                                 =1 (NEG NUMBER), AND THE FALSE COND SETS THE
                                 MOST SIGNIFICANT BIT =0 (+NUMBER).

MAK     MAC VAR,COND
        DLE COND*1
        CMB VAR
        DLE 1-COND*1
        SMB VAR
        TER

THIS IS THE P-50 JUMP TO MACRO. LABEL IS SOME
                                 UNIQUE MNEMONIC.
JPT     MAC LABEL
        JMP LABEL
        TER

THIS IS THE IF MACRO FOR THE P-50.  IF THE LOGIC
                                 CONDITION IS MET, THE JUMP WILL OCCUR.
IFF     MAC VAR,COND,LABEL
        DLE -VAR/VAR+1*1
        RSH VAR
        DLE COND*1
        PJP LABEL
        DLE 1-COND*2
        PJP L+2
        JPT LABEL
        TER

THIS IS THE DEADBAND MACRO.  THE INPUT, ON,
                                 AND OFF ARGUMENTS MUST REFER TO ANALOG TYPE
                                 QUANTITIES.
                                 THE OUTPUT ARGUMENT IS A LOGICAL VARIABLE
                                 AND MUST BE IN THE TURBINE RESIDENT TABLE.

DBD     MAC INPUT,ON,OFF,OUTPUT
        ENL ON
        SUB INPUT
        PJP L+3
        SMB OUTPUT
        JMP L+5
        ENL INPUT
        SUB OFF
        PJP L+2
        CMB OUTPUT
        TER
                                 THIS IS THE MACRO FOR THE DIFFERENCING BLOCK.
                                 EXIT WITH (AL) =PLUS - MINUS.  THERE IS A
                                 CHECK FOR OVERFLOW INCLUDED IN THE MACRO.
DIF     MAC PLUS,MINUS
        EDR 0)
        ENL PLUS
        SUB MINUS
        RJP CHKOVF
        TER

THIS MACRO UNPACKS THE WORD SPECIFIED
                                 BY WORD INTO THE LOCATIONS SPECIFIED BY TABLE
                                 THE FIRST WORD OF TABLE CORRESPONDS TO BIT 1 OF
                                 WORD

UPK     MAC WORD,TABLE
        DLE -WORD/WORD+1*1
        ENL WORD
        RJP UNPACK
        DEC TABLE+13
        TER

THIS MACRO IS USED FOR A SUMMING BLOCK.  THE
                                 RESULT IS LEFT IN AL, AND THERE IS A CHECK FOR
                                 OVERFLOW
SUM     MAC N,I1,I2,I3,I4,I5
        EDR 0)
        ENL I1
        DLE 5-N
        ADD I5
        ADD I4
        ADD I3
        ADD I2
        RJP CHKOVF
        TER
```

```
                    THIS MACRO CAUSES THE CONTENTS OF THE 2
                    LOCATIONS - UPPER AND LOWER TO BE RIGHT
                    SHIFTED N TIMES.  THE MOST SIGNIFICANT BITS
                    ARE IN UPPER.  THE CONTENTS OF BIT 0 IN UPPER
                    ARE SHIFTED INTO BIT 13 OF LOWER.

RSA   MAC  N
               ENL  N)
               RJP  RSASUB
               TER

THIS IS THE MULTIPLY MACRO.  THE MACRO
                    PARAMETER SPECIFIES WHAT AL IS TO BE MULTIPLIED
                    BY.  THE RESULTS COME OUT W/ HIGH ORDER IN UPPER
                    AND THE LOW ORDER IN LOWER.

MPL   MAC  BY
               RJP  MULTPY
               DEC  BY
               OCT  LOWER
               STL  UPPER
               TER

THIS IS THE DIVIDE MACRO.  IT DIVIDES THE
                    CONTENTS OF UPPER AND LOWER BY A SPECIFIED
                    NUMBER.  THE RESULT COMES BACK IN AL AND THE
                    REMAINDER IS LEFT IN UPPER.

DIV   MAC  BY
               ENL  UPPER
               RJP  DIVIDE
               OCT  LOWER
               DEC  BY
               OCT  UPPER
               TER
                    THIS IS THE CALL TO THE 2 DIMENSIONAL FUNC.
                    GENERATOR.  GIVE THE FUNCTION NAME, THE X VALUE
                    AND THE Y VALUE.
         F2D   MAC  FNAME,XVALUE,YVALUE
               ENL  XVALUE
               STL  VARIN1
               ENL  YVALUE
               STL  VARIN2
               ENL  FNAME+NUMPTS+1)
               RJP  2DIMEN
               TER

THIS IS THE CALL TO THE 1 DIMENSION FUNCTION
                    GENERATOR.  GIVE THE FUNCTION NAME, AND THE
                    VALUE OF THE INDEPENDENT VARIABLE.

F1D   MAC  FNAME,XVALUE
               ENL  XVALUE
               STL  VARIN1
               ENL  FNAME+NUMPTS-1)
               RJP  1DIMEN
               TER

THIS IS THE DIFFERENTIATOR MACRO.  IT INITIATES
                    A JUMP TO THE DIFFERENTIATOR SUBROUTINE.  THE
                    INFORMATION FURNISHED INCLUDES - THE GAIN,
                    THE PAST VALUE OF THE INPUT, AND THE PRESENT
                    VALUE OF THE INPUT.
         DFF   MAC  ICON,OLDVAL,NEWVAL,OUTPUT,GAIN
               ENL  ICON
               RJP  DIFFER
               DEC  OLDVAL
               DEC  NEWVAL
               DEC  OUTPUT
               DEC  GAIN
               TER

THIS IS THE INTEGRATOR MACRO.
         IGT   MAC  GAIN,OLDVAL,NEWVAL,OUTPUT
               ENL  GAIN
               RJP  INTEGR
               OCT  OLDVAL
               OCT  NEWVAL
               OCT  OUTPUT
               TER

THIS MACRO CHECKS THE VALUE IN AL FOR A + SIGN
                    IF THE VALUE IS +, THERE IS A JUMP TO LABEL
         IFP   MAC  LABEL
               PJP  LABEL
               TER

THIS IS THE LOW SELECT MACRO.  IT SELECTS THE
                    LOWER OF THE TWO INPUTS AND LEAVES ITS VALUE
                    IN AL.

LOS   MAC  A,B,C
               ENL  A
               SUB  B
               PJP  L+3
               ENL  A
               JMP  L+4
               ENL  C)
               STL  CONVAR
               ENL  B
               TER
               EJE

THE FOLLOWING ARE THE VARIABLES USED BY THE
                    CONTROL PROGRAM

......DDC SYSTEM TERMS AND SYSTEM
                          CONFIGURATION DEFINED.............
00001    TRUE   EQU  1
00000    FALSE  EQU  0
00000    XX     EQU  0
00000    AL     EQU  0
00005    NUMPTS EQU  5           NUMBER OF POINTS PER FUNCTION
```

```
                                          TURBINE DESIGNATIONS DEFINED
00000   A       EQU  0
00001   B       EQU  1
00002   C       EQU  2
00003   D       EQU  3
        EJE
00000   UNIT    EQU  A              ***** THIS IS AN ASSEMBLY FOR THE A UNIT ****
00002   NTURB   EQU  2              2 UNIT SYSTEM

*****************
                                          *               *
                                          *    OPTIONS    *
                                          *****************

SET EMGOPT FOR EMERGENCY START OPTION
00001   EMGOPT  EQU  TRUE
                         SPEED R/L ADDRESS FOR UNIT A
27043   SPDA   8EQU NTURB*22-1+27000
00012   CTLLVL EQU  10                    CONTROL PROGRAM LEVEL.
30400   CMASTR8EQU 30400
                                          MAXSPD IS TOP SPEED WHERE THE REF ROUTINE LEVELS
                                          OFF.
06426   MAXSPD8EQU 6426                   = 102.3 PCT.
05612   BLDABS8EQU 5612  (=1200 DEG F ADC) MAX ALLOWABLE BLADE TEMPERATURE (1)
04610   EXHABS8EQU 1142*4                 ABSOLUTE ALLOWABLE EXHAUST    TEMP

00400   TOPLOP8EQU 400
00416   TOPEND8EQU 416
00470   SPBPC  8EQU 470                   SUB-PROGRAM ORIGIN TABLE.
00202   MULTPY8EQU 202
00204   DIVIDE8EQU MULTPY+2
01310   RELINK8EQU 1310                   RELINQUISH SUBROUTINE START

06006   RMCHER8EQU 6006                   IN AUTO SYNC
06012   UNEMPT8EQU 6012                   IN AUTO SYNC
        EJE
                                          ....... SEQUENCING AND SUBROUTINE INTERFACE ...

***********************************************
                                          *                                             *
                                          *    THE FOLLOWING ARE DEPENDENT UPON THE     *
                                          *    LOCATION OF THE SEQUENCING PROGRAM       *
                                          *                                             *
                                          ***********************************************

24400   ANLOGA8EQU 24400
24000   PWRD2  8EQU 24000
10000   RESA   8EQU 10000              TURBINE A SEQUENCING RESIDENT TABLE
00114   FRSPAK8EQU 114                 FIRST PACKED WORD IS THIS FAR DOWN IN THE
                                       SEQUENCING RES. TABLE.
36400   2DIMEN8EQU 36400
36403   1DIMEN8EQU 2DIMEN+3
36410   UNPACK EQU  1DIMEN+5           LOCATION OF THE UNPACKING ROUTINE.
36464   VARIN18EQU 2DIMEN+64
36465   VARIN28EQU VARIN1+1            LOCATION OF FUNC. GEN. INPUT ARGUMENTS

EJE
                                          ....... ANALOG INTERFACE ...............

THE FOLLOWING ARE THE INDICES THE A/I POINTS
                                          WOULD HAVE IN A 1 UNIT SYSTEM
                                          COMMERCIAL ANALOG DEFINATIONS.
00117   LT9IX  8EQU 117

00156   LT1IX  8EQU 156
00162   LT5IX  8EQU LT1IX+4
00154   KWIX   8EQU 154
00012   INLIX  8EQU 12                    LT33 INDEX
00156   CSOIX  8EQU 156
00170   CPRSIX8EQU 170
00152   SPDIX  8EQU 152
00172   EXA1IX8EQU 172
00173   BPA1IX8EQU EXA1IX+1

EJE
        ANL     MAC  NAME,INDEX
        NAME   8EQU  INDEX*NTURB+NTURB-1+ANLOGA
        TER

THE FOLLOWING EQU CARDS DEFINE THE ANALOG INPUT
                                          VALUE LOCATIONS FOR THE A UNIT IN A SYSTEM
                                          WITH ANY NUMBER OF UNITS

VALUE LOC FOR LT9 THE FIRST EXHAUST T/C
        ANL  EXHVAL,LT9IX
24637   EXHVAL EQU LT9IX*NTURB+NTURB-1+ANLOGA

LT1 VALUE LOC
        ANL  LT1VAL,LT1IX
24735   LT1VAL EQU LT1IX*NTURB+NTURB-1+ANLOGA
                                          LT5 VALUE LOC
        ANL  LT5VAL,LT5IX
24745   LT5VAL EQU LT5IX*NTURB+NTURB-1+ANLOGA
                                          KILOWATT OUTPUT
        ANL  ACKW,KWIX
24731   ACKW   EQU KWIX*NTURB+NTURB-1+ANLOGA
                                          INLET TEMPERATURE   LT33
        ANL  TINLET,INLIX
24425   TINLET EQU INLIX*NTURB+NTURB-1+ANLOGA
                                          FUEL DEMAND       AFLIND
```

```
627                    ANL FUELDM,CSOIX
630      24755  FUELDM EQU CSOIX*NTURB+NTURB-1+ANLOGA
631                                        CPMBUSTOR PRESSURE  COMBR
                       ANL CPRES,CPRSIX
         24761  CPRES  EQU CPRSIX*NTURB+NTURB-1+ANLOGA
632                                        ACTUAL SPEED    MNSPD
633                    ANL ACSPED,SPDIX
         24725  ACSPED EQU SPDIX*NTURB+NTURB-1+ANLOGA
634                                     EXHAUST AVERAGE
635                    ANL ANEXAV,EXA1IX
636      24765  ANEXAV EQU EXA1IX*NTURB+NTURB-1+ANLOGA
                                        BLADE AVERAGE
637                    ANL ANBPAV,BPA1IX
640      24767  ANBPAV EQU BPA1IX*NTURB+NTURB-1+ANLOGA
641                    EJE
642      30400         ORG CMASTR
643
644                                  XXXXXXXXXXXXXXXXXXXXXXXXXXXXXXXXXXXXXXXX
645                                        BEGIN CONTROL RESIDENT TABLE
646                                  XXXXXXXXXXXXXXXXXXXXXXXXXXXXXXXXXXXXXXXX
647
650
651
652      30400  1STCRL SYN L             FIRST LOCATION FROM RESIDENT CONTROL TABLE
653
654                                      THE VARIABLES 26B AND 26E ARE SET FOR THE
655                                      SEQUENCING PROGRAM.  WHEN IT FINDS THEM SET,  IT
656                                      ALARMS AND CAUSES SHUTDOWN.
657
660                           ...... FOLLOWING ARE THE DIFFERENTIAL TEMP. ERROR
661                                  ALARMS SET WHEN ACTUAL TEMP. EXCEEDS THE REF
662                                  BY A GIVEN AMT
663
664
665      30400  00000  26BD   OCT        BLADE DIFFERENTIAL ERROR
666      30401  00000  26ED   OCT        EXH. DIFFERENTIAL ERROR
667
670                           ...... FOLLOWING ARE ABSOLUTE OVERTEMPERATURE ALARMS.
671                                  THEY ARE SET IF ANY 1 T/C EXCEEDS ITS SPECIFIED
672                                  MAX. VALUE
673
674
675      30402  00000  26BA   OCT        BLADE ABSOLUTE ALM
676      30403  00000  26EA   OCT        EXH   ABSOLUTE ALM
677
700      30404  00000  LASLOD OCT        LOAD BITS FROM PREVIOUS PASS THROUGH PROGRAM.
701      30405  00000  FRACT  OCT     B5 ACCUMULATED FRACTIONAL PART OF THE SPEED REF.
702
703                    EJE
704                                  ****************************************
705                                        THE FOLLOWING 2 VARIABLES ARE THE ONLY
706                                        OUTPUTS FROM THE CONTROL PROGRAM.
707                                        THEY ARE THE SPEED REFERENCE AND THE
710                                        CSO LIMIT
711
712                                  ****************************************
713
714      30406  SPDREF SYN L             ADC VALUE FOR SPEED REF
715      30406  00000  SPDOUT OCT        SPEED REFERENCE FOR OUTPUT ALREADY IN CORRECT
716                                      UNITS.
717      30407  00000  LOWEST OCT        LOWEST OF THE CONTROLLER OUTPUT SIGNALS
720                                      THIS VALUE IS READY FOR OUTPUT.  IT IS THE
721                                      TEMPERATURE LIMIT ON CSO.
722
723      30410  30406  PBADR  OCT SPDREF ADDRESS TO BE CHANGED BY R/L PB S  VARIES W/ MOD
724
725      30411  SECBAK SYN L             COUNT TO DELAY 26BD, 26ED ALARMS IN GOING FROM
726      30411  00000         OCT 0      MODE 3,4 TO 2.
727
730
731      30412  00000  CONVAR OCT        THE CONTROLLING VARIABLE IS DETERMINED
732                                      BY LOOKING AT THIS WORD IN THE DESIGNATOR REG.
733                                      THE VARIABLE CAN BE DETERMINED AS FOLLOWS
734
735                                          1 = BLADE      CJP
736                                          2 = SURGE      OJP
737                                          4 = KW         PJP
740                                          8 = EXHAUST    ZJP
741
742                    EJE
743
744
745
746
747      30413  00000  KWIIN  OCT        PRESENT INPUT TO KW INTEGRATOR
750      30414  00000  LSKWIN OCT        LAST VALUE OF KWIIN
751      30415  00000  KWIOUT OCT        LAST VALUE OF THE INTEGRATOR OUTPUT
752      30416  00000  KWSGNL OCT        OUTPUT OF THE KW CONTROL BLOCK
753      30417  00000  KWOUPT OCT        OUTPUT OF CONST KW CONTROL BLOCK
754      30420  00000  LRLIM  OCT        OUTPUT OF LOAD RATE LIMITER
755      30421  00000  LRFRAC OCT        FRACTIONAL PART LOADING RATE
756
757
760      30422  00000  LSBPAV OCT        PREV INPUT TO THE BLADE PATH RATE BLOCK
761      30423  00000  LSBPIN OCT        PREVIOUS BPIIN
762      30424  00000  BPIOUT OCT        OUTPUT OF BLADE PATH INTEGRATOR
763      30425  00000  BPRATE OCT        OUTPUT OF BLADE PATH RATE FUNCTION
764      30426  00000  BPSGNL OCT        BLADE PATH CONTROLLER OUTPUT
765
766
767      30427  00000  BLTIMR OCT        TIMER FOR DELBP
770      30430  00000  DELBP  OCT        CURRENT OFFSET ADDED TO BPREF IN MODES 3,4
771      30431  21020  INCWRD OCT 21020  LEFT SHIFTED AS A TIMER.  ORIGINALLY EVERY 5TH
772                                      BIT IS SET.
773
774
775
776      30432  00000  LSEXAV OCT        PREV INPUT TO THE EXHAUST RATE BLOCK
777      30433  00000  LSEXIN OCT        PREVIOUS EXIIN
1000     30434  00000  EXIOUT OCT        OUTPUT OF EXHAUST INTEGRATOR
1001     30435  00000  EXRATE OCT        OUTPUT OF EXH RATE FUNCTION
1002     30436  00000  EXSGNL OCT        OUTPUT OF THE EXHAUST CONTROLLER
1003
1004
1005     30437  00000  SGSGNL OCT        OUTPUT OF THE SURGE CHANNEL CONTROLLER
1006
1007
1010     30440  00000  TKFLG  OCT        FLAG TO INDICATE SPEED IS TRACKING IN MODE 4.
1011
1012     30441  00000  POFSET OCT        PRESSURE OFFSET USED IN MODE 1 TO CORRECT FOR
1013                                     DRIFT IN THE XDUCER 0 POINT.
1014
1015     30442  00000  LASREF OCT        LAST VALUE FOR TEMPERATURE REF.
1016     30443  00000  REFKW  OCT        REFERENCE KILOWATTS
1017     30444  00000  WASMD3 OCT        FLAG TO SHOW WE ARE IN MODE 3
1020     30445  00000  WASMD4 OCT        SET TO SHOW WE WERE IN MODE 4.
```

```
1021
1022   30446   02400    TOSSIT OCT 2400        THROW AWAY VALUE FOR T/C S.  SET AT RUN TIME.
1023                                           INSURE THAT THE RESIDENT READ/WRITE AREA
1024                                           IS ALWAYS 53 OCTAL LOCATIONS LONG.
1025                             8RPT 53-L+1STCRL
1026   30447   00000             OCT 0
       30450   00000
       30451   00000
       30452   00000
1027
1030                                           HOLDSP IS A FLAG TO INDICATE A DESIRE ON THE
1031                                           PART OF THE OPERATOR TO HOLD SPEED DURING AN
1032                                           ACCELERATION.  IT IS SET BY THE OP CONSOLE
1033                                           PROGRAM.  IT CAUSES THE SPEED REFERENCE
1034                                           FUNCTION GENERATOR TO HOLD AT THE PRESENT
1035
1036   30453   00000    HOLDSP OCT
1037           30453    ENDWRT SYN L-1
1040                            EJE
1041
1042
1043                                           THE READ ONLY AREA ACCESSED BY OTHER PROGRAMS
1044                                           BEGINS HERE.
1045                                           ********************************************
1046
1047                                           THIS IS THE SPEED REFERENCE IN MODE 4.
1050   30454   00000    M4LMIT OCT
1051
1052                                           THESE ARE THE CONTROLLER GAINS.  ALL GAINS ARE
1053                                           AT A B OF 11.
1054                                           THESE ARE SAVED IN CONTROL RESIDENT TABLE
1055
1056           30455    GNKW1  SYN L            GAIN FOR PROP BLOCK IN KW CONTROLLER
1057   30455   02000           DEC .5B11
1060           30456    GNKW2  SYN L            GAIN FOR RESET BLOCK IN KW CONTROLLER
1061   30456   00146           DEC .05B11
1062
1063           30457    BPGNK1 SYN L            GAIN FOR PROPORTIONAL BLOCK OF BLADE PATH CNTRL.
1064   30457   02000           DEC .500B11
1065
1066           30460    BPGNK2 SYN L            GAIN FOR RATE BLOCK OF BLADE PATH CONTROLLER
1067   30460   00040           DEC .5B6
1070           30461    BPTCN  SYN L            BLADE PATH RATE TIME CONSTANT
1071   30461   00012           DEC 10   = 12 SEC T.C.
1072
1073           30462    BPGNK3 SYN L            GAIN FOR RESET BLOCK IN BLADE PATH CONTROLLER
1074   30462   00400           DEC .125B11
1075
1076                                           FOLLOWING RATE GAINS ARE USED IN BLADE PATH
1077                                           LOOP DURING LOADING.
1100
1101   30463   00140    BPGNLD DEC 1.5B6   = OVERALL RATE GAIN OF 2.5 AT LOAD
1102   30464   00144    BPTCLD DEC 100     = 2 MIN  RATE T.C.     AT LOAD
1103
1104
1105
1106
1107           30465    EXGNK1 SYN L            GAIN FOR PROPORTIONAL BLOCK OF EXHAUST CONTROL
1110   30465   01000           DEC .25B11
1111
1112           30466    EXGNK2 SYN L            GAIN OF RATE BLOCK OF EXHAUST CONTROLLER
1113   30466   00140           DEC 1.5B6
1114           30467    EXTCN  SYN L            EXHAUST CONTROL RATE TIME CONSTANT
1115   30467   00144           DEC 100   = 120 SEC T.C.
1116
1117           30470    EXGNK3 SYN L            GAIN OF THE RESET BLOCK OF THE EXHAUST CNTRL.
1120   30470   00463           DEC .15B11
1121                            EJE
1122
1123   30471   00000    MAXKW  OCT  FILL AT RUN   MAX VAL OF KW REF
1124           30472    DELCSO SYN L            DELTA ADDED TO CSO BEFORE STORING IN ACTFL
1125   30472   00140           OCT 140
1126
1127           30473    DIFERR SYN L            DIFFERENTIAL TEMPER. ERROR LIMIT
1130   30473   00145           OCT 145 (ADC/2 VALUE ) = 80 DEG. F
1131
1132                                           THE FOLLOWING ARE 251-AA VALUES TIMES 4 BECAUSE
1133                                           THE 501 AVERAGING DOES NOT NEED ADC/4 VALUES
1134           30474    IDLTOS SYN L            VALUE FOR TOSSIT IN MODE 0.
1135   30474   00400           OCT 100*4  =100 DEG F (ADC)
1136           30475    RUNTOS SYN L            VALUE FOR TOSSIT WHILE RUNNING.
1137   30475   00400           OCT 100*4
1140
1141
1142
1143           30476    NRMRMP SYN L            NORMAL RAMP RATE
1144   30476   00100           DEC 1.0B6
1145           30477    EMGRMP SYN L            EMERGENCY RAMP RATE
1146   30477   01100           DEC 9.0B6    2 MIN. LOADING
1147           30500    FSTRMP SYN L            FAST RAMPING RATE
1150   30500   00300           DEC 3.0B6    5 MIN LOADING
1151
1152
1153           30501    MINKW  SYN L            NOMINAL VALUE OF KW REF IN MIN LOAD
1154   30501   00121           OCT 121  = 4 MEGAWATTS (ADC/2)
1155                            EJE
1156
1157                             8DLE 1-EMGOPT*21
1160                                           THIS IS THE FUNCTION FOR EMERGENCY ACCEL.
1161
1162           30502    EMGACC SYN L
1163                                           SPEED VALUES
1164                                           TO GET RPM TO DECIMAL ADC COUNTS MULTIPLY
1165                                           BY .91 - .91 = 3280 ADC COMNTS/ 3600-RPM
1166
1167   30502   01351           DEC 745     820  RPM
1170   30503   03150           DEC 1640   1800 RPM
1171   30504   04076           DEC 2110   2320 RPM
1172   30505   05240           DEC 2720   2990 RPM
1173   30506   06320           DEC 3280   3600 RPM
1174
1175
1176                                           ACCELERATION VALUES AT CORRESPONDING SPEEDS
1177
1200                                           TO GET RPM/SCAN PERIOD MULTIPLY RPM/SEC
1201                                           BY 35  WHERE
1202                                           35 =(1.2 SEC/SCAN)*(.91 ADC CNTS/RPM)*(32 FOR B5
1203
1204   30507   00764           DEC 500    14.3 RPM/SEC
1205   30510   00214           DEC 140     4.0 RPM/SEC
1206   30511   00346           DEC 230     6.6 RPM/SEC
1207   30512   00346           DEC 230     6.6 RPM/SEC
1210   30513   01262           DEC 690    19.2 RPM/SEC
1211
```

```
1217                                    TO GET RPM TO DECIMAL ADC COUNTS MULTIPLY
1220                                    BY .91 - .91 = 3280 ADC COUNTS/ 360  RPM
1221
1222   30514   01350        DEC  744      820 RPM
1223   30515   03150        DEC 1640     1800 RPM
1224   30516   04076        DEC 2110     2320 RPM
1225   30517   05346        DEC 2790     3070 RPM
1226   30520   06440        DEC 3360     3690 RPM
1227
1230
1231                                    ACCELERATION VALUES AT CORRESPONDING SPEEDS
1232
1233                                    TO GET RPM/SCAN PERIOD MULTIPLY RPM/SEC
1234                                    BY 35  WHERE
1235                                    35 =(1.2 SEC/SCAN)*(.91 ADC CNTS/RPMH*(32+FOR B5
1236
1237   30521   00560        DEC  368     10.5 RPM/SEC
1240   30522   00756        DEC  494     14.1 RPM/SEC
1241   30523   00050        DEC   40      1.14 RPM/SEC
1242   30524   00244        DEC  164      4.67 RPM/SEC
1243   30525   00053        DEC   43      1.25 RPM/SEC
1244
1245                      EJE
1246
1247                      8DLE 1-EMGOPT*20
1250                                    THIS IS THE TEMPERATURE FUNCTION FOR AN
1251                                    EMERGENCY START (1500 DEG.)
1252         30526   EMERST SYN L
1253                                    INDEP. VAR. - COMBR SHELL PRES
1254   30526   00631        OCT  631       0 PSG
1255   30527   01063        OCT 1063      15 PSG
1256   30530   01314        OCT 1314      30 PSG
1257   30531   02000        OCT 2000      60 PSG
1260   30532   02670        OCT 2670     103 PSG
1261
1262                                    DEPENDENT VAR   THERMOCOUPLE TEMP AVE
1263   30533   03561        OCT 3561    1500 DEG. F
1264   30534   03230        OCT 3230    1350 DEG. F
1265   30535   02705        OCT 2705    1200 DEG. F
1266   30536   02227        OCT 2227     975 DEG. F
1267   30537   01673        OCT 1673     800 DEG. F
1270
1271
1272
1273                                    THIS IS THE TEMPERATURE FUNCTION FOR NORMAL
1274                                    1200 DEG. START.
1275
1276         30540   NORMST SYN L
1277                                    INDEPENDENT VAR. P2C (COMBR SHELL PRES)   ADC/2
1300   30540   00631        OCT  631       0 PSG
1301   30541   00714        OCT  714       5 PSG
1302   30542   01231        OCT 1231      25 PSG
1303   30543   02063        OCT 2063      65 PSG
1304   30544   02714        OCT 2714     105 PSG
1305
1306                                    DEPENDENT VAR. BLADE T/C TEMP. REF      ADC/2
1307   30545   01673        OCT 1673     800 DEG. F
1310   30546   01673        OCT 1673     800 DEG. F
1311   30547   02137        OCT 2137     930 DEG. F
1312   30550   01625        OCT 1625     770 DEG. F
1313   30551   01345        OCT 1345     630 DEG. F
1314                       EJE
1315
1316
1317
1320
1321
1322                                    THIS IS THE FUNCTION TABLE FOR THE BASE LOAD
1323
1324
1325         30552   BASELD SYN L
1326
1327                                    ALL BASE CURVE VALUES IN  ADC/2
1330                                    INDEP. VAR. - COMBR SHELL PRES
1330   30552   03023        OCT 3023     112 PSG
1331   30553   03146        OCT 3146     120 PSG
1332   30554   03314        OCT 3314     130 PSG
1333   30555   03463        OCT 3463     140 PSG
1334   30556   03635        OCT 3635     150 PSG
1335
1336                                    DEPENDENT VAR   THERMOCOUPLE TEMP AVE
1337   30557   01754        OCT 1754     839 DEG. F
1340   30560   01723        OCT 1723     819 DEG. F
1341   30561   01673        OCT 1673     800 DEG. F
1342   30562   01643        OCT 1643     781 DEG. F
1343   30563   01622        OCT 1622     768 DEG. F
1344
1345
1346                                    THIS IS THE FUNCTION TABLE FOR THE PEAK LOAD
1347                                    TEMPERATURE REFERENCE.
1350
1351         30564   PEAKLD SYN L
1352                                    ALL PEAK CURVE VALUES IN ADC/2
1353                                    INDEP. VAR. - COMBR SHELL PRES
1354   30564   03023        OCT 3023     112 PSG
1355   30565   03146        OCT 3146     120 PSG
1356   30566   03314        OCT 3314     130 PSG
1357   30567   03463        OCT 3463     140 PSG
1360   30570   03635        OCT 3635     150 PSG
1361
1362                                    DEPENDENT VAR   THERMOCOUPLE TEMP AVE
1363   30571   02043        OCT 2043     883 DEG. F
1364   30572   02010        OCT 2010     861 DEG. F
1365   30573   01760        OCT 1760     842 DEG. F
1366   30574   01732        OCT 1732     825 DEG. F
1367   30575   01707        OCT 1707     810 DEG. F
1370
1372
1373
1374                                    THIS IS THE FUNCTION TABLE FOR THE SYSTEM
1375                                    RESERVE TEMPERATURE REFERENCE.
1376
1377         30576   SYSRLD SYN L
1400                                    ALL S.R. CURVE VALUES IN  ADC/2
1401                                    INDEP. VAR. - COMBR SHELL PRES
1402   30576   03023        OCT 3023     112 PSG
1403   30577   03146        OCT 3146     120 PSG
1404   30600   03314        OCT 3314     130 PSG
1405   30601   03463        OCT 3463     140 PSG
1406   30602   03635        OCT 3635     150 PSG
1407
1410                                    DEPENDENT VAR   THERMOCOUPLE TEMP AVE
1411   30603   02043        OCT 2043    ******
1412   30604   02010        OCT 2010         SAME AS PEAK
```

```
1413   30605   01760              OCT 1760                TILL CURVES ARE FURNISHED
1414   30606   01732              OCT 1732                     BY SS AND GT ENGINEERING
1415   30607   01707              OCT 1707                             ******
1416
1417
1420                              EJE
1421                                                THIS IS THE SURGE FUNCTION FOR THE FUEL DEMAND.
1422
1423           30610   SURGFN SYN L
1424                                                Y IS INLET TEMPERATURE IN ADC UNITS
1425
1426   30610   37655              DEC -.040B11      YMIN
1427   30611   00152              DEC  .052B11      YMAX
1430
1431                                                X2 S
1432                                                COMBR SHELL PRES.
1433                                      MIN. CURVE - THIS CURVE FOR AMBIENT=-40+DEG.
1434   30612   00655              OCT 655           2     PSG
1435   30613   01244              OCT 1244          26    PSG
1436   30614   02245              OCT 2245          76    PSG
1437   30615   02717              OCT 2717          105   PSG
1440   30616   03635              OCT 3635          150   PSG
1441
1442                                                F(X1,YMIN)
1443   30617   00000              OCT 0             0     VOLTS
1444   30620   01412              OCT 1412          1.9   VOLTS
1445   30621   02315              OCT 2315          3.0   VOLTS
1446   30622   02510              OCT 2510          3.3   VOLTS
1447   30623   04000              OCT 4000          5.0   VOLTS
1450
1451
1452                                                X1 S
1453                                                COMBR SHELL PRES.
1454   30624   00655              OCT 655           2     PSG
1455   30625   01121              OCT 1121          18    PSG
1456   30626   01715              OCT 1715          65    PSG
1457   30627   03255              OCT 3255          127   PSG
1460   30630   03635              OCT 3635          150   PSG
1461
1462                                                F(X2,YMAX)
1463   30631   00000              OCT 0             0     VOLTS
1464   30632   02173              OCT 2173          2.8   VOLTS
1465   30633   02632              OCT 2632          3.5   VOLTS
1466   30634   03270              OCT 3270          4.2   VOLTS
1467   30635   04000              OCT 4000          5     VOLTS
1470
1471   30636   30471   KWTADR OCT MAXKW             ADDRESS OF KW REF LIMIT- USED FOR RAISE/LOWER.
1472   30637   30454   SPLADR OCT M4LMIT            MODE 4 SPEED REF. ADDRESS
1473   30640   30406   SRFADR OCT SPDREF            SPEED REF ADDRESS
1474   30641   30440   TKFADR OCT TKFLG             ADDRESS OF SPEED TRACKING FLAG
1475
1476           30642   SPDADR SYN L                 ADDRESS OF ANALOG OUTPUT SPEED R/L COUNT
1477   30642   27043              OCT -22*UNIT+SPDA
1500           30643   TNUMBR SYN L                 TURBINE DESIGNATION
1501   30643   00000              OCT UNIT
1502           30643   RESSEQ SYN L                 ADDRESS OF THE RESIDENT SEQUENCING TABLE
1503   30644   10000              OCT UNIT*130+RESA
1504
1505                                                INSURE THAT THE RESIDENT TABLE LENGTH IS ALWAYS
1506                                                250 OCTAL WORDS.
1507                              8RPT 250-L+1STCRL
1510   30645   00000              OCT 0
       30646   00000
       30647   00000
1511           30647   LASCRL SYN L-1               LAST LOCATION FROM RESIDENT TABLE
1512
1513
1514                                                xxxxxxxxxxxxxxxxxxxxxxxxxxxxxxxxxxxxxxxxxx
1515                                                    END CONTROL RESIDENT TABLE READ AREA
1516                                                xxxxxxxxxxxxxxxxxxxxxxxxxxxxxxxxxxxxxxxxxx
1517
1520                              EJE
1521                       30650  8ORG CMASTR+250
1522   30650   00000   SYNCNW OCT                   FLAG INDICATES THE AUTO SYNC IS IN PROCESS.
1523
1524                                                FOLLOWING ARE THE LOGICAL INPUTS FROM THE
1525                                                SEQUENCING LOGIC TABLES.
1526
1527   30651   00000   MODE0  OCT
1530   30652   00000   MODE1  OCT
1531   30653   00000   MODE2  OCT
1532                                                ----
1533   30654   00000   MODE3  OCT
1534   30655   00000   MODE4  OCT
1535   30656   00000   MIN    OCT
1536                                                ----
1537   30657   00000   BASE   OCT
1540   30660   00000   PEAK   OCT
1541   30661   00000   SYSR   OCT
1542                                                ----
1543   30662   00000   START  OCT                   SPARE
1544   30663   00000   EMRGRT OCT                   EMERGENCY RATE
1545   30664   00000   FASTRT OCT                   FAST RATE
1546                                                ----
1547   30665   00000   NORMRT OCT                   NORMAL RATE
1550   30666   00000   SX     OCT                   INDICATES NORMAL STOP REQUESTED
1551                              EJE
1552
1553
1554                                                ALL ANALOG INPUT VALUES ARE RIGHT SHIFTED
1555                                                ONE TIME SO THEY ARE = THE ADC VALUE DIVIDED
1556                                                BY 2.   AI VALUE BELOW = ADC/2
1557
1560                                                ACTUAL TURBINE SPEED.
1561   30667   00000   SPEED  OCT   ADC - THIS ONE ONLY ALL OTHERS ADC/2
1562
1563   30670   00000   PRES2C OCT                   COMBUSTOR PRES 2.
1564           30671   CSOPLS SYN L                 CSO + A DELTA
1565   30671   00000   ACTFL  OCT                   ACTUAL FUEL DEMAND + A DELTA OF DELCSO
1566   30672   00000   TEMPIC OCT                   COMBUSTOR TEMPERATURE.
1567   30673   00000   ACTKW  OCT                   ACTUAL KILOWATT OUTPUT
1570                              EJE
1571           30674   SPDAHD SYN L                 AMT. SPEED REF TRACKS AHEAD OF ACT. IN MODE 0.
1572   30674   00005              OCT 5    ADC COUNTS
1573
1574
1575
1576
1577                                                TEMPORARY STORAGE.   ***************
```

```
1600
1601
1602
1603                                        EJE                    ........................
1604                                                               :                        :
1605                                                               :    MODE 0 - IDLE       :
1606                                                               :                        :
1607                                                               ........................
1608                                                               THE MODE ZERO CONTROL LOGIC FOLLOWS.
1609
1610            30675     MODZRO SYN L
1611                                                               INITIALIZE THE PROGRAM PARAMETERS
1612                                        AL1 0),
         30675 32 0 334 .  ENL 0),
1613                                                               ZERO OUT THE VALUES FOR THE SPEED REF.
1614                                        AS1 FRACT
         30676 37 0 005     STL FRACT,
1615
1616
1617                                                               ZERO THE INITIAL VALUES FOR THE BLADE PATH CTRL.
1620                                        AS1 LSBPAV
         30677 37 0 022     STL LSBPAV,
1621                                        AS1 LSBPIN
         30700 37 0 023     STL LSBPIN,
1622                                        AS1 BPIOUT
         30701 37 0 024     STL BPIOUT,
1623                                        AS1 BPRATE
         30702 37 0 025     STL BPRATE,
1624
1625
1626                                                               ZERO THE INITIAL VALUES FOR THE EXHAUST CONTROL
                                            AS1 LSEXAV
         30703 37 0 032     STL LSEXAV,
1627                                        AS1 LSEXIN
         30704 37 0 033     STL LSEXIN,
1630                                        AS1 EXIOUT
         30705 37 0 034     STL EXIOUT,
1631                                        AS1 EXRATE
         30706 37 0 035     STL EXRATE,
1632
1633                                        AS1 BPSGNL
         30707 37 0 026     STL BPSGNL,
1634                                        AS1 EXSGNL
         30710 37 0 036     STL EXSGNL,
1635                                        AS1 SECBAK
         30711 37 0 011     STL SECBAK,
1636
1637
1640                                        XFR -819),LOWEST       IN MODE 0 SET CSO LIMIT = - 1 VOLT
         30712 32 0 333 .  ENL -819),
         30713 37 0 007     STL LOWEST
1641
1642                                        XFR IDLTOS,TOSSIT
         30714 32 0 074    ENL IDLTOS
         30715 37 0 046     STL TOSSIT
1643
1644
1645
1646
1647
1650
1651
1652
1653                                                               THE FOLLOWING INSTRUCTIONS ARE DONE SO THAT A
1654                                                               SMOOTH TRANSFER FROM MODE 0 TO MODE 1 IS
1655                                                               POSSIBLE.
1656
1657
1660                                                               ADD AN OFFSET TO THE SPEED SO WE TRACK AHEAD
1661                                                               BY SOME AMOUNT.
1662     30716 32 0 267     ENL SPEED
1663     30717 10 0 274     ADD SPDAHD
1664     30720 37 0 006     STL SPDOUT
1665
1666
1667                                                               SAVE VALUE TO BE USED LATER AS A FUNCTION
1670                                                               GENERATOR INPUT.
1671                                                               CHECK TO SEE IF SPEED LOW ENOUGH SO P2C
1672                                                               OFFSET CAN BE SAVED
1673
1674     30721 11 0 332 .   SUB MAXSPD*3/100+1)
1675     30722 27 0 325     PJP NOOFST
1676
1677                                                               SPEED LOW ENOUGH - SAVE PRESSURE FOR USE
1700                                                               AS AN OFFSET LATER IN MODE 1.
1701     30723 32 0 270     ENL PRES2C
1702     30724 11 0 331 .   8SUB 631)                              = ADC/2 EQUIVALENT OF 0 PSIG.
1703     30725 37 0 041     STL POFSET
1704
1705            30726     NOOFST SYN L
1706                                                               COME HERE DIRECTLY WHEN SPEED LESS THAN 3 PCT
1707                                                               AND DO NOT SAVE P2C OFFSET VALUE.
1710                                        MAK HOLDSP,FALSE
                                            DLE FALSE*1
         30726 02 0 053     CMB HOLDSP
                                            DLE 1-FALSE*1
1711                                        JPT ENDZRO
         30727 24 1 330 .   JMP ENDZRO
         30730    31110     WRD
         30731    00631     WRD
         30732    00145     WRD
         30733    36314     WRD
         30734    00000     WRD
1712            31000     8ORG CMASTR+400
1713
1714                                                               THIS IS THE CALLING SECTION OF THE DDC
1715                                                               PROGRAMS.  IT IS CALLED ONCE EVERY SCAN PERIOD,
1716                                                               AND IN TURN CALLS THE ACTUAL DDC PROG.
1717
1720            33200     CTRLA BEQU CMASTR+2600
1721            00250     DATDIF EQU LASCRL-1STCBL+1
1722            33450     CTRLB EQU CTRLA+DATDIF    CONTROL DATA TABLE FOR TURBINE B
1723            33720     CTRLC EQU CTRLB+DATDIF    CONTROL DATA TABLE FOR TURBINE C
1724            34170     CTRLD EQU CTRLC+DATDIF    CONTROL DATA TABLE FOR TURBINE D
1725
1726
1727                                                               CALL EACH UNIT SEPARATELY. JUMP TO RELINQUISH
1730                                                               SUBROUTINE AFTER EACH HAS RUN TO SEE IF ANY
1731                                                               HIGHER PRIORITY ROUTINES WANT TO RUN.
1732
1733
1734            31000     START1 SYN L
                                            DLE 4-NTURB*4
1745     31000 32 0 352 .   ENL CTRLB)       RUN UNIT B
1746     31001 32 1 350 .   BNL PREN)
1750     31002 32 1 350 .   ENL TOPEND-CTLLVL)
1751     31003 36 1 347 .   RJP RELINK
1752     31004 32 0 346 .   ENL CTRLA)       RUN UNIT A
```

```
1753  31005  36 1 351   .         RJP PRECRL
1754  31006  14 1 350             LSH TOPEND-CTLLVL
1755  31007  23 1 345   .         CLJ TOPLOP
1756                               EJE
1757  31010  00000      CONTRL ...
                                          -------- MODE SELECT --------
                                          SEE WHICH MODE SEQUENCING IS CALLING FOR AND
                                          JUMP TO THE PROGRAM FOR THAT MODE.
1762
1763                               F2D SURGFN,PRES2C,TEMP1C
      31011  32 1 344             ENL PRES2C
      31012  37 1 343             STL VARIN1
      31013  32 1 342             ENL TEMP1C
      31014  37 1 341             STL VARIN2
      31015  32 0 340             ENL SURGFN+NUMPTS+1)
      31016  36 1 337   .         RJP 2DIMEN
1764                               AS1 SGSGNL
      31017  37 1 336             STL SGSGNL,
1765                               AS1 LOWEST,
      31020  37 1 335             STL LOWEST,
1766                               XFR 1),CONVAR
      31021  32 0 334             ENL 1)
      31022  37 1 333             STL CONVAR            PUTSGSGNL IN LOWEST
1767

CALC LOAD RATE LIMITER OUTPUT HERE.
1774  31023  36 1 332   .         RJP LODRAT

2000                               IFE MODE2,TRUE,MODTWO
2001                               DLE -MODE2/MODE2+1*1
      31024  16 1 331   .         RSH MODE2
      31025  27 0 026             PJP L+2
                                   JPT MODTWO
      31026  24 0 152             JMP MODTWO            RESTORE THE PRE-EMPTED BLADE PATH POINTS IF
                                                        WE ARE NOT IN MODE 2)
2004  31027  32 1 330   .         ENL TNUMBR
2005  31030  36 1 327   .         RJP UNEMPT
2007         31031      SKPUNM SYN L

LOAD DESIGNATOR REGISTER WITH THE CONTENTS OF
                                                        BK2TMP.  AT THIS POINT, BK2TMP CONTAINS THE
                                                        MODE/LOAD WORD FROM THE SEQUENCING RES. TABLE.

THE DESIGNATOR REGISTER APPEARS AS ....

BIT    MODE   DESIGNATOR
                                                         0      0     CARRY
                                                         1      1     OVERFLOW
                                                         2      2     POS.
                                                         ................
                                                         3      3     ZERO
                                                         4      4     EVEN 2034  31031  05 0 160             EDR BK2TMP
2036  31032  25 1 326   .         CJP MODZRO
2037  31033  26 0 113             OJP MODONE
2040  31034  20 1 325   .         ZJP MODTHR
2043  31035  21 0 161             EJP MODFOR            GO TO MODE 0 IF NO OTHER SET
                                   JPT MODZRO
2046  31036  24 1 326             JMP MODZRO
2047                               EJE
                                                        THIS SECTION SELECTS THE LOWEST CONTROL
                                                        SIGNAL FROM THE FOUR POSSIBLE SOURCES AND
                                                        STORES IT IS THE FINAL SIGNAL OUTPUT LOCATION.

31037      ENDCRL SYN L

LOS LOWEST,EXSGNL,8
      31037  32 1 335             ENL LOWEST
      31040  11 1 324             SUB EXSGNL
      31041  27 0 043             PJP L+3
      31042  32 1 335             ENL LOWEST
      31043  24 0 046             JMP L+4
      31044  32 0 323             ENL 8)
      31045  37 1 333             STL CONVAR
      31046  32 1 324             ENL EXSGNL
2060                               AS1 LOWEST
      31047  37 1 335             STL LOWEST,

LOS LOWEST,KWSGNL,4
      31050  32 1 335             ENL LOWEST
      31051  11 1 322             SUB KWSGNL
      31052  27 0 054             PJP L+3
      31053  32 1 335             ENL LOWEST
      31054  24 0 057             JMP L+4
      31055  32 0 321             ENL 4)
      31056  37 1 333             STL CONVAR
      31057  32 1 322             ENL KWSGNL
2064                               AS1 LOWEST
      31060  37 1 335             STL LOWEST,
             31061      NOKWCK SYN L

LOS LOWEST,BPSGNL,2
      31061  32 1 335             ENL LOWEST
      31062  11 1 320             SUB BPSGNL
      31063  27 0 065             PJP L+3
      31064  32 1 335             ENL LOWEST
      31065  24 0 070             JMP L+4
      31066  32 0 317             ENL 2)
      31067  37 1 333             STL CONVAR
      31070  32 1 320             ENL BPSGNL
2070                               AS1 LOWEST
      31071  37 1 335             STL LOWEST,
                                                        THE FOLLOWING ACTS AS A LIMIT ON THE OUTPUT.
2072                               AL1 LOWEST
      31072  32 1 335             ENL LOWEST,
```

```
2073            31073  27 0 075           IFP OKVAL
2074                                       PJP OKVAL
2075            31074  32 0 316    .      XFR 0),LOWEST       LIMIT LOWEST TO + VALUES
                31075  37 1 335            ENL 0)
2076                   31076       OKVAL   STL LOWEST
2077            31076  32 0 113            SYN L
2100            31077  11 1 335            ENL ONEPU
2101            31100  27 0 102            SUB LOWEST
2102            31101  32 0 113            PJP L+3
2103            31102  24 0 103            ENL ONEPU
2104            31103  32 1 335            JMP L+2
                                           ENL LOWEST
2105            31104  37 1 335            AS1 LOWEST
2106            31105  14 1 335            STL LOWEST,
2107                                       LSH LOWEST          THE LSH IS DONE BECAUSE THE OUTPUT PROG.
2110                                                           EXPECTS A B OF 12 AND LOWEST IS AT B11
2111            31106  32 1 315    .      XFR SPDREF,SPDOUT
                31107  37 1 315            ENL SPDREF
                                           STL SPDOUT
2112                                                           COME HERE ON RETURN FROM MODE 0. NO EXTRA
2113                                                           CALCULATIONS HAVE TO BE DONE BECAUSE THE
2114                                                           OUTPUTS ARE ALREADY SET.
2115
2116            31110  36 1 314    .      RJP SETLIT
2117                   31111       ENDZRO SYN L
2120            31111  24 1 010            RTN
2121            31112  00003       DEC3    DEC 3
2122            31113  03777       ONEPU   OCT 3777           = 1/2 OF MAX ALLOWABLE VALUE FOR LOWEST.
2123                                                          THIS IS MAX VALUE ON LOWEST PRIOR TO ITS
2124                                                          BEING DOUBLED AND STORED FOR THE A/O PROGRAM.
2125                                       EJE
2126
2127                                       :.........................:
2130                                       :  MODE 1 - ACCELERATION  :
2131                                       :.........................:
2132
2133                                                          MODE ONE IS THE ACCELERATION MODE. IN THIS
2134                                                          MODE, THE REFERENCE IS SET ACCORDING TO WHETHER
2135                                                          THIS IS A NORMAL OR AN EMERGENCY START.
2136                   31114       MODONE  SYN L
2137
2140            31114  32 1 313            ENL SRFADR
2141                   31115       M2ENTR  SYN L
2142            31115  37 1 312    .       STL PBADR          ENTER HERE WHEN COMING FROM MODE 2
2143
2144            31116  32 1 311            XFR RUNTOS,TOSSIT
                31117  37 1 310    :       ENL RUNTOS
                                           STL TOSSIT
2145                                                          SET UP TEMP REF FOR NORMAL START.
2146                                       DLE 1-EMGOPT*5
2147                                       IFF EMRGRT,FALSE,NRMREF
                                           DLE -EMRGRT/EMRGRT+1*1
                31120  16 1 307    .       RSH EMRGRT
                                           DLE FALSE*1
                31121  27 0 126            PJP NRMREF
                                           DLE 1-FALSE*2
2150            31122  32 1 344            FID EMERST,PRES2C  EMERGENCY START = THIS PATH
                31123  37 1 343            ENL PRES2C
                31124  32 0 306            STL VARIN1
                31125  36 1 305    .       ENL EMERST+NUMPTS-1)
2151            31126  24 0 132            RJP 1DIMEN
2152                                       JMP SRTREF
2153                   31127       NRMREF  SYN L
2154                                                          NORMAL START = THIS PATH
                                           F1D NORMST,PRES2C
                31127  32 1 344            ENL PRES2C
                31130  37 1 343            STL VARIN1
                31131  32 0 304            ENL NORMST+NUMPTS-1)
                31132  36 1 305            RJP 1DIMEN
2155
2156
2157                   31133       SRTREF  SYN L
2160                                       AS1 BPREF
2161            31133  37 1 303    .       STL BPREF,
                                           AS1 EXREF
                31134  37 1 302    :       STL EXREF,
2162            31135  36 1 301    .       RJP BPANEX
2163
2164
2165                                                          GENERATE THE SPEED REF. CURVE
2166            31136  36 1 300    .       RJP SREFGN
2167
2170
2171                                                          CLEAR THE EXH. ABSOLUTE ALARM IN MODE1. THIS
2172                                                          ELIMINATES FALSE ALARMS ON HOT RESTARTS.
2173            31137  02 1 277    .       CMB 26EA
2174
2175
2176                                                          SEE IF WE HAVE BEEN IN THIS MODE LONG ENOUGH
2200                                                          THAT AN ALARM IS REASONABLE. IF NOT, CLEAR
2201                                                          THE DIFFERENTIAL ALARMS.
2202            31140  32 1 276    .       ENL SECBAK
2203            31141  27 0 142            PJP UNSET
2204            31142  24 0 145            JMP LVESET
2205
2206                                                          NOT BACK LONG ENOUGH - UNSET FLAGS
2207                   31143       UNSET   SYN L
2210                                       MAK 26ED,FALSE
                                           DLE FALSE*1
                31143  02 1 275    .       CMB 26ED
                                           DLE 1-FALSE*1
                                           MAK 26BD,FALSE
2211                                       DLE FALSE*1
                31144  02 1 274    .       CMB 26BD
                                           DLE 1-FALSE*1
2212            31145  01 1 276            DCR SECBAK
2213                   31146       LVESET  SYN L
2214
2215                                       MAK WASMD3,FALSE
                                           DLE FALSE*1
                31146  02 1 273    .       CMB WASMD3
                                           DLE 1-FALSE*1
                                           MAK WASMD4,FALSE
2216                                       DLE FALSE*1
                31147  02 1 272    .       CMB WASMD4
                                           DLE 1-FALSE*1
2217
2220                                                          CAUSE THE KW INTEGRATOR TO TRACK CSO
2221            31150  32 1 271            XFR ACTFL,KWIOUT
                31151  37 1 270    :       ENL ACTFL
                                           STL KWIOUT
```

```
31152  24 0 060              JMP NOKWCK        SET THE KW REFER = MIN REFERENCE
                             EJE

••••••••••••••••••••••••••
                                               :  MODE 2 - SYNCHRONIZE  :
       31153       MODTWO SYN L                ••••••••••••••••••••••••••

THIS IS THE LOGIC FOR CONTROL MODE 2. THIS
                                               IS THE SYNCHRONIZING MODE. IT IS NOT DEFINED 31153  32 1 330              ENL TNUMBR
31154  36 1 267              RJP RMCHER
31155  32 1 266              ENL SPDADR
31156  24 0 114              JMP M2ENTR
                             EJE
                                               ••••••••••••••••••••••••••
                                               :  MODE 4 - TEMP. CONTROL :
                                               ••••••••••••••••••••••••••
                                               THIS IS MODE 4- TEMPERATURE CONTROL IS BASED
                                               ON THE LOAD CONDITION - BASE, PEAK, OR SYSTEM
                                               RESERVE.
                                               THE REFERENCE IS A FUNCTION OF THE COMBUSTOR
                                               PRESSURE.

31157     00012   TEN    DEC 10
31160     00000   BK2TMP OCT XX                TEMPORARY STORAGE
31161     06747   M34MAX OCT MAXSPD*4/100+MAXSPD  = APPROX 106.3 PCT SPEED

31162       MODFOR SYN L                CALCULATE ADDR OF TRACKING FLAG THAT IS TO
                                               BE USED FOR THIS UNIT

IF FIRST TIME THROUGH GO TO INITIALIZATION
                             IFF WASMD4,FALSE,SETUP1
                             DLE -WASMD4/WASMD4+1*1
31162  16 1 272              RSH WASMD4
                             DLE FALSE*1
31163  27 0 170              PJP SETUP1
                             DLE I-FALSE*2

31164  32 1 265              ENL TKFLG         SEE IF VALUE IN TKFLG IS STILL = 0
31165  20 0 200              ZJP CALSPD        IF =0 CALCULATE REF VALUE
                                               SEE IF LOAD SELECTED HAS CHANGED
31166  32 1 264              ENL CURLOD
31167  11 1 263              SUB LASLOD
31170  20 0 175              ZJP SPDCRL        IF JUMP TAKEN HERE - TKFLG NOT =0 AND SAME LOAD

31171       SETUP1 SYN L                COME THROUGH HERE WHEN FIRST IN MODE 4 OR
                                               WHEN ON SPEED CHANGER CONTROL AND A NEW LOAD
                                               IS SELECTED.
31171  32 0 316              XFR 0),TKFLG
                             ENL 0)
31172  37 1 265              STL TKFLG

XFR TKFADR,PBADR
31173  32 1 262              ENL TKFADR
31174  37 1 312              STL PBADR
31175  24 0 223              JMP STRMAX

31176       SPDCRL SYN L                ON SPEED CHANGER CONTROL. CHANGE M4LMIT W/ P.B.

XFR SPLADR,PBADR
31176  32 1 261              ENL SPLADR
31177  37 1 312              STL PBADR
31200  24 0 217              JMP CHK104

31201       CALSPD SYN L                THIS SECTION CALCULATES A SPEED REF VALUE THAT
                                               WILL PRODUCE JUST ENOUGH SPEED ERROR TO MAKE
                                               CSO LIMIT THE CONTROLLING VARIABLE.
                                                     SPDREF = LIMIT/10
31201  32 1 260              ENL LIMIT
31202  24 0 202              JMP L+1           SPARE FOR POSSIBLE OFFSET
31203  24 0 203              JMP L+1
31204  37 1 257              STL LOWER
31205  32 0 316              ENL 0)
31206  36 1 256              RJP DIVIDE
31207     32401              OCT LOWER
31210     31157              OCT TEN
31211     32400              OCT UPPER
                                               (AL) = LIMIT/10 = (CSO+DELCSO)/10
31212  10 1 255              ADD SPLMIT
31213  37 1 254              STL M4LMIT        (AL) = 100 PCT SPEED + CALC ERROR TERM

XFR SPLADR,BK2TMP
31214  32 1 261              ENL SPLADR
31215  37 0 160              STL BK2TMP
31216  32 1 254              ENL M4LMIT
31217  37 1 160              STL BK2TMP,I

31220       CHK104 SYN L                IF WE WERE NOT PREVIOUSLY IN MODE4, SET M4LMIT
                                               AND THE P.B. CONTROLLED LOCATION TO 104 PCT
                                               OTHERWISE CHECK TO SEE THAT THE LIMIT HAS NOT
                                               EXCEEDED SOME VALUE = 104 PCT + DELTA VAL.
31220  32 0 321              ENL 4)
```

```
2401    31221  10 0 161              ADD  M34MAX
2402    31222  11 1 254              SUB  M4LMIT
2403    31223  27 0 230              PJP  SETSPD
2404
2405           31224        STRMAX   SYN  L
2406                                                   SET THE SPEED REF LOCATIONS TO 104 PCT
2407                                 XFR  SPLADR,BK2TMP
        31224  32 1 261              ENL  SPLADR
        31225  37 0 160              STL  BK2TMP
2410    31226  32 0 161              ENL  M34MAX
2411    31227  37 1 160              STL  BK2TMP,I
2412    31230  37 1 254              STL  M4LMIT
2413
2414
2415           31231        SETSPD   SYN  L
2416                                 XFR  M4LMIT,SPDREF
        31231  32 1 254              ENL  M4LMIT
        31232  37 1 315              STL  SPDREF
2417
2420
2421
2422
2423                                 MAK  WASMD3,FALSE
                                     DLE  FALSE*1
        31233  02 1 273              CMB  WASMD3
                                     DLE  1-FALSE*1
2424                                 MAK  WASMD4,TRUE
                                     DLE  TRUE*1
                                     DLE  1-TRUE*1
        31234  03 1 272              SMB  WASMD4
2425                                                   SET FLAG TO SHOW WE WERE IN MODE 4.
2426
2427
2430
2431                                                   SET KWREF=ACTKW
        31235  32 1 253    .         XFR  KWTADR,BK2TMP
        31236  37 0 160    .         ENL  KWTADR
        31237  32 1 252    .         STL  BK2TMP
2432    31240  37 1 160    .         ENL  ACTKW
2433    31241  37 1 251    .         STL  BK2TMP,I
2434                                 STL  REFKW
2435
2436
2437                                                   TRACK CSO W/ THE KW INTEG. OUTPUT
        31242  32 1 271              XFR  ACTFL,KWIOUT
        31243  37 1 270              ENL  ACTFL
                                     STL  KWIOUT
2440
2441                                                   UNCONDITIONALLY SET KWSGNL = LRLIM
2442                                 XFR  LRLIM,KWSGNL
        31244  32 1 250    .         ENL  LRLIM
        31245  37 1 322    .         STL  KWSGNL
2443
2444                                                   END OF SPECIAL MODE 4 LOGIC
2445    31246  24 1 247              JPT  COMLOG
        31247  31501                 JMP  COMLOG
        31250  30420                 WRD
        31251  30443                 WRD
        31252  30673                 WRD
        31253  30636                 WRD
        31254  30454                 WRD
        31255  33050                 WRD
        31256  00204                 WRD
        31257  32401                 WRD
        31260  32564                 WRD
        31261  30637                 WRD
        31262  30641                 WRD
        31263  30404                 WRD
        31264  33123                 WRD
        31265  30440                 WRD
        31266  30642                 WRD
        31267  06006                 WRD
        31270  30415                 WRD
        31271  30671                 WRD
        31272  30445                 WRD
        31273  30444                 WRD
        31274  30400                 WRD
        31275  30401                 WRD
        31276  30411                 WRD
        31277  30403                 WRD
        31300  33000                 WRD
        31301  32013                 WRD
        31302  32012                 WRD
        31303  32011                 WRD
        31304  30544                 WRD
        31305  36403                 WRD
        31306  30532                 WRD
        31307  30663                 WRD
        31310  30446                 WRD
        31311  30475                 WRD
        31312  30410                 WRD
        31313  30640                 WRD
        31314  32227                 WRD
        31315  30406                 WRD
        31316  00000                 WRD
        31317  00002                 WRD
        31320  30426                 WRD
        31321  00004                 WRD
        31322  30416                 WRD
        31323  00010                 WRD
        31324  30436                 WRD
        31325  31401                 WRD
        31326  30674                 WRD
        31327  06012                 WRD
        31330  30643                 WRD
        31331  30653                 WRD
        31332  32613                 WRD
        31333  30412                 WRD
        31334  00001                 WRD
        31335  30407                 WRD
        31336  30437                 WRD
        31337  36400                 WRD
        31340  30616                 WRD
        31341  30665                 WRD
        31342  30672                 WRD
        31343  36464                 WRD
        31344  30670                 WRD
        31345  00377                 WRD
        31346  33200                 WRD
        31347  01310                 WRD
        31350  00404                 WRD
        31351  33051                 WRD
        31352  33450                 WRD
```

```
2446                 31400           8ORG CMASTR+1000
2447     31400       00000   KMXADR OCT
2450
2451
2452                                             ........................
2453                                             :                        :
2454                                             :  MODE 3 - KW CONTROL   :
2455                                             :                        :
2456                                             ........................
2457     31401       00000   WASNEG OCT
2460
2461
2462                 31402   MODTHR SYN L
2463                                                                              CONSTANT KW CONTROL MODE
2464     31402       32 1 377  .       ENL M34MAX
2465     31403       37 1 376  .       STL SPDREF
2466
2467                                                                              IF COMING BACK FROM MODE 4, RAMP KW REFER. DOWN
2470                                                                              TO MIN SET POINT.
2471
2472
2473                                           XFR KWTADR,KMXADR
         31404       32 1 375  .       ENL KWTADR
         31405       37 0 000  .       STL KMXADR
2474
2475                                                                              GO TO MIN LOAD SETPOINT IF THE NORMAL STOP IS
2476                                                                              REQUESTED WHILE WE ARE IN MIN LOAD WITH THE KW
2477                                                                              SETPOINT ADJUSTED HIGHER THAN THE MIN POINT.
2500                                           IFF 5X,TRUE,GODOWN
                                               DLE -5X/5X+1*1
         31406       16 1 374  .       RSH 5X
                                               DLE TRUE*1
                                               DLE 1-TRUE*2
         31407       27 0 010           PJP L+2
                                               JPT GODOWN
         31410       24 0 014           JMP GODOWN
2501                                           IFF WASMD4,TRUE,GODOWN
                                               DLE -WASMD4/WASMD4+1*1
         31411       16 1 373  .       RSH WASMD4
                                               DLE TRUE*1
                                               DLE 1-TRUE*2
         31412       27 0 013           PJP L+2
                                               JPT GODOWN
         31413       24 0 014           JMP GODOWN
2502     31414       24 0 020           JMP SETMIN
2503                                                                              IF COMING BACK FROM MODE 4 DO NOT CHANGE KW
2504                                                                              SETPOINT. IF NOT MODE4, SEE IF FIRST TIME IN
2505                                                                              MODE3 AND IF SO SET KW REF TO MIN VALUE.
2506                                                                              NOTE ...
2507                                                                              THIS FEATURE IS NOT CURRENTLY IN , BUT IT
2510                                                                              CAN BE ADDED BY SIMPLY CHANGING THE IFF
2511                                                                              INSTRUCTION ABOVE TO JUMP TO BAKFM4
2512
2513                 31415   GODOWN SYN L
2514                                           AL1 REFKW
         31415       32 1 372  .       ENL REFKW
         31416       11 1 371  .       SUB MINKW
         31417       11 0 370  .       8SUB 10)
2515
2516
2517
         31420       27 0 032           PJP LOWRIT             WHEN WITHIN THIS MANY COUNTS OF MIN - TAKE 1 STE
2520
2521
2522
2523                 31421   SETMIN SYN L
2524                                           IFF WASMD3,TRUE,KWCTRL
                                               DLE -WASMD3/WASMD3+1*1
         31421       16 1 367  .       RSH WASMD3
                                               DLE TRUE*1
                                               DLE 1-TRUE*2
         31422       27 0 023           PJP L+2
                                               JPT KWCTRL
         31423       24 0 035           JMP KWCTRL
         31424       32 1 371           ENL MINKW
         31425       37 1 000           STL KMXADR,I
2525
2526
2527
2530
2531                 31426   BAKFM4 SYN L
2532                                                                              COME HERE TO SET UP MODE3 AFTER RETURNING FROM
2533                                                                              MODE4. THE KW VALUE REMAINS AT ITS PRESENT
2534                                                                              SETTING AND DOES NOT RETURN TO THE MIN VALUE.
2535                                                                              NOTE ... NOT IN AT THIS TIME.
2536
2537                                                                              STORE ADDRESS OF MAXKW IN P.B. CHANGE ADDRESS
2540                                                                              PUT THE INST TO STORE P.B. CHANGE ADDRESS HERE
2541                                                                              TO AVOID THE CASE WHERE WE GO FORM BASE TO MIN
2542                                                                              AND THEN BACK TO BASE WITHOUT GOING ALL THE
2543                                                                              WAY DOWN TO THE MINIMUM LOAD VALUE AND CLEARING
2544                                                                              THE WASMD4 FLAG. THIS WOULD RESULT IN NOT BEING
2545                                                                              ABLE TO RAISE/ LOWER LOAD IN THE BASE POSN.
2546                                           XFR KWTADR,PBADR
         31426       32 1 375           ENL KWTADR
         31427       37 1 366  .       STL PBADR
2547                                           MAK WASMD4,FALSE
                                               DLE FALSE*1
         31430       02 1 373           CMB WASMD4
                                               DLE 1-FALSE*1
2550                                           MAK WASMD3,TRUE
                                               DLE TRUE*1
                                               DLE 1-TRUE*1
         31431       03 1 367           SMB WASMD3
                                               JPT KWCTRL
2551     31432       24 0 035           JMP KWCTRL
2552
2553
2554                                                                              LOWER THE REFERENCE BY SOME AMOUNT
                     31433   LOWRIT SYN L
         31433       32 1 000           ENL KMXADR,I
         31434       11 1 365  .       SUB LRATB0             AUTO UNLOADING RATE IS SELECTABLE
         31435       37 1 000           STL KMXADR,I
2560
2561
2562
2563
2564
2565                                                                              FINISHED PRELIM. RAMPING CHECKS.
                     31436   KWCTRL SYN L
2566                                                                              FOLLOWING ARE ACTUAL KW CONTROL BLOCKS.
2567
2570     31436       32 1 000           ENL KMXADR,I
2571     31437       37 1 372           STL REFKW
2572     31440       24 0 040           JMP KWLABL
2573                 31441   KWLABL SYN L
2574
2575                                           DIF REFKW,ACTKW
                                               EDR 0)
         31441       05 0 364  .       ENL REFKW
         31443       11 1 363  .       SUB ACTKW
         31444       36 1 362  .       RJP CHKOVF
```

```
2576                                   AS1 KWIIN
        31445  37 1 361   .            STL KWIIN,
2577                                   MPL GNKW1
        31446  36 1 360   .            RJP MULTPY
        31447     30455                DEC GNKW1
        31450     32401                OCT LOWER
        31451  37 1 357   .            STL UPPER
2600                                   RSA 11
        31452  32 0 356   .            ENL 11)
        31453  36 1 355   .            RJP RSASUB
2601                                   XFR LOWER,KWOUPT
        31454  32 1 354   .            ENL LOWER
        31455  37 1 353   .            STL KWOUPT
2602
2603                                   JPT CTNUKW
        31456  24 0 056                JMP CTNUKW
2604                                   EJE
2605           31457  CTNUKW  SYN L
2606
2607                                   IGT GNKW2,LSKWIN,KWIIN,KWIOUT
        31457  32 1 352   .            ENL GNKW2
        31460  36 1 351   .            RJP INTEGR
        31461     30414                OCT LSKWIN
        31462     30413                OCT KWIIN
        31463     30415                OCT KWIOUT
2610
2611                                   SUM 2,KWIOUT,KWOUPT
        31464  05 0 364                EDR 0)
        31465  32 1 350   .            ENL KWIOUT
                                       DLE 5-2
        31466  10 1 353                ADD KWOUPT
        31467  36 1 362                RJP CHKOVF
2612
2613                                   AS1 KWOUPT
        31470  37 1 353                STL KWOUPT,
2614
2615                                                       NOW HAVE CONSTANT KW CONTROL BLOCK DONE
2616
2617                                                       NOW HAVE LRLIM CALCULATED.  SELECT LOWER OF THE
2620                                                       TWO VALUES -LRLIM, KWOUPT.
2621
2622    31471  32 1 347   .            ENL LRLIM
2623    31472  11 1 353                SUB KWOUPT
2624    31473  27 0 076                PJP SELKW
2625    31474  32 1 347                ENL LRLIM
2626    31475  37 1 346   .            STL KWSGNL
2627                                   JPT COMLOG
        31476  24 0 101                JMP COMLOG
2630
2631
2632           31477  SELKW   SYN L
2633    31477  32 1 353                ENL KWOUPT
2634    31500  37 1 346                STL KWSGNL
2635                                   JPT COMLOG
        31501  24 0 101                JMP COMLOG

2636                                                       THIS IS THE END OF THE CONSTANT KW CONTROL AREA.
2637                                                       GO TO BASEFN AND DO THINGS COMMON TO BOTH
2640                                                       MODES OF LOAD CONTROL
2641
2642                                   EJE
2643
2644
2645                                                       FOLLOWING LOGIC IS COMMON TO MODES 3 AND 4.
2646           31502  COMLOG  SYN L
2647                                   IFF BASE,FALSE,C004
                                       DLE =BASE/BASE+1*1
        31502  16 1 345   .            RSH BASE
                                       DLE FALSE*1
        31503  27 0 110                PJP C004
                                       DLE 1-FALSE*2
                                                           TAKE THIS PATH WHEN IN BASE LOADING CONDITION.
2650
2651           31504  BASEFN  SYN L
2652                                   F1D BASELD,PRES2C
        31504  32 1 344                ENL PRES2C
        31505  37 1 343   .            STL VARIN1
        31506  32 0 342   .            ENL BASELD+NUMPTS-1)
        31507  36 1 341   .            RJP 1DIMEN
2653                                   JPT ENMOD3
        31510  24 0 125                JMP ENMOD3
2654
2655
2656           31511  C004    SYN L
2657                                   IFF PEAK,FALSE,C005
                                       DLE =PEAK/PEAK+1*1
        31511  16 1 340   .            RSH PEAK
                                       DLE FALSE*1
        31512  27 0 117                PJP C005
                                       DLE 1-FALSE*2
                                                           TAKE THIS PATH ON PEAK LOADING CONDITION.
2660
2661           31513  PEAKFN  SYN L
2662                                   F1D PEAKLD,PRES2C
        31513  32 1 344                ENL PRES2C
        31514  37 1 343                STL VARIN1
        31515  32 0 337   .            ENL PEAKLD+NUMPTS-1)
        31516  36 1 341                RJP 1DIMEN
2663                                   JPT ENMOD3
        31517  24 0 125                JMP ENMOD3
2664
2665
2666           31520  C005    SYN L
2667                                   IFF SYSR,FALSE,BASEFN
                                       DLE =SYSR/SYSR+1*1
        31520  16 1 336   .            RSH SYSR
                                       DLE FALSE*1
        31521  27 0 103                PJP BASEFN
                                       DLE 1-FALSE*2
2670                                                       IF NO LOAD CONDITION IS SET, GO TO LABEL C003
2671                                                       AND SET UP AS FOR A BASE LOAD.  THIS IS THE PATH
2672                                                       NORMALLY TAKEN ON AN EMERGENCY START.
2673
2674
2675                                                       TAKE THIS PATH WHEN IN SYSTEM RESERVE LOADING
2676           31522  SYSRFN  SYN L
2677                                   F1D SYSRLD,PRES2C
        31522  32 1 344                ENL PRES2C
        31523  37 1 343                STL VARIN1
        31524  32 0 335   .            ENL SYSRLD+NUMPTS-1)
        31525  36 1 341                RJP 1DIMEN
2700
2701
2702
2703                           ENMOD3  AS1 BPREF              SAVE THE REFERENCE TEMPERATURE
        31526  37 1 334   .            STL BPREF,
2704                                   AS1 EXREF
```

```
31527  37 1 333   .    STL  EXREF,
                                           NOW HAVE REFERENCE TEMPERATURES CALCULATED.
                                           IF GOING FROM A HIGHER TO A LOWER REF. VALUE
                                           RAMP THE REFERENCE AT A RATE DETERMINED BY THE
                                           BUTTONS 31530  11 1 332   .    SUB  LASREF
31531  27 0 141   .    PJP  DOBPEX
                                           IF NEW REF IS HIGHER USE IT.
                                           SEE IF DIFFERENCE IS MORE THAN SOME FINAL STEP
31532  13 0 331   .    EOR  -0)
31533  11 0 330   .    SUB  5)
31534  27 0 135        PJP  RAMPT
                                           GO TO RAMPING IF NEW IS MORE THAN 5 LESS THAN
                                           OLD.
31535  24 0 141        JMP  DOBPEX

31536   RAMPT  SYN  L
31536  32 1 332        ENL  LASREF
31537  11 1 365        SUB  LRATB0
31540  37 1 334        STL  BPREF
31541  37 1 333        STL  EXREF

DO CONTROL FUNCTION
              31542   DOBPEX SYN  L
31542  36 1 327   .    RJP  BPANEX 31543  32 0 326   .    XFR  10),SECBAK
31544  37 1 325   .    ENL  10)
                       STL  SECBAK 31545  32 1 324   .    ENL  RESSEQ
31546  10 0 323   .    ADD  1)
31547  37 0 153        STL  INT52A
31550  32 1 153        ENL  INT52A,I
                                           THE CONTENTS OF THE 3RD LOCATION OF THE SEQ.
                                           RES. TBL. ALREADY CONTAIN THE BITS FOR
                                           AN INT INSTRUCTION.
31551  11 0 322   .    SUB  3)
31552  37 0 153   .    STL  INT52A 31553  30 0 000   INT52A INT XX
31554  12 0 321   .    8AND 400)
31555  20 0 156        ZJP  RDCSPD
31556  24 1 320   .    JMP  ENDCRL
                                           READ 52GA CCI FOR THIS UNIT

IF BREAKER CLOSED DO NOT CHANGE SPEED

DO FOLLOWING IF 52GA IS OPEN ( MODES 3 AND 4 )
              31557   RDCSPD SYN  L
                       XFR  SPLMIT,SPDREF
31557  32 1 317   .    ENL  SPLMIT
31560  37 1 376        STL  SPDREF
                       JPT  ENDCRL
31561  24 1 320        JMP  ENDCRL
                       EJE
31562    00000  EXTCFL OCT
              31563   ENDALG SYN  L
31563  24 1 164        JMP  ANLOGS,I 31564    00000  ANLOGS ...
                                           THIS SUBROUTINE READS ALL ANALOG INPUTS NEEDED
                                           BY THE CONTROL PROGRAM

..........READ AND AVERAGE THE THERMOCOUPLES
                       XFR  TOSSIT,EXTOSS
31565  32 1 316   .    ENL  TOSSIT
31566  37 0 230        STL  EXTOSS
                       XFR  TOSSIT,BLTOSS
31567  32 1 316        ENL  TOSSIT
31570  37 0 215        STL  BLTOSS
                       MAK  EXTCFL,FALSE
                       DLE  FALSE*1
31571  02 0 162        CMB  EXTCFL
                       DLE  1-FALSE*1

BLADE PATHS
                                           CHECK TO SEE IF WE ARE SYNCHRONIZING.
                                           IF SO AVERAGE 4, OTHERWISE AVERAGE 8.
                       IFF  SYNCNW,FALSE,NOSNC
                       DLE  -SYNCNW/SYNCNW+1*1
31572  16 1 315   .    RSH  SYNCNW
                       DLE  FALSE*1
31573  27 0 177        PJP  NOSNC
                       DLE  1-FALSE*2
31574  32 0 326        ENL  5*NTURB)
31575  37 0 177        STL  DLYSNC
31576  24 0 207        JMP  AVRG4
31577    00000  DLYSNC OCT  XX
              31600   NOSNC  SYN  L
31600  01 0 177        DCR  DLYSNC
31601  27 0 207        PJP  AVRG4
                       XFR  0),DLYSNC
31602  32 0 364        ENL  0)
31603  37 0 177        STL  DLYSNC

AVERAGE ALL 8 BLADE T/C S.
                                                 AL= FIRST VALUE ADDR
                                                 AVERAGE 8 VALUES
31604  32 0 314        ENL  LT1VAL)
31605  11 1 313   .    SUB  TNUMBR
31606  05 0 370        EOR  8)
31607  24 0 212        JMP  AVBPS

31610   AVRG4  SYN  L
```

```
3054  31610  32 0 312  .           ENL LT5VAL)
3055  31611  11 1 313  .           SUB TNUMBR
3056  31612  05 0 311  .           EDR 4)
3057
3058         31613     AVBPS  SYN L                    AVERAGE THE BLADES
3060  31613  36 1 310  .           RJP TCPROC
3061  31614     05612              OCT BLDABS          BLADE ABS LIM.
3062  31615     00000     BLTOSS   OCT XX              DIFFERENTIAL - FILL AT RUN
3063  31616     30402              OCT 26BA            BLADE ABS ALM ADDR
3064  31617     31562              OCT EXTCFL          FAILURE ALM ADDR
3065
3066
3067
3070  31620  37 1 307  .           STL ANBPAV
3071  31621  16 1 306  .           RSH ACC
3072  31622  37 1 305  .           STL HIBPAV
3073
3074
3075                                                   NOW HAVE THE BLADES AVERAGED
3076
3077
3100
3101
3102                                       ........    DO EXHAUST AVERAGE
3103  31623  32 0 304  .           ENL EXHVAL)
3104  31624  11 1 313  .           SUB TNUMBR              AL= FIRST EXHAUST VALUE ADDR
3105  31625  05 0 303  .           EDR 16)                 AVERAGE 16
3106  31626  36 1 310  .           RJP TCPROC
3107  31627     04610              OCT EXHABS              EXH ABS LIM
3110  31630     00000     EXTOSS   OCT XX                  DIFFEREN. LIM - FILL AT RUN
3111  31631     30403              OCT 26EA
3112  31632     31562              OCT EXTCFL
3113
3114  31633  37 1 302  .           STL ANEXAV
3115  31634  16 1 306  .           RSH ACC
3116  31635  37 1 301  .           STL HIEXAV
3117                                                   NOW HAVE AVERAGES.
3120
3121                                                   SEE IF ANY BAD
3122
3123                               IFF EXTCFL,FALSE,CBRTMP
3124                               DLE =EXTCFL/EXTCFL+1*1
      31636  16 0 162              RSH EXTCFL
                                   DLE FALSE*1
      31637  27 0 250              PJP CBRTMP
                                   DLE 1-FALSE*2
3125
3126                                                   SET EXH T/C FAILURE ALM
3127  31640  32 1 324              ENL RESSEQ
3130  31641  10 0 300              8ADD 100)
3131  31642  37 0 250  .           STL ALMWRD
3132
3133  31643  32 1 250              ENL ALMWRD,I
3134  31644  12 0 277  .           8AND 36777)
3135  31645  15 0 276  .           8EOR 1000)
3136  31646  37 1 250              STL ALMWRD,I
3137
3140  31647  24 0 250              JMP CBRTMP
3141  31650     00000     ALMWRD   OCT
3142                               EJE
3143         31651      CBRTMP  SYN L
3144                                                   READ COMBUSTOR INLET TEMP.
3145  31651  32 0 275  .           ENL TINLET)
3146  31652  36 1 274  .           RJP RDALG
3147                                                   NOW HAVE THE TEMPERATURE IN AL. IT IS AT A
3150                                                   B12. THIS CAN BE CONSIDERED AS A PER-UNIT
3151                                                   VALUE AT A B12.
3152  31653  16 1 306              RSH ACC
3153  31654  37 1 273  .           STL TEMP1C
3154
3155                                                   READ ACTUAL FUEL DEMAND
3156
3157  31655  32 0 272  .           ENL FUELDM)
3160  31656  36 1 274  .           RJP RDALG
3161
3162  31657  37 1 271  .           STL CSOVAL          SAVE ADC VALUE FOR LIGHT SECTION
3163  31660  16 1 306              RSH ACC
3164                                                   ADD A DELTA VALUE TO THE FUEL DEMAND SO THAT
3165                                                   THE TRACKING SIGNAL IS ALWAYS SLIGHTLY LARGER
3166                                                   THAN CSO.
3167  31661  10 1 270  .           ADD DELCSO
3170                                                   NOW HAVE ACTUAL FUEL DEMAND IN-PERMNIT AT B11.
3171  31662  37 1 267  .           STL CSOPLS
3172
3173
3174                               ......................................
3175
3176                                                   STR ACTUAL VALUE OF CSO + A DELTA VALUE IN THE
3177                                                   LIMIT LOCATION. THIS LIMITS THE INTEGRATOR
3200                                                   OUTPUT VALUE TO CSO+DELTA.
3201  31663  37 1 266  .           STL LIMIT
3202
3203
3204                               ......................................
3205
3206
3207  31664  24 1 265  .           JMP SEESPD
      31665     33717              WRD
      31666     32564              WRD
      31667     30671              WRD
      31670     30472              WRD
      31671     33735              WRD
      31672     24755              WRD
      31673     30672              WRD
      31674     33755              WRD
      31675     24425              WRD
      31676     01000              WRD
      31677     36777              WRD
      31700     00100              WRD
      31701     32010              WRD
      31702     24765              WRD
      31703     00020              WRD
      31704     24637              WRD
      31705     32007              WRD
      31706     00101              WRD
      31707     24767              WRD
      31710     23400              WRD
      31711     00004              WRD
      31712     24745              WRD
      31713     30643              WRD
      31714     24735              WRD
      31715     30650              WRD
      31716     30446              WRD
      31717     33050              WRD
```

```
31720    31036          WRD
31721    00400          WRD
31722    00003          WRD
31723    00001          WRD
31724    30644          WRD
31725    30411          WRD
31726    00012          WRD
31727    32013          WRD
31730    00005          WRD
31731    37777          WRD
31732    30442          WRD
31733    32012          WRD
31734    32011          WRD
31735    30602          WRD
31736    30661          WRD
31737    30570          WRD
31740    30660          WRD
31741    36403          WRD
31742    30596          WRD
31743    36464          WRD
31744    30670          WRD
31745    30657          WRD
31746    30416          WRD
31747    30420          WRD
31750    30415          WRD
31751    32402          WRD
31752    30456          WRD
31753    30417          WRD
31754    32401          WRD
31755    32576          WRD
31756    00013          WRD
31757    32400          WRD
31760    00202          WRD
31761    30413          WRD
31762    32565          WRD
31763    30673          WRD
31764    00000          WRD
31765    32713          WRD
31766    30410          WRD
31767    30444          WRD
31770    00010          WRD
31771    30501          WRD
31772    30443          WRD
31773    30445          WRD
31774    30666          WRD
31775    30636          WRD
31776    30406          WRD
31777    31161          WRD
         33720          8ORG 33720
         33720  SEESPD  SYN L
```

CHECK TO SEE IF THE SPEED LOOP IS CONTROLLING.
IF SO, THE VALUE OF LOWEST SENT OUT LAST TIME
WILL BE GREATER THAN THE ACTUAL CSO.

```
33720  32 0 330        ENL LASLOW
33721  11 0 332        SUB TOLERN
33722  11 0 331        SUB CSOVAL
33723  27 0 325        PJP ISSPED
```

NOT ON SPEED CONTROL WHEN HERE.

```
                       MAK ONSPD,FALSE
                       DLE FALSE*1
33724  02 1 375   .    CMB ONSPD
                       DLE 1-FALSE*1
33725  24 0 332        JMP CTNALG

33726  ISSPED  SYN L
```

COME HERE WHEN ON SPEED CONTROL

```
                       MAK ONSPD,TRUE
                       DLE TRUE*1
33726  03 1 375   .    SMB ONSPD
                       DLE 1-TRUE*1
33727  24 0 332        JMP CTNALG 33730  00000   LASLOW  OCT
33731  00000   CSOVAL  OCT
33732  00025   TOLERN  OCT 25
```

PREV. VALUE OF CSO LIMIT (ADC)
CURRENT VALUE OF CSO (ADC)
TOLERENCE ON CSO VS CSO LIMIT - IF CSO IS
MORE THAN THIS MUCH LOWER THAN CSO LIMIT, IT
INDICATES THAT THE SPEED LOOP IS CONTROLING

READ THE ACTUAL SPEED
CONTINUATION OF ANALOG INPUT

```
       33733   CTNALG  SYN L
33733  32 0 374   .    ENL ACSPED)
33734  36 0 355   .    RJP RDALG
33735  37 1 373   .    STL SPEED
```

READ ACTUAL KW.

```
33736  32 0 372   .    ENL ACKW)
33737  36 0 355   .    RJP RDALG
33740  16 1 371   .    RSH ACC
```

MOVE TO B11

```
33741  37 1 370   .    STL ACTKW
```

READ COMBUSTOR PRESSURE

```
33742  32 0 367   .    ENL CPRES)
33743  36 0 355   .    RJP RDALG
```

PICK UP A VALUE OF COMBUSTOR PRESSURE FORM THE
VALUE TABLE.  10000 OCTAL= 1 PER-UNIT =1./B12
=160PSI.  SHIFT THE VALUE TO A B11.

```
33744  16 1 371   .    RSH ACC
33745  37 1 366   .    STL PRES2C
```

IF IN MODE 1 SUBTRACT THE P2C OFFSET VALUE.
THIS CORRECTS FOR POSSIBLE VARIATIONS IN THE 0

```
                       IFF MODE1,FALSE,NOCORR
                       DLE -MODE1/MODE1+1*1
33746  16 1 365   .    RSH MODE1
                       DLE FALSE*1
33747  27 0 352        PJP NOCORR
                       DLE 1-FALSE*2
```

DO THE CORRECTION

```
33750  32 1 366        ENL PRES2C
33751  11 1 364   .    SUB POFSET
33752  37 1 366        STL PRES2C

33753   NOCORR  SYN L
33753  24 1 363   .    JMP ENDALG
33754  00000   ADCLOC  OCT
```

```
3311                               THIS IS A GENERAL SUBROUTINE TO READ ANALOG    *
3312                               VALUES.   ENTER W/ AL=VALUE LOCATION FOR A 1   *
3313                               UNIT SYSTEM.
3314                                                                              *
3315   33755  00000   RDALG  ...                                                  *
3316   33756  11 1 362         SUB  INUMBR                                        *
3317   33757  37 0 354         STP  ADCLOC                                        *
3320   33760  32 1 354         ENL  ADCLOC,I
3321   33761  24 1 355         RTN
3322                                             GO BACK W/ THE VALUE IN AL.      *
3323
3324                         EJE
       33762  30643   WRD
       33763  31562   WRD
       33764  30441   WRD
       33765  30652   WRD
       33766  30670   WRD
       33767  24761   WRD
       33770  30673   WRD
       33771  00101   WRD
       33772  24731   WRD
       33773  30667   WRD
       33774  24725   WRD
       33775  52226   WRD
3325          32000          BORG  CMASTR+1400
3326
3327                                        VARIABLES WHICH ARE USED LOCALLY BY BOTH THE
3330                                        BLADE AND EXH. CONTROL LOOPS.
3331
3332          32000   BPTEMP  SYN  L
3333          32000   EXTEMP  SYN  L
3334   32000  00000           OCT            RATE CORRECTED TEMPERATURE
3335
3336          32001   BPERR   SYN  L
3337          32001   EXERR   SYN  L
3340   32001  00000           OCT            ERROR  = TEMPERATURE REF. - RATE CORRECTED TEMP.
3341
3342          32002   BPIIN   SYN  L
3343          32002   EXIIN   SYN  L
3344   32002  00000           OCT            INTEGRATOR INPUT
3345
3346          32003   BPPROP  SYN  L
3347          32003   EXPROP  SYN  L
3350   32003  00000           OCT            PROPORTIONAL BLOCK OUTPUT
3351
3352
3353   32004  00046   30DEG   OCT  46   (ADC/2)   EQUIVALENT OF 30 DEG. IN THE 800-900 DEG RANGE
3354   32005  00040   25DEG   OCT  40   (ADC/2)   EQUIVALENT OF 25 DEG. IN THE 800-900 DEG RANGE
3355   32006  37747   MNS20   OCT -30   (ADC/2)   EQUIVALENT OF-20 DEG. IN THE 800-900 DEG RANGE
3356
3357                                        THIS IS THE PROPORTIONAL + RESET +RATE
3360                                        CONTROLLER FOR BLADE PATH AND EXHAUST
3361                                        TEMPERATURES.  IT USES A REFERENCE GENERATED BY
3362                                        THE FUNCTIONS IN MODE 1 AND 3.
3363   32007  00000   HIBPAV  OCT            HIGH AVERAGE BLADE PATH TEMP.
3364   32010  00000   HIEXAV  OCT            HIGH AVE EXHAUST TEMP
3365
3366   32011  00000   BPREF   OCT            REFERENCE TEMP FOR THE BLADE PATH CONTROL
3367   32012  00000   EXREF   OCT            REFERENCE FOR THE EXHAUST TEMP CONTROL
3370                                         FOLLOWING SECTION IS THE BLADE PATH TEMPERATURE
3371                                         CONTROL FUNCTION.
3372   32013  00000   BPANEX  ...
3373                          XFR  BPREF,LASREF
3374   32014  32 0 011         ENL  BPREF
3375   32015  37 1 367         STL  LASREF
3376
3377                                         ONLY ADD THE BLADE PATH OFFSET IN MODES 3 AND 4
3400                                         TO MAKE THE REF CURVES FOR BLADE PATH APPEAR
3401                                         HIGHER AND THUS LEAVE EXHAUST TEMPERATURE
3402                                         IN CONTROL.
3403                          IFF  MODE4,TRUE,ADDELT
3404                          DLE  -MODE4/MODE4+1*1
       32016  16 1 366         RSH  MODE4
                               DLE  TRUE*1
                               DLE  1-TRUE*2
       32017  27 0 020         PJP  L+2
       32020  24 0 024         JPT  ADDELT
                               JMP  ADDELT
3405                          IFF  MODE3,TRUE,ADDELT
                               DLE  -MODE3/MODE3+1*1
       32021  16 1 365         RSH  MODE3
                               DLE  TRUE*1
                               DLE  1-TRUE*2
       32022  27 0 023         PJP  L+2
```

We claim:

1. A machine implemented method for operating industrial gas turbine apparatus including a gas turbine having compressor, combustion and turbine elements, a fuel system for supplying fuel to the combustion element, and a process sensor for monitoring a selected process parameter of gas turbine operation by generating a signal representative thereof utilizable for scheduling fuel flow from said fuel system to said combustion element and means for storing signals of the type generated by said sensor, the steps of said method comprising
   a. generating a signal representative of the value of said parameter at a time when said value is known,
   b. comparing the actual value of the signal generated at said time to the known value of said parameters,
   c. storing the difference between the known value of said parameters and the actual value of the signal generated,
   d. determining, from said stored difference value, a calibration value for said process sensor,
   e. utilizing said calibration value in correctively adjusting the value of successive parameter generated signals representative of the value of said parameter, and
   f. scheduling fuel flow from said fuel system to said combustion element at least in part as a function of said adjusted signal values.

2. The method recited in claim 1 and further comprising the step of limiting compressor surge at least in part as a function of said adjusted parameter values.